(12) United States Patent
Aziz et al.

(10) Patent No.: US 12,744,619 B2
(45) Date of Patent: *Sep. 22, 2026

(54) ADAPTING COMMUNICATION LINK PARAMETERS USING SIGNAL-TO-NOISE (SNR) DEVIATION METRICS

(71) Applicant: NVIDIA Corporation, Santa Clara, CA (US)

(72) Inventors: Pervez Mirza Aziz, Dallas, TX (US); Mohammad Shafiul Mobin, Murphy, TX (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/913,619

(22) Filed: Oct. 11, 2024

(65) Prior Publication Data

US 2026/0106690 A1 Apr. 16, 2026

(51) Int. Cl.
*H04L 1/18* (2023.01)
*H04L 1/00* (2006.01)

(52) U.S. Cl.
CPC .......... *H04L 1/0045* (2013.01); *H04L 1/0057* (2013.01)

(58) Field of Classification Search
None
See application file for complete search history.

(56) References Cited

U.S. PATENT DOCUMENTS 8,665,941 B1 * 3/2014 Eliaz ..................... H04L 1/0041 375/233
12,267,210 B2 4/2025 Aziz et al.
2003/0236080 A1 * 12/2003 Kadous ................. H04L 1/0045 455/226.1
2014/0223208 A1 * 8/2014 Eltawil ................. G06F 1/3296 713/320
2015/0188653 A1 * 7/2015 Hanks ................. H04L 27/0012 370/203
2015/0188668 A1 * 7/2015 Al-banna ............. H04L 5/0044 370/208
2022/0237351 A1 * 7/2022 Choi ....................... G06F 30/33

OTHER PUBLICATIONS

Liu C.; 100+ GB/s Ethernet Forward Error Correction (FEC) Analysis, Signal Integrity Journal, Jul. 9, 2019, 25 pages.

* cited by examiner

*Primary Examiner* — Mujtaba M Chaudry
(74) *Attorney, Agent, or Firm* — Lowenstein Sandler LLP

(57) ABSTRACT

Technologies for optimizing post-FEC bit error rate (BER) performance of a Forward Error Correction (FEC) system are described. A controller is coupled to an FEC circuit and a receiver circuit. The controller receives equalized error data from the receiver circuit and determines, using the equalized error data and a nominal signal power, a signal-to-noise ratio (SNR) deviation metric, the SNR deviation metric being indicative of an estimated post-FEC BER of the FEC circuit. The controller adjusts, based on the SNR deviation metric, at least one of a FEC parameter of the FEC circuit or a link parameter of the receiver circuit to decrease the estimated post-FEC BER. This improves the post-FEC performance of the FEC circuit.

29 Claims, 29 Drawing Sheets

(B)
RSIL=8

(A)
RSIL=1

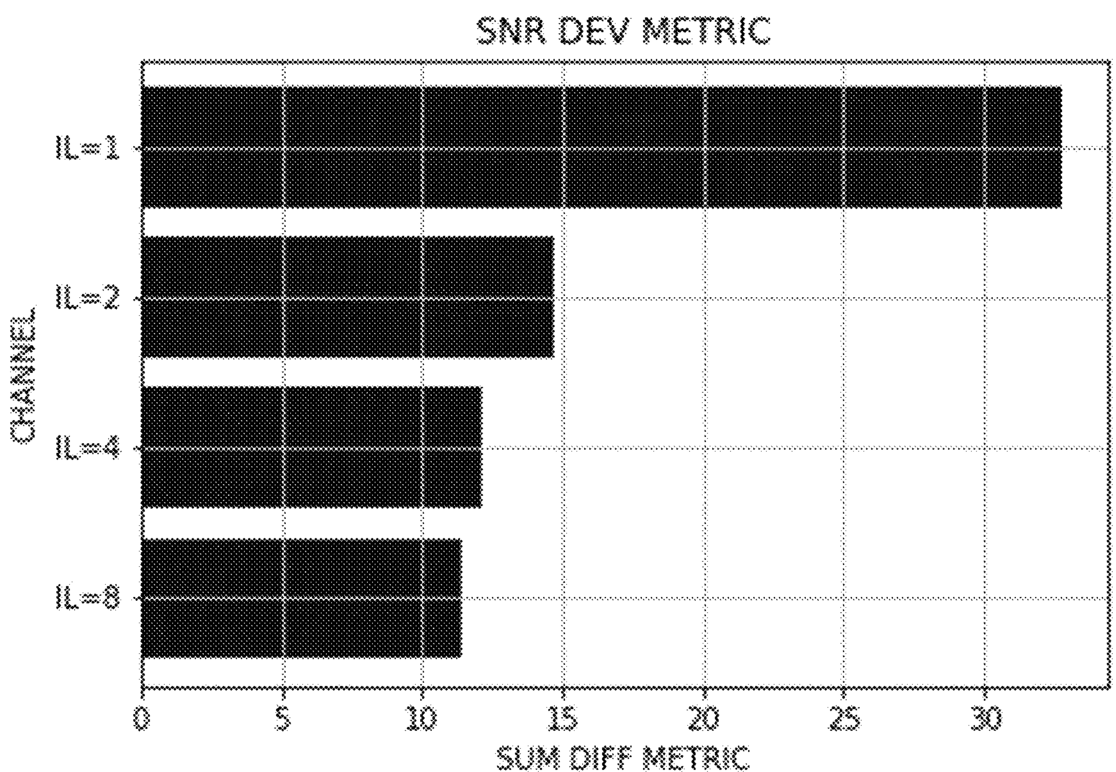
FIG. 20

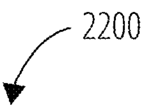

RECEIVING EQUALIZED ERROR DATA FROM A RECEIVER CIRCUIT 2202

DETERMINE, USING THE EQUALIZED ERROR DATA AND A NOMINAL SIGNAL POWER, A SIGNAL-TO-NOISE RATIO (SNR) DEVIATION METRIC, THE SNR DEVIATION METRIC BEING INDICATIVE OF A POST-FEC BIT ERROR RATE (BER) OF AN FEC SYSTEM COUPLED TO THE RECEIVER CIRCUIT 2204

ADJUST, BASED ON THE SNR DEVIATION METRIC, AT LEAST ONE OF AN FEC PARAMETER OF THE FEC SYSTEM OR A LINK PARAMETER OF THE RECEIVER CIRCUIT TO REDUCE THE POST-FEC BER OF THE FEC SYSTEM 2206

FIG. 22

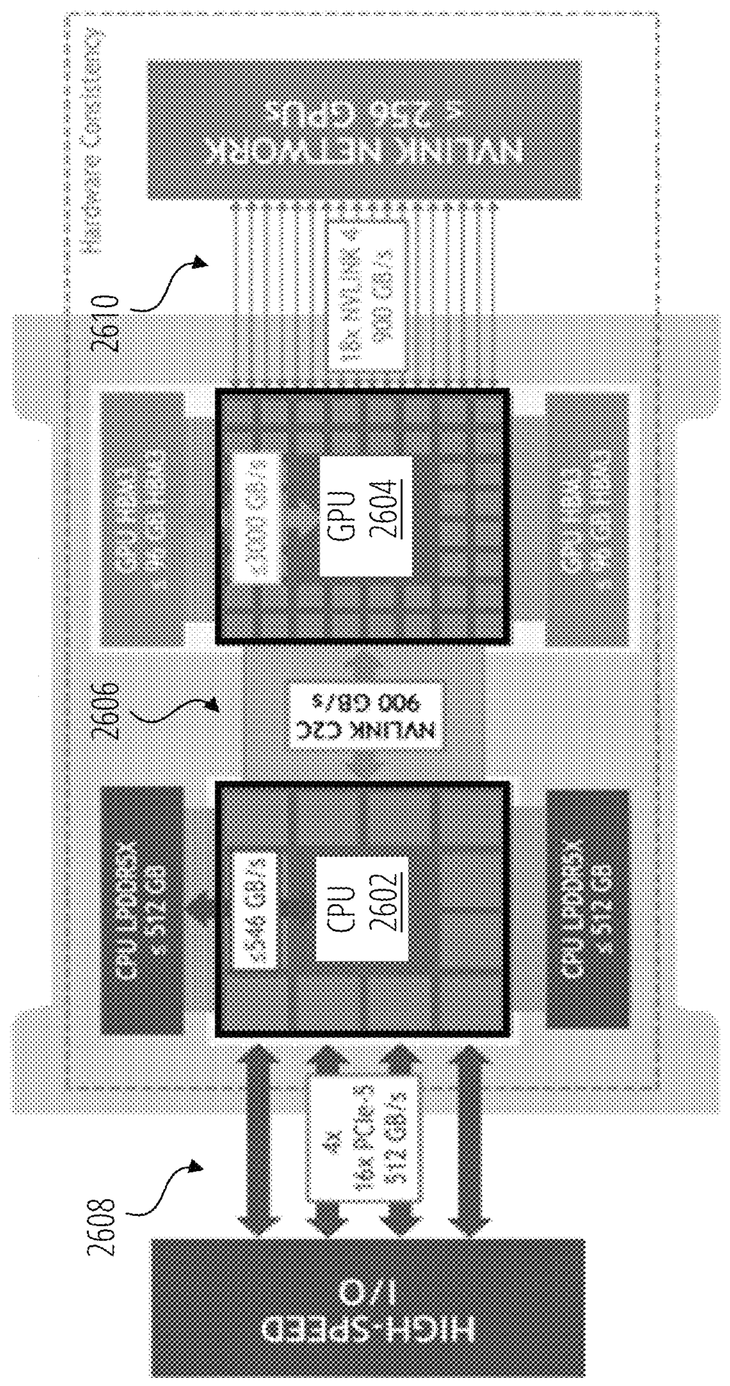
FIG. 26

ADAPTING COMMUNICATION LINK PARAMETERS USING SIGNAL-TO-NOISE (SNR) DEVIATION METRICS

RELATED APPLICATIONS

This application is related to U.S. application Ser. No. 18/112,406, filed Feb. 21, 2023, the entire contents of which are incorporated herein by reference.

TECHNICAL FIELD

At least one embodiment pertains to processing resources used to perform high-speed communications. For example, at least one embodiment pertains to technology for adapting communication or FEC parameters using pre-FEC SNR deviation metrics to improve post-FEC performance.

BACKGROUND

Communication systems employ an architecture with a combination of a transmitter/receiver circuit (e.g., Serializer/Deserializer (SerDes) circuit) in conjunction with a Forward Error Correction (FEC) system for the transmission of signals from a transmitter to a receiver via a communication channel or medium (e.g., cables, printed circuit boards, optical fibers, etc.). The FEC system can be used to optimize equalization of the signal over the communication channel to achieve a desired bit error ratio (BER). For example, an FEC encoder encodes data on the transmit side before using a SerDes transmitter (TX) to transmit the data through a communication channel. The SerDes receiver (RX) receives an analog input signal at the output of the communication channel, and recovers the data as a decoded binary bit stream while achieving a certain BER performance (called "pre-FEC BER performance") before sending that data through an FEC decoder to further improve the BER.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 20 is a plot of exemplary SNR deviation metrics plotted against different interleave factors according to at least one embodiment.

FIG. 22 is a flow diagram of a method for adjusting at least one of an FEC parameter or a link parameter to reduce a post-FEC BER performance according to at least one embodiment.

FIG. 26 is a block diagram of a computing system having a central processing unit (CPU) and a graphics processing unit (GPU) in a single integrated circuit according to at least one embodiment.

DETAILED DESCRIPTION

Figure 1:
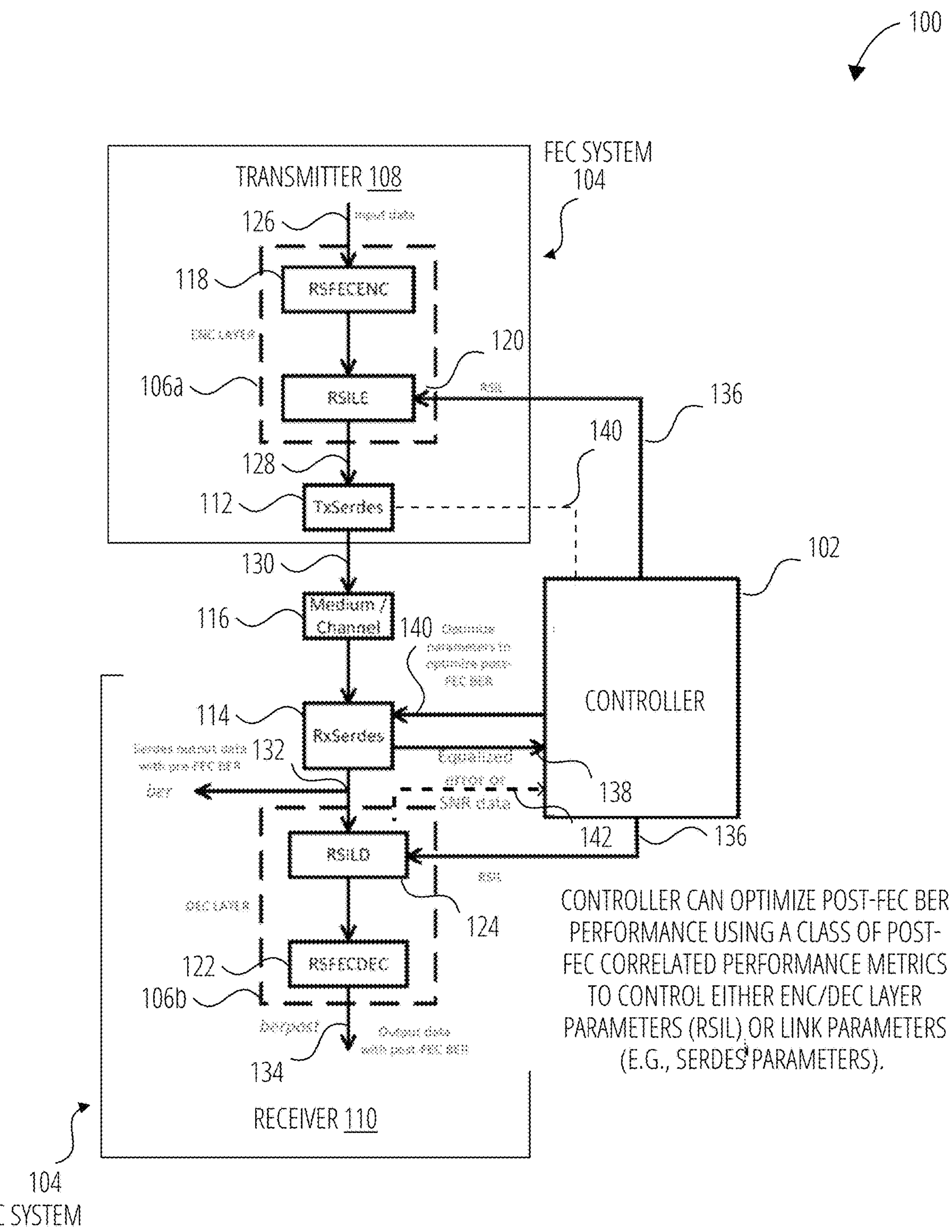
FIG. 1 is a block diagram of a communication system having a controller to optimize post-FEC BER performance of an FEC system using a post-FEC correlated performance metric according to at least one embodiment.

As described above, communication systems employ a transmitter/receiver circuit (e.g., Serializer/Deserializer (SerDes) circuit) in conjunction with an FEC system, including an FEC encoder that encodes data on the transmit side before using the transmitter (TX) to transmit the data through a communication channel. The receiver (RX) receives an analog input signal at the output of the communication channel, and recovers the data as a decoded binary bit stream while achieving a certain BER performance before sending that data through an FEC decoder to further improve the BER. The FEC system may perform data interleaving of various types. There are FEC-related parameters that can be adjusted, but these parameters are usually static in a system thus locking the system into a specific a priori chosen performance/power/latency tradeoff, where the latency is latency through the FEC system. The TX/RX hardware (e.g., SerDes hardware), on the other hand, often has many link parameters that can be adapted either directly on the SerDes hardware or through the use of an external controller. However, the external controller uses these link parameters to optimize the SerDes performance based on some pre-FEC performance criteria. That is, the controller measures the pre-FEC BER performance to optimize the SerDes parameters. A well-equalized signal giving good pre-FEC BER may distribute errors that are not favorable to the FEC and post-FEC performance. However, it is not practical to measure post-FEC BER directly, creating a need for metrics which will correlate well with post-FEC performance. There is no practical way to measure the post-FEC BER performance of the FEC system at low post-FEC BER values where a system would typically operate. Thus, conventional systems do not use link or FEC-related parameters to optimize the post-FEC BER performance of the FEC systems.

Aspects and embodiments of the present disclosure address these and other challenges by providing adaptation metrics reflective of post-FEC BER performance, including signal-to-noise ratio (SNR) deviation metrics, to optimize post-FEC BER performance of an FEC system. Aspects and embodiments of the present disclosure can provide a controller that can determine a SNR deviation metric, such as based on an SNR histogram difference metric, as a proxy for the post-FEC BER performance of the FEC system. The SNR histogram difference metric can be computed by comparing a measured SNR histogram to a target SNR histogram. The SNR deviation metrics can be another form of adaptation metrics (also referred to as post-FEC correlated performance metrics), which are reflective of post-FEC BER performance to optimize the post-FEC BER performance of the FEC system. In some cases, the SNR deviation metrics can be used in addition to other post-FEC correlated performance metric, such as a codeword histogram difference metric based on FEC symbol error or FEC symbol error auto-correlation function (ACF) based metrics described in U.S. application Ser. No. 18/112,406. The codeword histogram difference metric can be computed by comparing measured FEC codeword histogram to a desired target histogram.

Aspects and embodiments of the present disclosure can allow (i) the ability to adapt SerDes parameters to optimize post-FEC BER performance, and (ii) the ability to adapt FEC system parameters to optimize post-FEC BER performance. In some cases, a hierarchical coarse/fine optimization procedure can be performed in which a coarse optimization of one or more SerDes parameters can be computed quickly using traditional optimization metrics, followed by computing the newly proposed metrics to perform a fine optimization. The coarse optimization will filter out parameters which are very bad for pre-FEC performance and thus likely to be very bad for post-FEC performance. Among the remaining space of reasonably good parameters, the fine optimization can be performed to carefully optimize post-FEC performance.

Aspects and embodiments of the present disclosure can use different classes of adaptation metrics. One class of metrics can be based on comparing a measured FEC codeword histogram to a desired target histogram to compute a codeword histogram difference metric. Another class of metrics can be based on computing a FEC symbol error auto-correlation function. Another class is the SNR deviation metrics based on equalized error data. By using the multiple classes of adaptation metrics, the FEC-related parameters and/or link parameters can be dynamically adapted to optimize the post-FEC BER performance tradeoffs with respect to latency, for example. The link parameters, such as SerDes parameters, can also be adapted for post-FEC BER performance, unlike conventional systems that use the SerDes parameter adaptation to optimize pre-FEC BER performance. Aspects and embodiments of the present disclosure have the ability to (i) adapt FEC system parameters and/or (ii) link parameters to optimize post-FEC BER performance through the use of different adaptation metrics reflective of post-FEC BER performance.

Aspects and embodiments of the present disclosure can be applied to any communication system employing forward error correction. The communication system can include serial links (e.g., printed circuit board (PCB) links, copper cables, optical links, read channels (e.g., —systems including but not limited to serial links (PCB/copper cable/optical links etc.), read channel applications (e.g., hard disk, flash SSDs application), or the like. The communication system can be implemented in a personal computer (PC), a set-top box (STB), a server, a network router, a switch, a bridge, a data processing unit (DPU), a network card, a data center, or any device or system capable of sending signals over a communication channel to another device.

FIG. 1 is a block diagram of a communication system 100 having a controller 102 to optimize post-FEC BER performance of an FEC system 104 using a post-FEC correlated performance metric according to at least one embodiment. The communication system 100 can include an FEC system 104 and a SerDes system in a communication channel. In particular, the communication system 100 includes a transmitter 108 (also referred to as a transmitter device or transmitting device), a receiver 110 (also referred to as a receiver device or receiving device), and the controller 102 operatively coupled to the receiver circuit 114, the transmitter circuit 112, and the FEC system 104, as described in more detail below. In this embodiment, the FEC system 104 includes a single FEC engine, such as a Reed-Solomon (RS) FEC engine, with an RS code and RS interleaving (RSILE, RSILD). In other embodiments, other error correcting codes can be used, such as a Bose-Chaudhuri-Hocquenghem code (BCH code) and BCH interleaving (BCHILE, BCHILD), Hamming codes, extended Hamming codes, Golay codes, parity codes, multidimensional parity codes, triple modular redundancy codes, Nordstrom-Robinson codes, cyclic redundancy checks (CRC) codes, or the like.

In at least one embodiment, the transmitter 108 is part of a first transceiver that also includes a receiver (not illustrated in FIG. 1) and the receiver 110 is part of a second transceiver that also includes a transmitter (not illustrated in FIG. 1). The transmitter 108 includes a transmitter circuit 112, such as a SerDes TX circuit. The transmitter circuit 112 sends signals over a communication channel 116 (also referred to as "channel," "communication medium," or "transmission medium." The receiver 110 includes a receiver circuit 114, such as a SerDes RX circuit. The receiver circuit 114 receives signals over the communication channel 116.

In at least one embodiment, the FEC system 104 includes an encoding layer **106*a* at the transmitter 108 and a decoding layer 106*b* at the receiver 110. The encoding layer 106*a* can encode input data 126 (e.g., user or input bits) into forward error correction (FEC) codewords 128. In at least one embodiment, the FEC system 104 uses Reed-Solomon (RS) FEC algorithm. The FEC encoder 118 can thus be an RS FEC encoder (RSFECENC). Other encoding operations may be performed in the encoding layer 106*a* (and decoding operations in the decoding layer 106*b*). In other embodiments, other encoding operations can be performed in the transmitter circuit 112 and receiver circuit 114, such as precoding, Gray coding, run length encoding, or the like. During the encoding process, the FEC encoder 118 (e.g., RSFECENC) usually processes groups of bits called FEC symbols, which are typically groups of say 8 or 10 bits at a time, and then FEC codewords 128, which depending on the FEC, can include many FEC symbols. After the encoding process, the transmitter circuit 112 (e.g., SerDes TX circuit sends the equivalent binary bits in a bit stream 130 as an analog waveform through communication channel 116. The receiver circuit 114 (e.g., SerDes RX circuit) processes the analog signal, performing operations, such as equalization/detection, clock/data recovery, and produces a bit stream 132, which in the absence of impairments or noise in the communication channel 116 would match the transmitted bit stream 130**.

It should be noted that the bits of the bit stream 132, at the output of the receiver circuit 114 (e.g., SerDes RX circuit), are produced with a finite pre-FEC BER. This finite pre-FEC BER can be high. These pre-FEC bits at the output of the receiver circuit 114 (e.g., SerDes RX circuit) are typically grouped again as FEC symbols for the decoding layer **106*b*. During the decoding process, the FEC decoder 122 decodes the RX SerDes output to produce output data 134. The underlying bits of the output data 134 have significantly better (i.e., lower) post-FEC BER than the pre-FEC BER observed at the SerDes RX output. In at least one embodiment, the FEC decoder 122 is a RS decoder (e.g., RSFEC-DEC). Other encoding and decoding FEC algorithms can be used for the encoding layer 106*a* and decoding layer 106*b***. It should be noted that the terms encoding/decoding layers are generic terms, but the functionality of these layers can be found in systems that use other terminologies, such as physical coding sub-layer (PCS), or the like. Other standards bodies may have other names for where such functionality resides.

Figure 2:
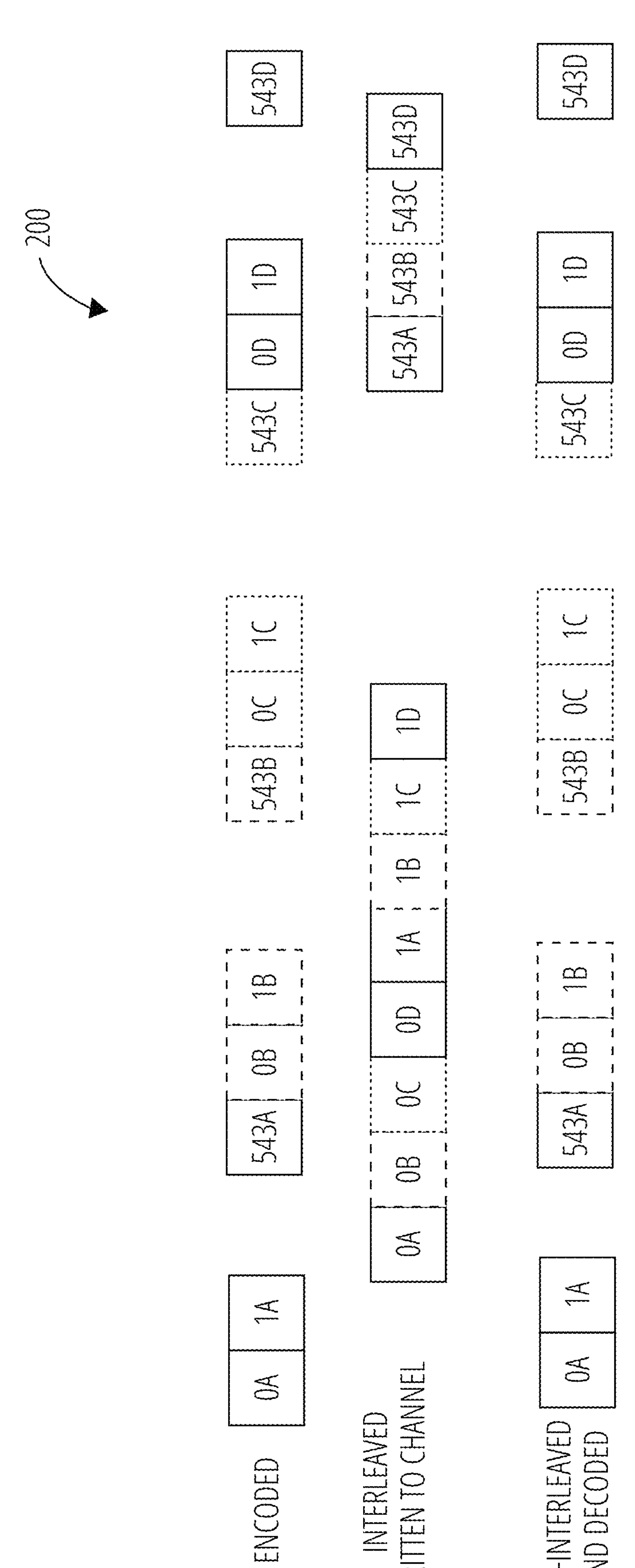
FIG. 2 illustrates an example of FEC symbol interleaving with an interleave factor of four for an encoded FEC codeword according to at least one embodiment.

In addition, interleaving may be applied in conjunction with the FEC system. In at least one embodiment, the encoding layer **106*a* can include the FEC encoder 118 and a first interleaver 120. In at least one embodiment, the decoding layer 106*b* can include the FEC decoder 122 and a second interleaver 124. The second interleaver 124 may also be called a 'de-interleaver." This interleaving for the FEC encoder 118 (RSFEC) is denoted as RSILE for the first interleaver 120 in the encoding layer 106*a* and RSILD for the second interleaver 124 in the decoding layer 106*b*. The interleaving may be of various types either operating on bits, pairs of bits, or FEC symbols. Depending on the interleaver type, the first interleaver 120 reorders groups of bits, pairs of bits, or FEC symbols, on the encoding side and the second interleaver 124 performs the reverse operation on the decoding side. A common form of interleaving is FEC symbol interleaving by an interleave factor (denoted as RSIL) when used in conjunction with the FEC encoder 118 (RSFECENC). An example of FEC symbol interleaving with RSIL=4 is shown in FIG. 2** for an encoded FEC codeword size of Nfec=544. It should be noted that the use of an interleaver causes additional latency through the communication system. The higher the interleave factor, the longer the additional latency.

FIG. 2 illustrates an example of FEC symbol interleaving with an interleave factor of four for an encoded FEC codeword 200 according to at least one embodiment. The encoded FEC codeword 200 has a codeword size of 544. Each square represents one FEC symbol and each line pattern represents an adjacent FEC codeword after initial encoding.

Referring back to FIG. 1, as described above, there are FEC-related parameters 136 of the FEC system 104 that can be adjusted by the controller 102. Conventionally, FEC-related parameters 136 are static in a conventional FEC system, locking the conventional FEC system into a specific a priori chosen performance/power/latency tradeoff. The controller 102, as described in the various embodiments here, determines a post-FEC correlated performance metric indicative of an estimated post-FEC BER of the FEC system 104 in order to optimize post-FEC BER performances of the FEC system 104. The post-FEC correlated performance metrics are metrics that correlate well with post-FEC BER performance. The controller 102 can dynamically adapt the FEC-related parameters 136 of the FEC system 104 to optimize the post-FEC BER performance. The FEC-related parameters 136 can be encoding/decoding layer parameters. In at least one embodiment, the FEC-related parameters 136 includes an interleave factor (RSIL).

In at least one embodiment, the transmitter circuit 112 and receiver circuit 114 have link parameters 140. The link parameters 140 can be SerDes parameters. In at least one embodiment, the link parameter is a phase noise parameter of a phase-locked loop (PLL) of the receiver circuit 114. In at least one embodiment, the controller 102 can dynamically adapt the link parameters 140 of the transmitter circuit 112 and receiver circuit 114 to optimize the post-FEC BER performance. It should be noted that conventionally, the link parameters 140 could be adjusted, but the link parameters 140 were adjusted based on some pre-FEC performance criteria. That is, a conventional controller would only measure the pre-FEC BER performance to optimize the SerDes parameters. As described above, there is no practical way to measure the post-FEC BER performance of the FEC system 104 directly for low post-FEC BERs where a system would typically operate. Thus, the embodiments described herein use one or more post-FEC correlated performance metrics indicative of an estimated post-FEC BER of the FEC system 104 in order to optimize the post-FEC BER performance of the FEC system 104. The post-FEC correlated performance metric are metrics that correlate with post-FEC BER performance. The embodiments described herein can modify link parameters 140 and/or FEC-related parameters 136 to optimize the post-FEC BER performance of the FEC system 104. The link parameters 140 can be adapted either directly on the SerDes hardware (e.g., transmitter circuit 112 and receiver circuit 114) or through use of an external controller (e.g., controller 102).

Also, the receiver circuit 114 (SerDes RX) also typically has an associated pre-FEC signal-to-noise ratio (SNR) which can be characterized. A nominal SNR, SNRnom, can be measured by taking the variance of a large number of equalized error samples and is mainly reflective of pre-FEC performance and pre-FEC BER.

In at least one embodiment, the controller 102 can receive the equalized error data 138 from the receiver circuit 114. Alternatively, the controller 102 can receive SNR data from the receiver circuit 114. The controller 102 can determine a SNR deviation metric (post-FEC correlated performance metric) using equalized error data 138 (or the SNR data) received from the receiver circuit 114. The controller 102 can adapt encoding/decoding layer parameters (FEC-related parameters 136) and/or SerDes parameters using the SNR deviation metric (post-FEC correlated performance metric).

In at least one embodiment, the controller 102 can adapt (i) FEC-related parameters 136, such as the interleave factor to optimize post-FEC BER performance through the use of different post-FEC correlated performance metrics reflective of post-FEC BER performance. In at least one embodiment, the controller 102 can adapt (ii) link parameters 140, such as SerDes parameters, to optimize post-FEC BER performance through the use of different post-FEC correlated performance metrics reflective of post-FEC BER performance. The different post-FEC correlated performance metrics, also referred to as adaptation metrics, can be based on (i) an SNR histogram difference metric, and/or (ii) a codeword histogram difference metric (e.g., based on FEC symbol error auto-correlation function (ACF). The SNR histogram difference metric can be computed by comparing a measured SNR histogram to a target SNR histogram. The codeword histogram difference metric can be computed by comparing measured FEC codeword histogram to a desired target histogram.

Link Parameters

As described herein, the controller 102 can adapt link parameters 140, such as SerDes parameters, to optimize post-FEC BER performance through the use of different post-FEC correlated performance metrics reflective of post-FEC BER performance. Examples of link parameters can include the following examples:

- Analog front end (AFE) parameters such as continuous time linear equalizer (CTLE) peaking/boost setting, low frequency gain setting, low frequency pole/zero (corner frequency) setting, mid frequency gain setting, mid frequency pole/zero (corner frequency) setting.
- Receiver feed forward equalizer (RXFFE) fixed tap settings such as first post-cursor f(1), or first pre-cursor f(−1) setting which also significantly affect the phase response of the RXFFE
- Number of RXFFE taps enabled
- Number of decision feed forward equalizer (DFFE) taps enabled
- Number of digital echo cancellation (DEX) taps enabled
- Number of analog echo cancellation (AEX) taps enabled
- Maximum likelihood sequence detector (MLSD) trace back depth (also known as path memory)—although this choice does not directly affect SNR histograms, if SNR histograms indicate a poor quality link, the path memory length could be increased
- Periodic adaptation time of the equalizer to optimize AFE/RXFFE/DFFE equalization values in the presence of temperature drift. Too short of an adaptation time may result in poor equalization giving undesired SNR histograms.
- Linkup time/number of iterations for AFE/RXFFE optimization-too short of a link up time may result in poor equalization giving undesired SNR histograms.

Alternatively, the controller 102 can adapt other link parameters 140 to optimize post-FEC BER performance through the use of different post-FEC correlated performance metrics reflective of post-FEC BER performance. Also, as described herein, the controller 102 can adapt both link parameters 140 and FEC parameters together.

FEC Parameters

As described herein, the controller 102 can adapt FEC parameters to optimize post-FEC BER performance through the use of different post-FEC correlated performance metrics reflective of post-FEC BER performance. Examples of FEC parameters can include the following examples.

- FEC RS interleaving factor-already discussed in a lot of detail
- Concatenated scheme: FEC BCH interleaving factor (assuming SNR metric is processed through BCHIL like functionality)
- Hard and soft decision decoding of BCH or RS FEC—although this choice does not directly affect SNR histograms, if SNR histograms indicate poor quality link, may choose to enable soft decision decoding
- BCH coding/decoding enabled or not—although this choice does not directly affect SNR histograms, if SNR histograms indicate poor quality, may choose to enable BCH coding/decoding
- FEC coding scheme. Although this choice does not directly affect SNR histograms, if SNR histograms indicate poor quality link, may choose to use a more powerful FEC code which allows for correction of more errors per FEC codeword. Good quality links could use a simpler code to save power.

Link/FEC retry or not. If SNR histograms indicate a very poor quality link, the controller may request transmitter to retransmit the data.

Alternatively, the controller 102 can adapt FEC parameters to optimize post-FEC BER performance through the use of different post-FEC correlated performance metrics reflective of post-FEC BER performance. Also, as described herein, the controller 102 can adapt both link parameters 140 and FEC parameters together.

Post-FEC Correlated Performance Metric Based on SNR Deviation Metrics

As described above, the controller 102 can measure a nominal SNR, SNRnom. In further embodiments, the controller 102 can examine detailed SNR properties beyond SNRnom. These SNR properties can be reflective of expected good or bad post-FEC performance. In particular, the detailed nature of the SNR can be reflective of expected good or bad post-FEC behavior and provide the corresponding ability to either adapt the link parameters 140 (SerDes parameters) or the FEC-related parameters 136, such as interleaving factor. Even though two SerDes circuits may have the same nominal SNRnom, the detailed nature of the SNR may be quite different and indicative of good or bad post-FEC behavior. This can be exploited in a specific manner as described in more detail below.

As described above, a SerDes has many parameters it adapts either directly on the SerDes hardware or through use of an external controller. Conventionally, these parameters optimize the SerDes BER performance based on some pre-FEC performance criteria. The controller 102, however, can optimize SerDes parameters based on post-FEC performance criteria. Moreover, since it is not practical to measure post-FEC BER directly, adaptation metrics that correlate to post-FEC BER performance can be used by the controller 102. In particular, depending on the specific nature of impairments impacting the communication channel 116, the errors at the output of the SerDes detector may be random or highly correlated with the former leading to better post-FEC performance and the latter leading to degraded or adverse post-FEC performance. The SNR deviation metrics can be used to distinguish between the two cases and allow link parameters 140 (SerDes parameters) or FEC-related parameters 136 to be adapted or chosen accordingly. In at least one embodiment, the controller 102 can adapt link parameters 140 (SerDes parameters) to optimize post-FEC BER performance, adapt or choose FEC-related parameters 136, or both, dynamically to optimize performance tradeoffs instead of being static in a system thus locking the system into a specific a priori chosen performance/power/latency tradeoff where the latency referred to is latency through the FEC system which is also influenced by the choice of parameters such as the FEC interleaving factor.

In at least one embodiment, the controller 102 can determine a post-FEC correlated performance metric based on comparing a measured SNR histogram to a target SNR histogram to compute an SNR histogram difference metric (also referred to as SNR deviation metric). The SNR histogram difference metric can be examined and used to adapt or choose the link parameters 140 (SerDes parameters) or the FEC-related parameters 136. By examining the SNR deviation metrics, larger interleave factors can be used for links exhibiting error statistics with high histogram deviation as compared to those typically chosen for a nominal system with nominal types of impairments.

In at least one embodiment, to optimize post-FEC performance, the SNR deviation metrics can be used as indicators of post-FEC performance. An algorithm can be used to adjust the relevant FEC or SerDes parameters to meet an adaptation completion criterion for the selected SNR deviation metrics. The SNR deviation metrics can be based on comparing a measured SNR histogram to a desired target SNR histogram and computing a difference metric based on the difference of the measured and target SNR histograms. An algorithm, such as described below, can be used to choose the target SNR histogram.

Described below are the details of the SNR deviation metrics and other adaptation metrics that are used to drive the adaptation of either the FEC-related parameters 136 and/or link parameters 140.

In at least one embodiment, a SerDes transmitter (TX) (e.g., 112) typically transmits a binary data sequence, modulate it with some pulse amplitude modulation format such as PAM2 having two amplitude levels or PAM4 having four amplitude levels. These are example modulation formats, others can be considered. The modulated sequence may be equalized with transmit equalization and sent through the communication channel 116, followed by a SerDes receiver (RX) equalizer (e.g., 114) to produce a received equalized output y(n) which may be equalized to a non-return to zero (NRZ) target or to a partial response (PR) target. If transmitting a known pseudo-random binary sequence (PRBS) through the link (116), a received error signal errtrue(n) can be computed with respect to the known transmitted bits converted to the corresponding equalized/modulated signal ytx(n), as expressed in Equation 1:

$$errtrue(n) = y(n) - ytx(n) \quad \text{(Equation 1)}$$

If a known PRBS sequence is not used, the SerDes RX can still compute a received detected error signal, errdet(n), using a sliced or data detected estimate of ytx(n), which is called here ydet(n), as expressed in Equation 2:

$$errdet(n) = y(n) - ydet(n) \quad \text{(Equation 2)}$$

The traditional nominal SNR metric SNRnom is typically computed using the variance of the measured or detected error over a large number of samples as in the following Equation 3:

$$errdetvarnom = \frac{1}{K}\sum_{n=1}^{K} errdet(n)^2 \quad \text{(Equation 3)}$$

where K is typically a very large number to achieve good averaging, for example, $1e^5$ or $1e^6$ or more equalized samples. For simplicity, the expression above for the variance is based on assuming a nominally zero mean error sequence be it errtrue(n) or errdet(n). This will be the case in most systems, especially those which have explicit hardware/circuits to remove any non-zero DC mean. As is well known in the engineering community, a more general expression for the variance can remove the impact of any non-zero mean with only minor changes, as expressed in Equation 4:

$$errdetvarnom = \frac{1}{K}\sum_{n=1}^{K}(errdet(n) - errdetmn)^2 \quad \text{(Equation 4)}$$

where errdetmn is the mean of the errdet(n) sequence and can be computed as follows in Equation 5:

$$errdetmn = \frac{1}{K}\sum_{n=1}^{K} errdet(n) \quad \text{(Equation 5)}$$

However, for the sake of simplicity only, the simpler expression for variance computations is used throughout this disclosure. It should be understood that any of the subsequent expressions for variance could be modified to properly account for a non-zero mean.

If the nominal signal power in the transmitted signal power or received equalized signal is denoted as sigvar, then the SNRnom is traditionally computed as follows in Equation 6:

$$SNRnom(\text{dB}) = 10 * \log 10(sigvar / errdetvarnom) \quad \text{(Equation 6)}$$

The signal power can be computed from the set of expected equalized signal values whose values will be from the set of values for ytx(n) or ydet(n). For example, for a PAM4 modulated system with transmitted symbol values of 3, 1, −1, −3, the nominal signal power can be computed as follows in Equation 7:

$$sigvar = (1/4) * (3\hat{\ }2) + (1/4) * (1\hat{\ }2) + (1/4) * ((-1)\hat{\ }2) + (1/4) * ((-3)\hat{\ }2) = 5 \quad \text{(Equation 7)}$$

In the expression, the factors of (¼) represented the probability of occurrence for each possible PAM4 symbol value. For a partial response (PR) equalized system, the signal variance can be computed based on the received expected PAM4 PR symbols. For example, for a (1+D) PR1 system, the PAM4PR1 system symbol values will be 6, 4, 2, 0, −2, −4, −6 and sigvar can be computed in a similar fashion while accounting for the probability of occurrence of each specific symbol value.

Having described the SNR calculation, it can be observed that using a single number, such as described above, does not provide adequate insight into, or always correlate well with post-FEC performance behavior. As such, SNR metrics taken from a SNR histogram can be considered where each SNR values measured is defined over a window of time, L. From multiple such measured SNR values, a measured SNR histogram can be obtained over those multiple SNR values and compute a SNR deviation histogram with respect to some target SNR histogram. Exemplary values of L could be in the hundreds or thousands of equalized samples and chosen appropriately depending on the application. Over the time window of L received PAM2 or PAM4 (or other) modulated symbols or corresponding equalized samples, a statistical variance or equivalently a standard deviation of these error quantities can be computed as expressed in Equation 8 and Equation 9:

$$errtruevar = \frac{1}{L}\sum_{n=1}^{L} errtrue(n)^2 \quad \text{(Equation 8)}$$

$$errdetvar = \frac{1}{L}\sum_{n=1}^{L} errdet(n)^2 \quad \text{(Equation 9)}$$

If the nominal signal power in the transmitted signal power or received equalized signal (it is not critical which one is used) is denoted as sigvar then the SNR for the above error variants are denoted as follows in Equation 10 and Equation 11:

$$SNRTRUE(\text{dB}) = 10 * \log 10(sigvar / errtruevar) \quad \text{(Equation 10)}$$

$$SNRDET(\text{dB}) = 10 * \log 10(sigvar / errdetvar) \quad \text{(Equation 11)}$$

It should be noted that the SerDes RX may transfer raw error data, such as errtrue(n) or errdet(n), to the controller 102, and the controller 102 may compute the SNR and SNR deviation metrics. Alternatively, the SerDes hardware may compute the SNR metrics internally using appropriate hardware blocks to realize the Equation 10 and Equation 11, and the SNR data can be sent to the controller 102.

It may be beneficial for the value of L to be related to the FEC codeword size. In an exemplary system with the well known (Nfec=544, Kfec=514, Tfec=15) code defined over a Galois field of 10 bits, the codeword size is 544 FEC symbols or 5440 bits which for a PAM4 system is 2720 PAM4 symbols since each PAM4 symbol is comprised of 2 bits. Thus, a value of L=2720 may be desirable.

From the SNRTRUE or SNRDET data, the controller 102 can compile and generate the histogram or probability density function (PDF) statistics of the probability of occurrence of the various SNR values which are measured. A SNR histogram is essentially a mapping between the SNR value over window L and the probability of occurrence for that SNR value.

For example, the controller 102 can denote a measurement based histogram as $h_{SNR}$(SNRi), including possible measured values of the SNR (be it SNRTRUE or SNRDET), where i is an index which indexes a list of SNR values over which the histogram is computed. For example, a histogram could be computed over a range of SNRmin=14 to SNRmx=24 dB in steps of SNRstep=0.1 dB representing a list of say Q SNR values which would be indexed by i=1 to 101 where in this example Q=101. From many measurements of the SNR across, for example, NSNR=10000 measurements, the controller 102 can compute the measured SNR histogram. Each of these measurements consist of L individual measurements of the equalized error errtrue(n) or errdet(n) to obtain the errtruevar or errdetvar as previously described. Now suppose the SNR value of 19.2 occurs 10 times. For the above example of 14 to 24 dB with steps of 0.1 dB, the value 19.2 dB corresponds with index of i=53. Then the probability assigned to the 19.2 dB at index i=53 in the histogram is $10/NSNR=1e^{-3}$. The controller 102 can define a target histogram metric, referred to as target SNR histogram, $h_{SNRT}$(SNRi), as what is desirable or ideal. Also, let $h_{SNRL}$(SNRi) and $h_{SNRTL}$(SNRi) represent the logarithm base10 of the corresponding measured and target SNR histograms, as follows in Equation 12 and Equation 13:

$$h_{SNRL}(SNRi) = \log 10(hSNRi) \quad \text{(Equation 12)}$$

$$h_{SNRTL}(SNRi) = \log 10(hSNRTi) \quad \text{(Equation 13)}$$

The controller 102 can compute a difference metric, also referred to as SNR histogram difference metric, diffmet (SNRi), representing the absolute value of the deviation of the measured SNR histogram, $h_{SNRL}$(SNR), from the target at the ith value of the histogram as expressed in Equation 14:

$$diffmet(SNRi) = |h_{SNRL}(SNRi) - h_{SNRTL}(SNRi)| \quad \text{(Equation 14)}$$

where |x| refers to the absolute value of the quantity x. The overall difference metric, diffmet is then computed as follows in Equation 15:

$$diffmet = \sum_{i=1}^{Q} diffmet(SNRi) \quad \text{(Equation 15)}$$

Described below are details of how to obtain target SNR histogram, $h_{SNRT}$(SNRi). A healthy serial link/communication link will be such that the error sequences errtrue(n) and errdet(n) will behave like the well-known Gaussian error process with a particular mean and variance (or equivalently standard deviation) and associated Gaussian histogram. A Gaussian histogram distribution is uniquely determined if its mean and variance or standard deviation are specified. The standard Gaussian histogram distribution is expressed in Equation 16:

$$hGAU(x) = \frac{1}{\sigma\sqrt{2\pi}} e^{-\left(\frac{1}{2}\right)\frac{(x-\mu)^2}{\sigma^2}} \quad \text{(Equation 16)}$$

where e represents the exponential function, σ is the standard deviation (square root of variance) of the Gaussian, u is the mean of the Gaussian histogram distribution. In at least one embodiment, a target Gaussian histogram can be constructed with an algorithm as follows:

(i) measure SNR histogram $h_{SNRL}$(SNRi) from measured SNRs of a given channel (ii) From raw SNRs measure a conditional variance or standard deviation for SNR samples to right of the peak measured SNR value i.e., based on only SNR values which are higher than maximum measured SNR value. Hence the variance is a conditional variance.

(iii) Generate a target Gaussian histogram using the max value of the measured SNR histogram with some delta offset, deloff, from the value of the measured SNR histogram as the mean, μ, for the target Gaussian the prior conditional standard variance as the variance ($\sigma^2$) of the target Gaussian histogram.

The delta offset, deloff can be chosen in ad-hoc manner (but typically as a small number). The delta offset of 0.1-0.15 dB can work well. It should be noted that the choice of histogram computation parameters may also dictate the value of this offset. For example, if the measured SNR histogram is computed with a resolution of say 0.025 dB then values of deloff such as 0.025, 0.05, 0.075 dB could also be considered.

(iv) shift the Gaussian histogram max value to match measured histogram max value (v) Take the log of the Gaussian histogram (vi) compute a difference between the measured histogram and the Gaussian generated target histogram log values for same number of measured SNR samples (vii) Extend the Gaussian histogram to left of the mean and re-compute the histogram difference and subsequent final difference metric up to min value of the difference histogram such that consider min only after some index offset (imin) from the left to avoid any non-reliable values in the left tail of the histogram as expressed in Equation 17:

$$\text{diffmet\_final} = \sum_{i=imin}^{Q} diffmet(SNRi) \quad \text{(Equation 17)}$$

Examples of SNR Deviation metrics are described below with respect to FIG. 3A, FIG. 3B, FIG. 4A and FIG. 4B.

Figures 3A, 3B:
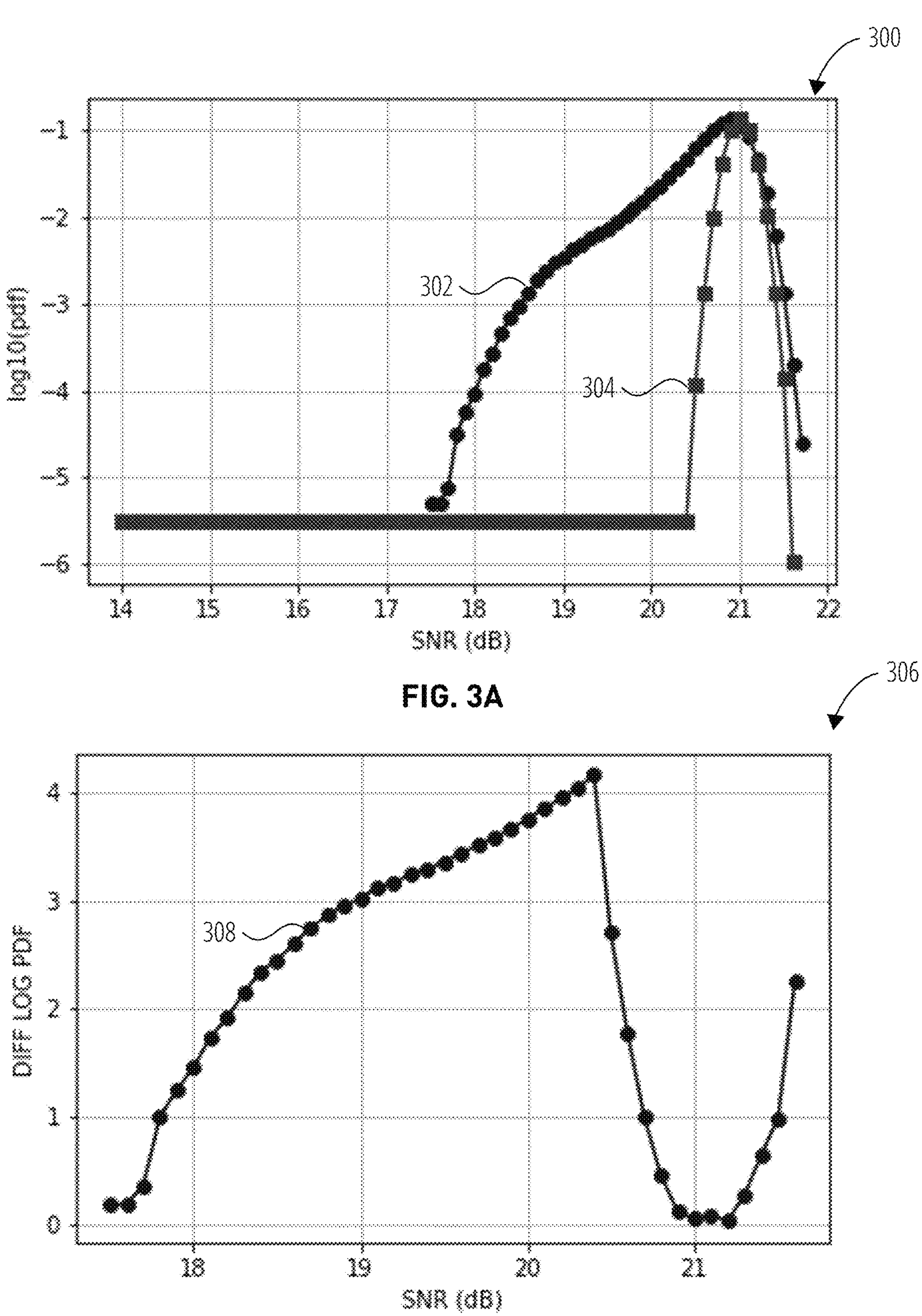
FIG. 3A shows a graph of examples of a measured signal-to-noise ratio (SNR) histogram and a target SNR histogram according to at least one embodiment.
FIG. 3B shows a graph of an example of an SNR histogram difference metric according to at least one embodiment.

FIG. 3A shows a graph 300 of examples of a measured SNR histogram 302 and a target SNR histogram 304 according to at least one embodiment. It should be noted that the SNR histograms are also known as probability density functions (PDFs). The measured SNR histogram 302, $h_{SNRL}$ (SNRi), corresponds to a communication channel with very bad impairments such that the errors at the SerDes output are heavily correlated and the SNR distribution deviates significantly from a Gaussian histogram. The target SNR histogram 304 is a target Gaussian histogram $h_{SNRTL}$(SNRi) obtained from an algorithm, such as described above.

FIG. 3B shows a graph 306 of an example of an SNR histogram difference metric 308 according to at least one embodiment. The plot in FIG. 3B shows the SNR histogram difference metric 308, diffmet(SNRi) described above. The SNR histogram difference metric 308 is the difference between the measured SNR histogram 302 and target SNR histogram 304 of FIG. 3A.

Figures 4A, 4B:
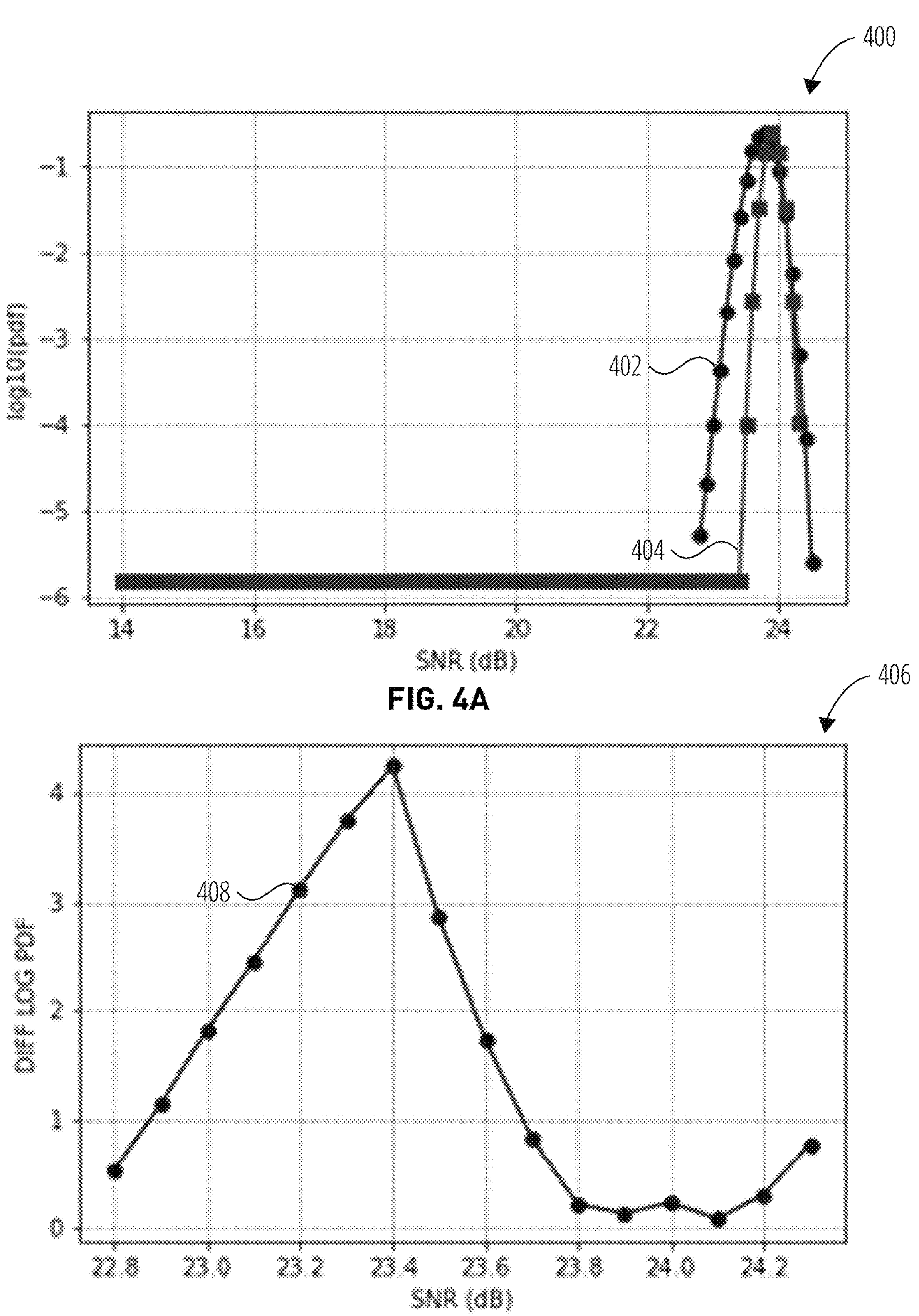
FIG. 4A shows a graph of examples of a measured SNR histogram and a target SNR histogram according to at least one embodiment.
FIG. 4B shows a graph of an example of an SNR histogram difference metric according to at least one embodiment.

FIG. 4A shows a graph 400 of examples of a measured SNR histogram 402 and a target SNR histogram 404 according to at least one embodiment. The measured SNR histogram 402, $h_{SNRL}$(SNRi), corresponds to a communication channel where the residual impairments are less adverse/correlated and thus the measured SNR histogram 402 is closer to that of a fitted Gaussian, the target SNR histogram 404, $h_{SNRTL}$(SNRi), obtained from an algorithm, such as described above.

FIG. 4B shows a graph 406 of an example of an SNR histogram difference metric 408 according to at least one embodiment. The plot in FIG. 4B shows the SNR histogram difference metric 408, diffmet(SNRi) described above. The SNR histogram difference metric 408 is the difference between the measured SNR histogram 402 and target SNR histogram 404 of FIG. 4A.

There are various preferred embodiments to adapt the FEC or SerDes parameters based on the SNR histogram metric. One such embodiment is shown in the flow chart of FIG. 5.

Figure 5:
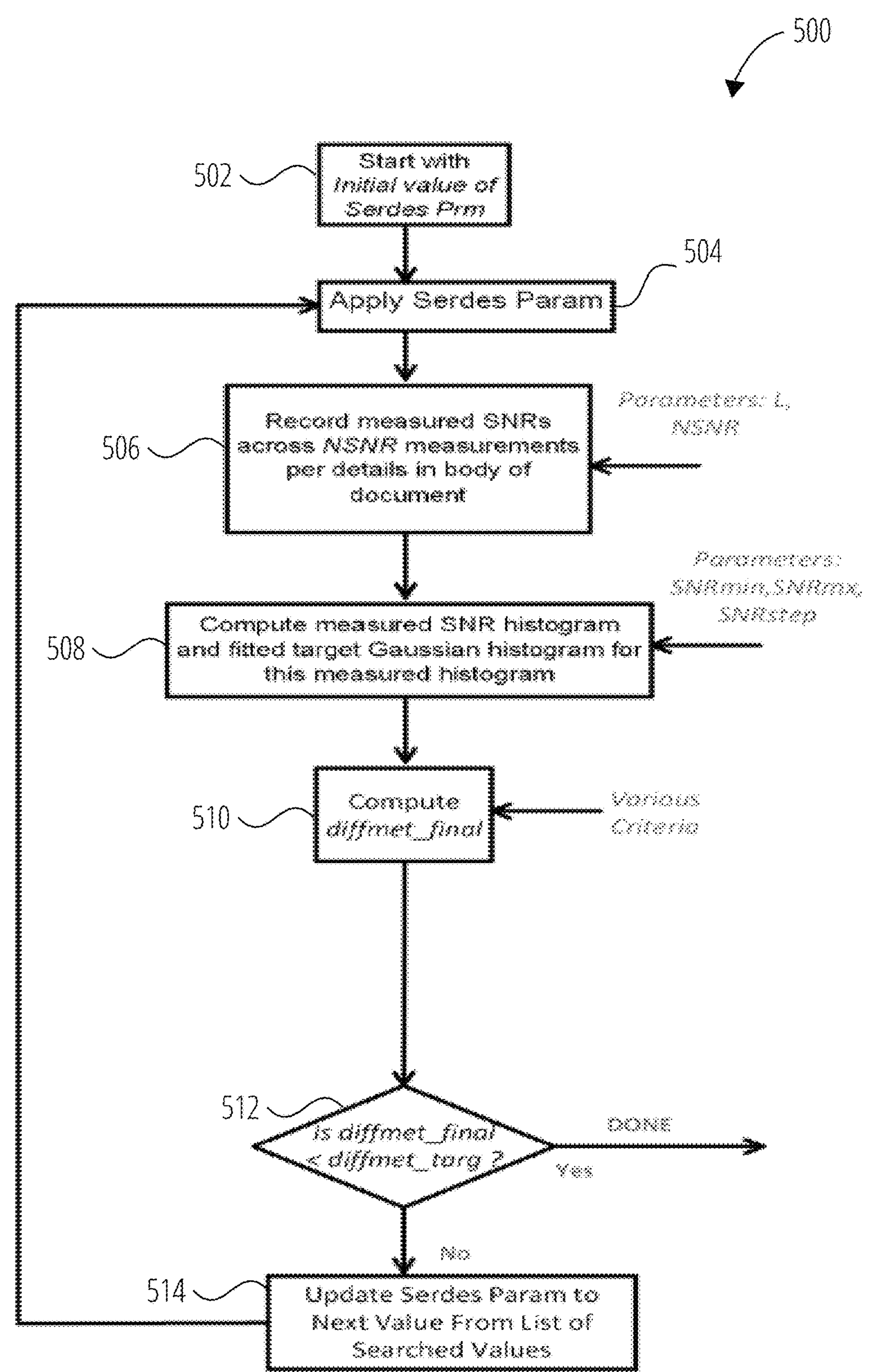
FIG. 5 is a flow diagram of an adaptation method for adjusting a SerDes parameter using an SNR deviation metric according to at least one embodiment.

FIG. 5 is a flow diagram of an adaptation method 500 for adjusting a SerDes parameter using an SNR deviation metric, diffmet_final, according to at least one embodiment. The method 500 can be performed by processing logic comprising hardware, software, firmware, or any combination thereof. In at least one embodiment, the method 500 is performed by the controller 102 of FIG. 1. In at least one embodiment, the method 500 is performed by the receiver 110 of FIG. 1. In at least one embodiment, an integrated circuit performs the method 500. In another embodiment, a first device having an FEC system or FEC circuitry performs the method 500.

Referring to FIG. 5, the method 500 begins with the processing logic setting an initial value of a SerDes parameter (block 502) and applying the SerDes parameter to the SerDes circuit (block 504). The processing logic records SNRs across NSNR measurements as described above (block 506). At block 506, the processing logic can use parameters L and NSNR as described above. The processing logic computes the measured SNR histogram and fitted target SNR histogram (i.e., fitted Gaussian histogram) for this measured SNR histogram (block 508). At block 508, the processing logic can use the parameters of SNRmin, SNRmax, SNRstep as described above. At block 510, the processing logic computes the SNR histogram difference metric. At block 510, the processing logic can use various criteria for computing the SNR histogram difference metric. For example, one criterion could be how the summation indices of the Equation 17 could be controlled to compute the diffmet_final in Equation 17. Potentially the index, imin, and/or the max summation index, imax, could be changed in some embodiments. An exemplary value of imax can be imax=Q. At block 512, the processing logic can determine if the SNR histogram difference metric satisfies a criterion, such as the SNR histogram difference metric being less than a programmed target metric value diffmet_targ. If the SNR histogram difference metric satisfies the criterion at block 512, the processing logic ends the adaptation method 500. If the SNR histogram difference metric does not satisfy the criterion at block 512, the processing logic updates the initial value of the SerDes parameter to a next value from a list of searched values (block 514) and returns to apply the next value of the SerDes parameter to the SerDes circuit at block 504. Here, the SerDes parameter can be adapted by searching through a pre-determined list of such parameters and choosing as the optimal one once the SNR deviation metric, diffmet_final, falls below some programmed target metric value diffmet_targ. For example in a communication link with echoes requiring digital echo cancellation, introducing more digital echo cancellation taps (DEX taps) will lead to better performance and smaller and smaller difference metric values of diffmet_final, such as illustrated in FIG. 6.

Figure 6:
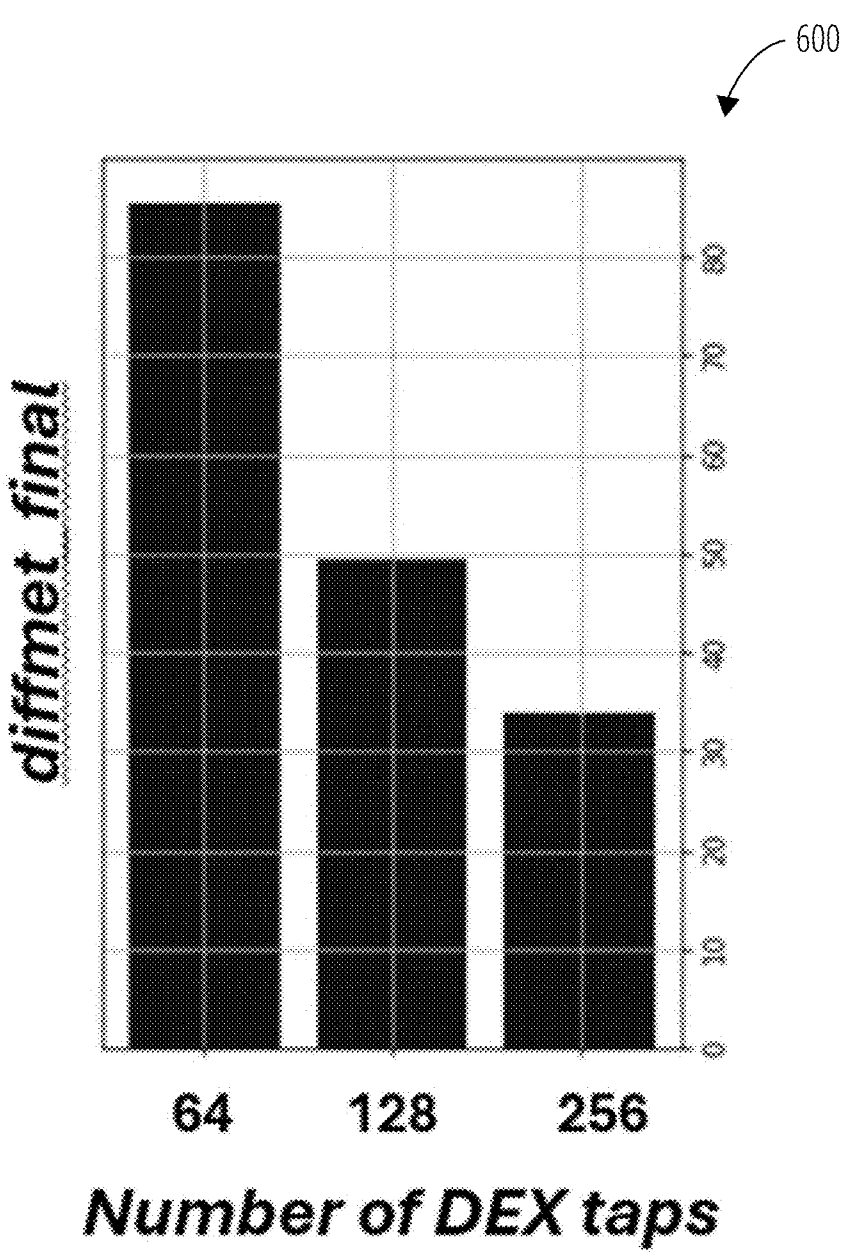
FIG. 6 shows a plot of an exemplary channel where the SNR deviation metric is plotted against the number of digital echo cancellation taps (DEX taps) according to at least one embodiment.

FIG. 6 shows a plot 600 of an exemplary channel where the SNR deviation metric, diffmet_final, is plotted against the number of digital echo cancellation taps (DEX taps) for DEX tap values of 64, 128, and 256. For example, a diffmet_targ value of 40 would choose the number of DEX taps to be 128.

Although FIG. 5 shows the adaptation of SerDes parameters, the method 500 can be done for FEC-related parameters, such as the interleaving factor. Although changing the interleaving factor RSIL may not affect the SNR deviation metric value, the SNR deviation metric value can invariably indicate whether or not more interleaving is needed for a healthier post-FEC margin. In particular, the more the measured SNR histogram deviates from a Gaussian PDF, the more beneficial interleaving will be for post-FEC BER performance enhancements. In one embodiment, given a range of application channels and representative impairment sets, the controller 102 can construct a look up table (LUT) of SNR deviation metric diffmet_final values or ranges and assign a different interleaving factor RSIL to them. In the hardware, once the diffmet_final value is computed, the controller 102 can determine the appropriate interleave factor to use. An exemplary LUT could be as follows in Table 1:

TABLE 1

| Computed diffmet_final Range | RSIL To Use |
|---|---|
| diffmet_final > 0 and diffmet_final <= 20 | 1 |
| diffmet_final > 20 and diffmet_final <= 40 | 2 |
| diffmet_final > 40 and diffmet_final <= 80 | 4 |
| diffmet_final > 80 | 8 |

As described herein, U.S. application Ser. No. 18/112,406 describes the use of different post-FEC correlated performance metrics, also referred to as adaptation metrics, to optimize post-FEC BER performance. The post-FEC correlated performance metrics were based on a codeword histogram difference metric based on FEC symbol error or FEC symbol error ACF based metrics. The codeword histogram difference metric can be computed by comparing measured FEC codeword histogram to a desired target histogram. These metrics and processes can be performed in connection with the SNR deviation metrics and processes described above. Additional details of using Post-FEC correlated performance metrics based on FEC symbol error data are described below and with respect to FIG. 7 to FIG. 12.

Post-FEC Correlated Performance Metric Based on FEC Symbol Error Data

In at least one embodiment, the controller 102 can also receive the FEC symbol error data 142 from the receiver circuit 114. The controller 102 can determine a post-FEC correlated performance metric using the FEC symbol error data 142. The controller 102 can adapt encoding/decoding layer parameters (FEC-related parameters 136 and/or SerDes parameters using the post-FEC correlated performance metric.

In at least one embodiment, the controller 102 can adapt (i) FEC-related parameters 136, such as the interleave factor to optimize post-FEC BER performance through the use of different post-FEC correlated performance metrics reflective of post-FEC BER performance. In at least one embodiment, the controller 102 can adapt (ii) link parameters 140, such as SerDes parameters, to optimize post-FEC BER performance through the use of different post-FEC correlated performance metrics reflective of post-FEC BER performance. The different post-FEC correlated performance metrics, also referred to as adaptation metrics, can be (i) based on a codeword histogram difference metric. The codeword histogram difference metric can be computed by comparing measured FEC codeword histogram to a desired target histogram. The different post-FEC correlated performance metrics can be (ii) based on FEC symbol error auto-correlation function (ACF).

In at least one embodiment, the controller 102, to optimize post-FEC performance, uses these metrics as indicators of post-FEC performance and then uses an algorithm to adjust the relevant FEC-related parameters 136 or link parameters 140 to meet an adaptation completion criterion for the selected metric. Table 2 shows the four possible combinations of which parameter to optimize and which adaptation metric to use.

TABLE 2

Four combinations of adaptation classes

| | | Post-FEC adaptation metric | |
|---|---|---|---|
| | | Codeword histogram target deviation metric | FEC symbol error ACF based metric |
| Parameter to adapt | FEC-related parameters | 1 | 2 |
| | Link parameters (e.g., SerDes parameters) | 3 | 4 |

The following description includes details of the two adaptation metrics used to drive the adaptation of the FEC-related parameters 136, the link parameters 140, or both. Both metrics are constructed from raw FEC symbol error statistics from the receiver circuit 114, which in turn are comprised of raw bit error statistics from the receiver circuit 114. The controller 102 can receive the raw bit error statistics from the receiver circuit 114 or can determine the bit error statistics based on information provided by the receiver circuit 114. It should be noted that in order for the receiver circuit 114 to compute actual raw bit error information it must be cognizant of the transmitted bits to be able to make a comparison of the received bits with transmitted bits to be able to determine whether a bit error occurred or not. As such, a bit error measurement can be made through the use of a training pattern, such as a pseudo-random bit sequence (PRBS) pattern known to both the transmitter circuit 112 and receiver circuit 114.

For example, let e(n) be the bit error stream at bit time n at the output of the receiver circuit 114. Thus, when a bit is in error, the bit error stream will have e(n)=1, and when a bit is not in error, the bit error stream will have e(n)=0. A FEC symbol error stream fe(m) at FEC symbol times, m, can be constructed from the bit error stream e(n). For a given FEC, let L be the number of bits in a FEC symbol. The FEC symbol error is obtained from examining contiguous groups of L bits. If in any group of L bits, i.e., bits in a FEC symbol, corresponding with the mth group of such bits, any bit is in error, then the corresponding FEC symbol is declared to be in error, i.e., fe(m)=1. Only if none of the bits in the group of L bits is in error, then the FEC symbol is declared to not be in error, i.e., fe(m)=0. This can also be equivalently represented in the following Equation 18:

$$fe(m) = \sum_{i=n-(L-1)}^{n} e(n-i), \quad \text{(Equation 18)}$$

where it should be noted that the sum represents an 'or' sum.

For example, for L=8, the following Equation 19 could be used:

$$fe(m) = e(n-7) \oplus e(n-6) \oplus e(n-5) \oplus e(n-4) \oplus e(n-3) \oplus e(n-2) \oplus e(n-1) \oplus e(n) \quad \text{(Equation 19)}$$

where $\oplus$ represents the 'or' logical operator. Another exemplary value for L could be L=10.

The FEC symbol errors fe(m) can now be used to construct the post-FEC correlated performance metric, which are indicative of and well correlated to post-FEC BER performance.

Codeword Histogram (CWH) Deviation Metric

In at least one embodiment, the post-FEC correlated performance metric is a Codeword Histogram (CWH) Deviation Metric. From the FEC symbol error stream, the controller 102 can compile and generate a histogram or probability density function (PDF) statistics of the probability of occurrence of the number of FEC symbol errors in a given FEC codeword of size Nfec from a set of FEC symbol error measurements spanning Ncw codewords. A codeword histogram is essentially a mapping between the number of FEC symbol errors in a given a codeword of size Nfec and the probability of occurrence for that many FEC symbol errors. Table 3 shows in a tabular format an example of such a codeword histogram:

TABLE 3

Example of Codeword Histogram

| Number of FEC Symbol Errors in Codeword of Length Nfec (i) | Probability of Occurrence hm(i, ber) |
|---|---|
| 0 | 0.889 |
| 1 | 1e−1 |
| 2 | 1e−2 |
| 3 | 1e−3 |
| 4 | 0 |
| 5 | 0 |
| And so on . . . | 0 |

A measurement-based histogram of the probability of occurrence can be denoted as $h_m$(i,ber), where i represents the index of how many FEC symbol errors there are (first column of Table 3) and ber represents the pre-FEC BER at which the codeword measurements were taken.

A target codeword histogram metric, $h_t$(i,ber), which is deemed achievable, can be computed apriori and stored in a look up table (LUT) as part of the controller 102.

Also let $h_{ml}$(i,ber) and $h_{tl}$(i,ber) represent the logarithm base10 of the corresponding measured and target codeword histograms, as follows in Equation 20 and Equation 21:

- $h_{ml}(i, ber) = \log 10(h_m)$

- $h_{tl}(i, ber) = \log 10(h_t)$

A difference metric, diffmet(i), representing an absolute value of a deviation of the actual measured codeword histogram $h_m$(i,ber) from the target at the ith value of the histogram can be computed as follows in Equation 22:

$$diffmet(i)=|h_{ml}(i,ber)-h_{tl}(i,ber)|,$$

where |x| refers to the absolute value of the quantity x.

The overall difference metric, diffmetcw, can then be computed as follows in Equation 23:

$$diffmetcw(ber)=\sum_{i=0}^{D}|h_{ml}(i,ber)-h_{tl}(i,ber)|,$$

where D represents the number of terms in the histogram over which the difference is computed.

The smaller the value of the difference metric, the better the post-FEC performance ber berpost is expected to be.

In addition, the controller 102 can compute and average the performance metric by averaging the difference metric across multiple measurements of the pre-FEC BER, ber. Such an averaged difference metric can be represented as follows in Equation 24:

$$diffmetcw_{av}=\frac{1}{J}\sum_{j=0}^{J}\sum_{i=0}^{D}|h_{ml}(i,ber_j)-h_{tl}(i,ber_j)|$$

There are various embodiments to adapt the FEC-related parameters 136 or link parameters 140 based on the codeword histogram metric. One such embodiment is shown in the flow chart of FIG. 7.

Figure 7:
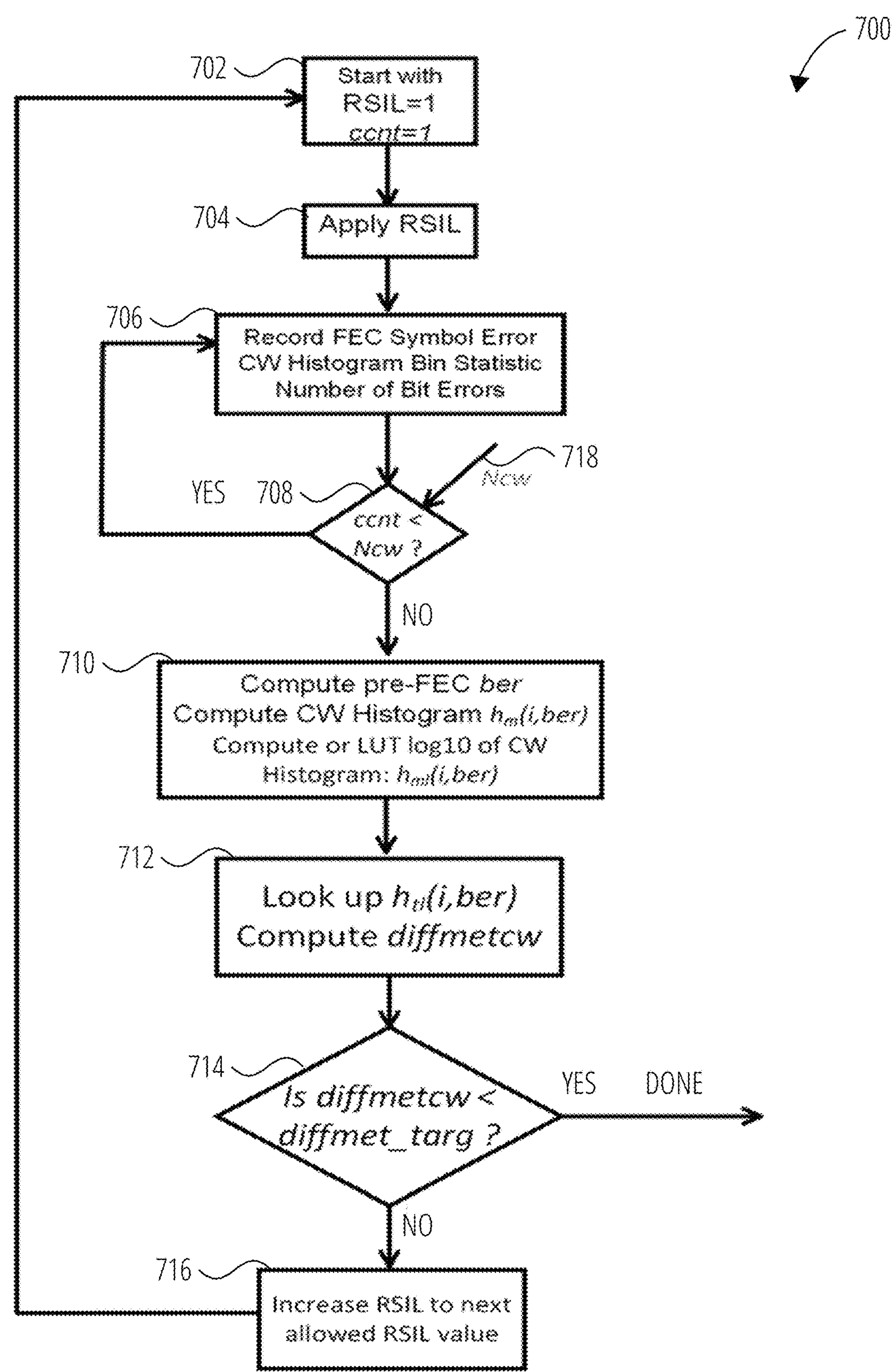
FIG. 7 is a flow diagram of a method of adapting FEC-related parameters based on a codeword histogram metric according to at least one embodiment.

FIG. 7 is a flow diagram of a method 700 of adapting the FEC-related parameters based on the codeword histogram metric according to at least one embodiment. The method 700 can be performed by processing logic comprising hardware, software, firmware, or any combination thereof. In at least one embodiment, the method 700 is performed by the controller 102 of FIG. 1. In at least one embodiment, the method 700 is performed by the receiver 110 of FIG. 1. In at least one embodiment, an integrated circuit performs the method 700. In another embodiment, a first device having an FEC system or FEC circuitry performs the method 700.

Referring to FIG. 7, the method 700 begins with the processing logic setting a minimum value of an interleave factor (e.g., RSIL=1) (block 702). In this example, the minimum value corresponds to no interleaving. The processing logic can successively increase the value of the interleave factor over a range of valid values (e.g., 1, 2, 4, 8) such that an optimal value for the interleave factor is determined. In this embodiment, the optimal value is determined as the one value when the corresponding difference metric, diffmetcw, or an averaged version of the difference metric, diffmetcw av, falls below a programmed difference metric target, diffmet_targ. The measurements can be done such that each diffmetcw or $diffmetcw_{av}$ is based on measurements over a total number of FEC codewords, Ncw.

In particular, at block 702, a count value is initialized to one. At block 704, the processing logic applies the current value of the interleave factor. The first instance, the interleave factor is one, representing no interleaving. At block 706, the processing logic records equalized error data. The processing logic can record the FEC symbol error codeword histogram bin statistics of the number of bit errors. At block 708, the processing logic determines whether the count value is less than the total number of FEC codewords 718, Ncw. If the count value is less than the total number of FEC codewords 718, the processing logic returns to continue recording the equalized error data at block 706. Once the count value reaches the total number of FEC codewords 718, the processing logic computes the pre-FEC BER, the codeword histogram, compute the log 10 of the codeword histogram or use a LUT having the pre-computed values (block 710). At block 712, the processing logic computes the codeword histogram difference metric, diffmetcw. The processing logic can use a LUT to look up the target codeword histogram. At block 714, the processing logic determines whether the codeword histogram difference metric is less than a target threshold, diffmet_target. If the codeword histogram difference metric is less than the target threshold, the processing logic ends the method 700. However, if the codeword histogram difference metric is not less than the target threshold, the processing logic increments the interleave factor (RSIL) and returns to block 702. This method 700 continues until the codeword histogram difference metric is less than the target threshold at block 714.

In at least one embodiment, the processing logic can search for the interleave factor that gives a minimum codeword histogram difference metric. In another embodiment, the processing logic tracks how the codeword histogram difference metric is changing, and stops and selects the interleave factor that results in the least change in the codeword histogram difference metric or the averaged version of the difference metric, diffmetcw av from the prior value of the metric at the prior interleave value.

In another embodiment, the target histogram $h_t$(i,ber) can depend on the specific transmitter/receiver architecture (e.g., SerDes architecture). It is possible to choose an "ideal" target corresponding to a given architecture. In addition, a global or common target metric can be a codeword histogram which would be obtained if all the FEC symbol errors at the output of the receiver circuit (e.g., SerDes output) were random. Such a histogram can be calculated analytically and apriori using binomial distribution equations and such a histogram can be stored in a LUT. This histogram can be the "random model" histogram, denoted as $h_r$(i,ber) or its log 10 version as $h_{rl}$(i,ber). As described above, values $h_{rl}$(i,ber) can be stored and accessed through a LUT as a function of i and the pre-FEC bit error rate ber. The target histogram could also be chosen based on a particular receiver equalization system design. For example for a partial response equalized system, a target specifically expected for that partial response system could be computed and stored in the LUT.

Figure 8B:
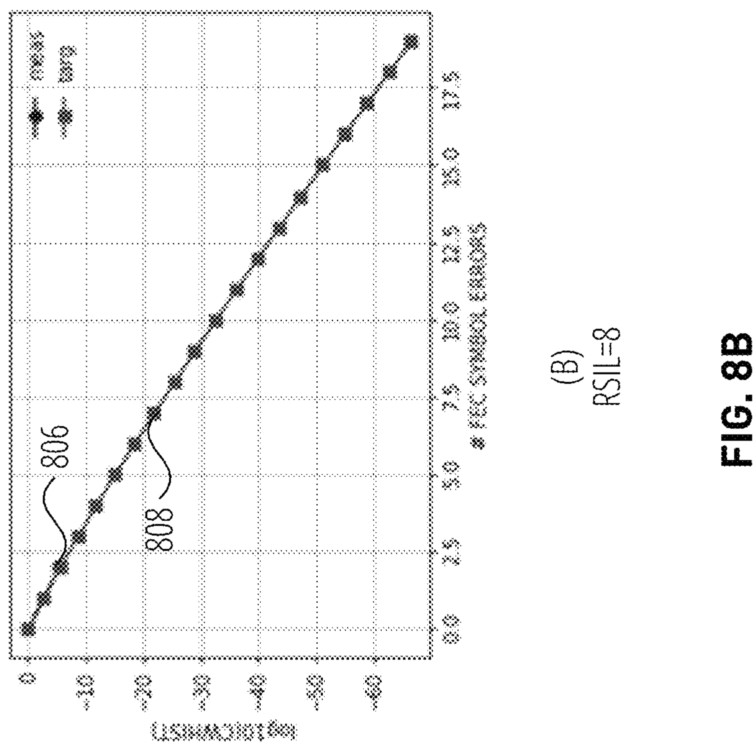
FIG. 8B illustrates an example of a measured FEC codeword histogram and a target FEC codeword histogram with an interleave factor of eight based on a random error model according to at least one embodiment.
Figure 8A:
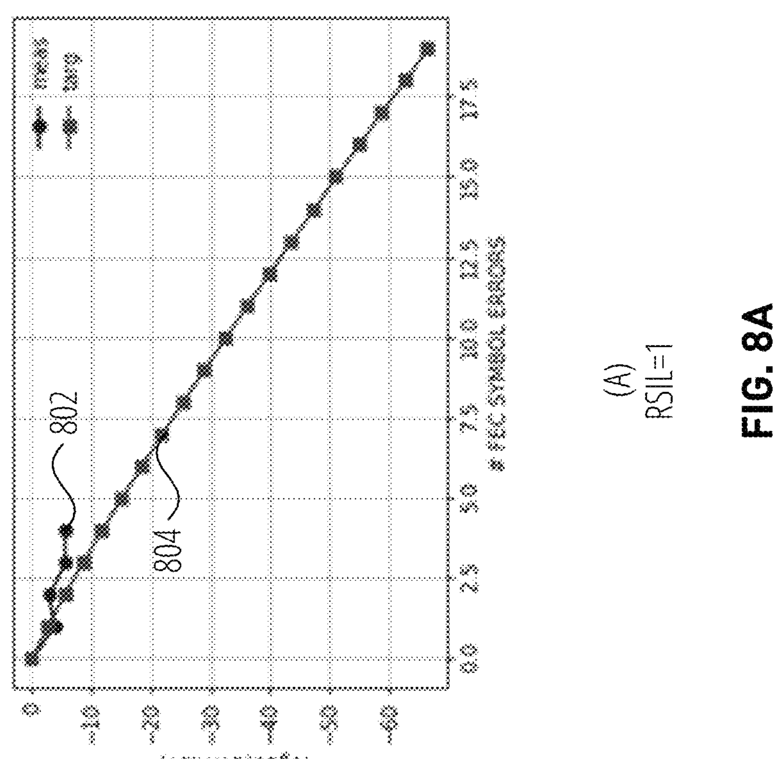
FIG. 8A illustrates an example of a measured FEC codeword histogram and a target FEC codeword histogram without interleaving based on a random error model according to at least one embodiment.

FIG. 8A illustrates an example of a measured FEC codeword histogram 802 and a target FEC codeword histogram 804 without interleaving (e.g., RSIL=1) based on a random error model according to at least one embodiment.

FIG. 8B illustrates an example of a measured FEC codeword histogram 806 and a target FEC codeword histogram 808 with an interleave factor of eight based on a random error model according to at least one embodiment. As illustrated in FIG. 8A and FIG. 8B, the plots are for different interleave factors (RSIL values) of one and eight, respectively. These curves are shown at a given BER, which is the same across all cases.

Figure 9:
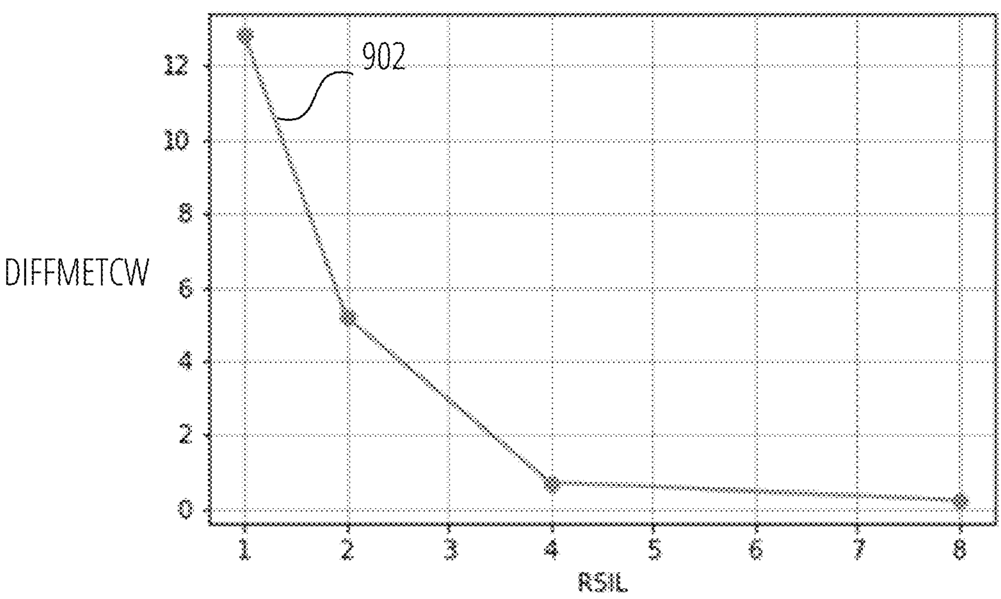
FIG. 9 is a graph showing a codeword histogram difference metric as a function of interleave factor according to at least one embodiment.

FIG. 9 is a graph showing a codeword histogram difference metric 902, diffmetcw, as a function of interleave factor according to at least one embodiment. This example is for a particular scenario of a SerDes circuit and channel and uses $h_{rl}$(i,ber) as the target FEC codeword histogram 808. As illustrated in FIG. 9, the observed measured codeword histogram difference metric 902 improves by increasing the interleave factor (RSIL).

Auto-Correlation Function (ACF) Metric

Another post-FEC correlated adaptation metric can be auto-correlation function (ACF) metric used to adapt FEC-related parameters and/or link parameters. Here, a well-known ACF can be computed, Rf(j) of the FEC symbol error stream fe(m) according to an ACF definition as follows in Equation 25.

$$Rf(j) = \frac{1}{Nacf}\sum_{j=0}^{Nacf} fe(m)fe(m+j)$$

A normalized version of the ACF Rfn(j) can be computed as follows in Equation 26:

$$Rfn(j) = \frac{1}{Rf(0)}Rf(j)$$

This function can be expressed in the log domain as follows in Equation 27:

$$Rfnl(j) = 20\ \log\ 10(Rfn(j))$$

It should be noted that the number of FEC symbol errors Nacf over which Rf(j) is computed should be chosen large enough such that the number of non-zero FEC symbol errors in fe(m) is sufficiently large. In practice, Nacf may have to be allowed to vary until a criterion is satisfied such as the number of non-zero FEC symbol errors is a programmed value denoted by a span, S. For example, the span, S, could be 100 or 1000 or larger. The larger the value of S, the more accurate the Rf(j) calculation is, but at the expense of computation complexity, storage requirements, memory requirements on the collection of fe(m) symbols.

From the ACF function Rfnl(j), a criterion, of which there are multiple possibilities, can be used to compute an ACF metric which can be compared to a desired target ACF metric value. In general, it is better for post-FEC performance for terms Rfnl(j), j unequal to 0 to be small as possible. Various computations can be used for the ACF metric to determine whether the ACF metric is below a desired target ACF metric value (i.e., Rfmet<Rfmet_targ). There are three examples below of such metric options that vary in complexity in the following Equation 28, Equation 29, and Equation 30:

$$Rfmet = |Rfnl(1)|(\text{a single term metric})$$

$$Rfmet = |Rfnl(1)| + |Rfnl(2)|(\text{two term metric})$$

$$Rfmet = \sum_{j=1}^{Nacfterms} |Rfnl(j)|(\text{multi-term metric})$$

The last option is a multi-term metric. Another option is a weighted average metric which gives more or less weights, wt(j), to specific Rfnl terms, as expressed below in Equation 31:

$$Rfmet = \sum_{j=1}^{Nacfterms} wt(j)|Rfnl(j)|\ (\text{weighted multi-term metric})$$

An example of an adaptation of an encoding/decoding parameter (e.g., RSIL) using an ACF metric is described below with respect to FIG. 10. In this example, an interleave factor is set to 1 and increased until the ACF metric falls below a certain desired target metric.

Figure 10:
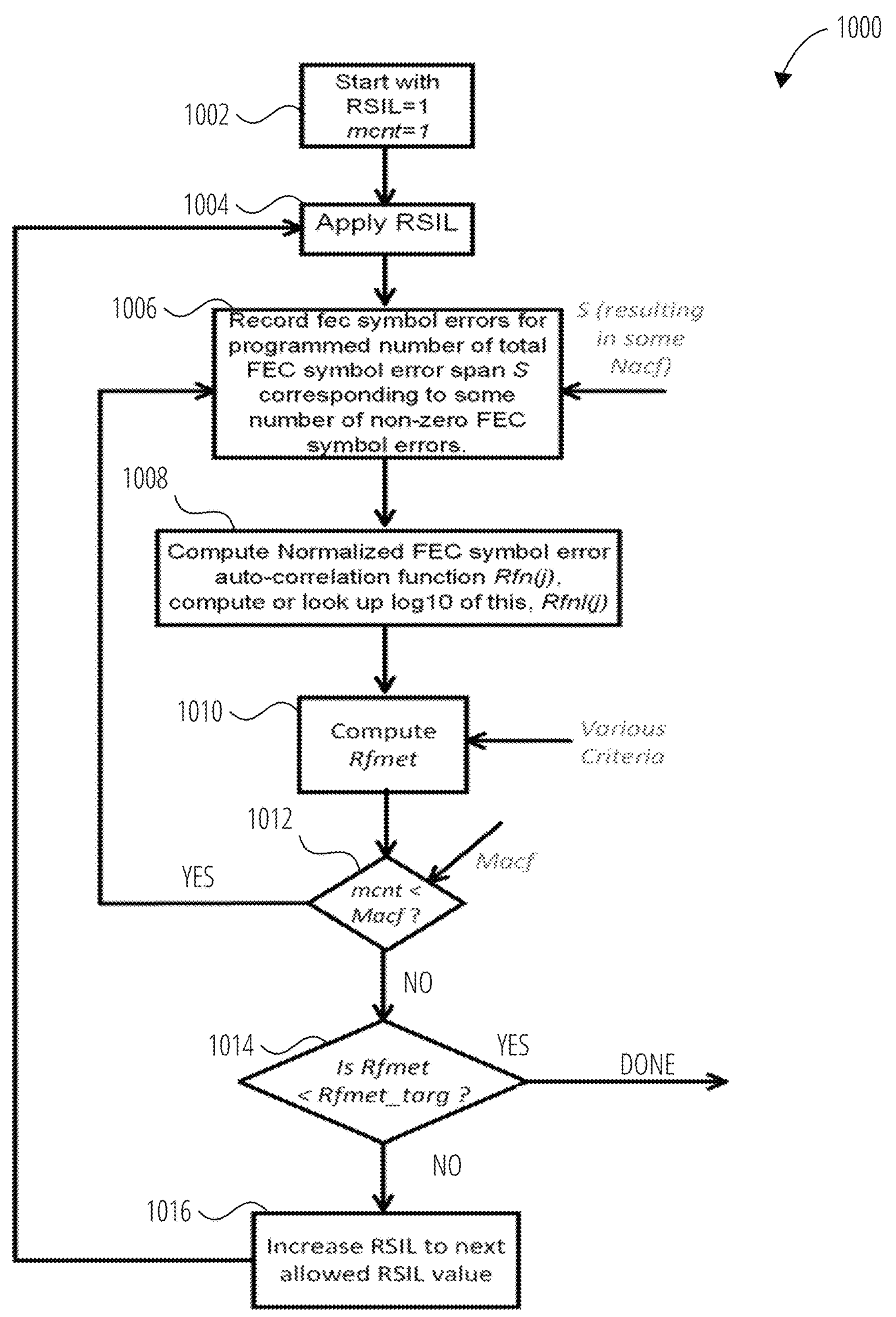
FIG. 10 is a flow diagram of a method of adapting an FEC-related parameter based on an auto-correlation function (ACF) metric according to at least one embodiment.

FIG. 10 is a flow diagram of a method of adapting an FEC-related parameter based on an auto-correlation function (ACF) metric according to at least one embodiment. The method 1000 can be performed by processing logic comprising hardware, software, firmware, or any combination thereof. In at least one embodiment, the method 1000 is performed by the controller 102 of FIG. 1. In at least one embodiment, the method 1000 is performed by the receiver 110 of FIG. 1. In at least one embodiment, an integrated circuit performs the method 1000. In another embodiment, a first device having an FEC system or FEC circuitry performs the method 1000.

Referring to FIG. 10, the method 1000 begins with the processing logic setting a minimum value of an interleave factor (e.g., RSIL=1) (block 1002). In this example, the minimum value corresponds to no interleaving. The processing logic can successively increase the value of the interleave factor over a range of valid values (e.g., 1, 2, 4, 8) such that an optimal value for the interleave factor is determined. In this embodiment, the optimal value is determined as the one value when the corresponding ACF metric, Rfmet, falls below a programmed difference metric target, Rfmet_targ. The measurements can be done such that each Rfmet is based on measurements over a total number of FEC codewords, Macf.

In particular, at block 1002, a count value (mcnt) is initialized to one. At block 1004, the processing logic applies the current value of the interleave factor. In the first instance, the interleave factor is one, representing no interleaving. At block 1006, the processing logic records equalized error data. The processing logic can record the FEC symbol errors for a programmed number of total FEC symbol errors span, S, corresponding to some number of non-zero FEC symbol errors (Nacf). At block 1008, the processing logic computes a normalized FEC symbol error ACF, Rfn(j), and computes or looks up the log 10 of this, Rfnl(j). At block 1010, the processing logic computes the ACF metric, Rfmet, based on various criteria. At block 1012, the processing logic determines whether the count value is less than the total number of FEC codewords, Macf. If the count value is less than the total number of FEC codewords, Macf, the processing logic returns to continue recording the equalized error data at block 1006. Once the count value reaches the total number of FEC codewords, Macf, the processing logic determines whether the ACF metric, Rfmet, is less than a target threshold, Rfmet_targ (block 1014). If the ACF metric is less than the target threshold, the processing logic ends the method 1000. However, if the ACF metric is not less than the target threshold, the processing logic increments the interleave factor (RSIL)

and returns to block 1004. This method 1000 continues until the ACF metric is less than the target threshold at block 1014.

Figures 11A, 11B:
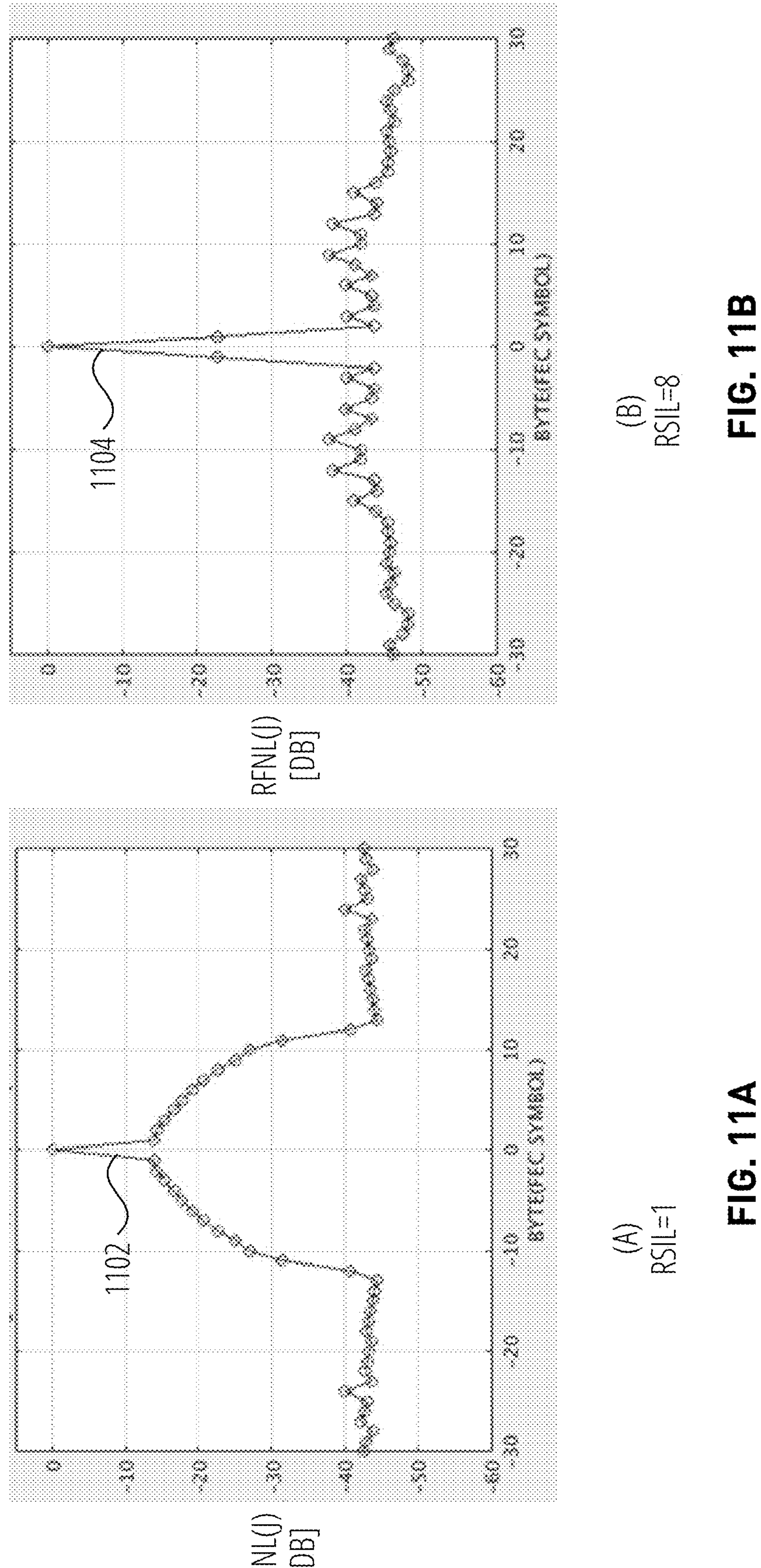
FIG. 11A illustrates an example of a measured ACF metric without interleaving according to at least one embodiment.
FIG. 11B illustrates an example of a measured ACF metric with an interleave factor of eight according to at least one embodiment.

FIG. 11A illustrates an example of a measured ACF metric 1102 without interleaving (e.g., RSIL=1) based on a random error model according to at least one embodiment.

FIG. 11B illustrates an example of a measured ACF metric 1104 with an interleave factor of eight (e.g., RSIL=8) according to at least one embodiment.

As illustrated in FIG. 11A and FIG. 11B, the ACF Rfnl(j) with no interleaving corresponds with a particularly poor ACF Rfnl(j) and the ACF Rfnl(j) is improved after employing an interleave factor of eight (RSIL=8).

Link Parameter Adaptation Using the Codeword Histogram Metric

Figure 12:
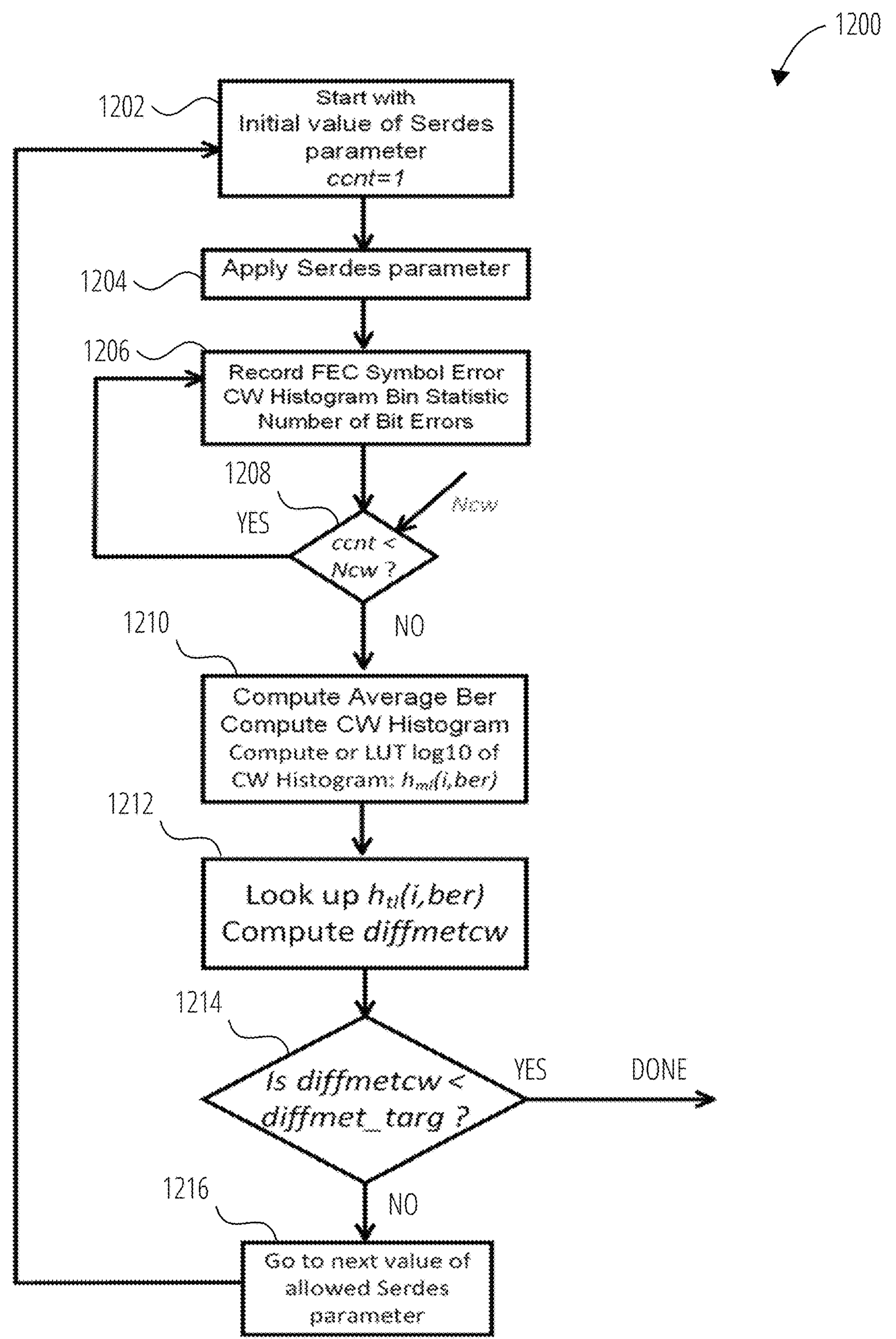
FIG. 12 is a flow diagram of a method of adapting a link parameter based on a codeword histogram metric according to at least one embodiment.

FIG. 12 is a flow diagram of a method 1200 of adapting a link parameter based on a codeword histogram metric according to at least one embodiment. The method 1200 can be performed by processing logic comprising hardware, software, firmware, or any combination thereof. In at least one embodiment, the method 1200 is performed by the controller 102 of FIG. 1. In at least one embodiment, the method 1200 is performed by the receiver 110 of FIG. 1. In at least one embodiment, an integrated circuit performs the method 1200. In another embodiment, a first device having an FEC system or FEC circuitry performs the method 1200.

Referring to FIG. 12, the method 1200 begins with the processing logic setting an initial value of a link parameter (e.g., SerDes parameter) and a count value to one (block 1202). The initial value may be a phase noise parameter of a PLL of a SerDes circuit. The processing logic can successively increase the initial value over a range of valid values such that an optimal value for the link parameter is determined. In this embodiment, the optimal value is determined as the one value when the corresponding difference metric, diffmetcw, or an averaged version of the difference metric, $diffmetcw_{av}$, falls below a programmed difference metric target, diffmet_targ. The measurements can be done such that each diffmetcw or $diffmetcw_{av}$ is based on measurements over a total number of FEC codewords, Ncw.

At block 1204, the processing logic applies the current value of the link parameter. The first instance, the link parameter is the initial value. At block 1206, the processing logic records equalized error data. The processing logic can record the FEC symbol error codeword histogram bin statistics of the number of bit errors. At block 1208, the processing logic determines whether the count value is less than the total number of FEC codewords, Ncw. If the count value is less than the total number of FEC codewords, the processing logic returns to continue recording the equalized error data at block 1206. Once the count value reaches the total number of FEC codewords, the processing logic computes the pre-FEC BER, the codeword histogram, compute the log 10 of the codeword histogram or use a LUT having the pre-computed values (block 1210). At block 1212, the processing logic computes the codeword histogram difference metric, diffmetcw. The processing logic can use a LUT to look up the target codeword histogram. At block 1214, the processing logic determines whether the codeword histogram difference metric is less than a target threshold, diffmet_target. If the codeword histogram difference metric is less than the target threshold, the processing logic ends the method 1200. However, if the codeword histogram difference metric is not less than the target threshold, the processing logic increments the initial value of the link parameter and returns to block 1202. This method 1200 continues until the codeword histogram difference metric is less than the target threshold at block 1214.

In at least one embodiment, the processing logic can search for the interleave factor that gives a minimum codeword histogram difference metric. In another embodiment, the processing logic tracks how the codeword histogram difference metric is changing, and stops and selects the interleave factor that results in the least change in the codeword histogram difference metric or the averaged version of the difference metric, diffmetcw av from the prior value of the metric at the prior interleave value.

In another embodiment, the target histogram $h_t(i,ber)$ can depend on the specific transmitter/receiver architecture (e.g., SerDes architecture). It is possible to choose an "ideal" target corresponding to a given architecture. In addition, a global or common target metric can be a codeword histogram which would be obtained if all the FEC symbol errors at the output of the receiver circuit (e.g., SerDes output) were random. Such a histogram can be calculated analytically and apriori using binomial distribution equations and such a histogram can be stored in a LUT. This histogram can be the "random model" histogram, denoted as $h_r(i,ber)$ or its log 10 version as $h_{rl}(i,ber)$. As described above, values $h_{rl}(i,ber)$ can be stored and accessed through a LUT as a function of i and the pre-FEC bit error rate ber. The target histogram could also be chosen based on a particular receiver equalization system design. For example for a partial response equalized system, a target specifically expected for that partial response system could be computed and stored in the LUT.

In the example of FIG. 12, there is a framework for adapting the codeword histogram metric to adapt an internal link parameter, such as a SerDes internal parameter. An example of a potential SerDes internal parameter could be an analog PLL control parameter, such as a DC value of the phase noise frequency spectrum characteristics. If the SerDes circuit allows multiple control values of this DC value, which allows a performance/power tradeoff, one could use the adaptation algorithm to find the DC value which results in an optimum power/performance tradeoff, for example.

As described herein, other encoding/decoding layer parameters can be controlled if they affect post-FEC BER performance. This could be indicated in either the codeword histogram difference metric or the ACF metric. An adaptation criterion can combine the codeword histogram difference metric and the ACF metric, or a weighted combination of the two.

In at least one embodiment, an enhanced version of the metric could be used by averaging over multiple independent sets of FEC symbols as follows in Equation 32:

$$Rfav(j) = \frac{1}{Macf} \sum_{m=1}^{Macf} Rf_m(j),$$

where Rfm(j) represents the ACF computed over the mth independent data set. The ACF Rfav(j) would subsequently be used as the final ACF used for the metric choices.

In another embodiment, instead of averaging across independent sets of FEC symbols and depending on the embodiment of the Rfmet being considered, one can consider other operations across the independent data sets besides averaging. For example, if Rfmet=|Rf(1)| then one can consider a 'worst' case metric taking the max of |Rfm(1)| where Rfm(1) represents the $1^{st}$ ACF term from the mth independent ACF measurement. This is represented in equation format as follows in Equation 33:

$$Rfmetmx = \max(|Rf_1(1)|, |Rf_2(1)|, \ldots |Rf_{Macf}(1)|)$$

Although the examples shown are with an encoding layer containing an RSFEC encoder/decoder, the algorithms can be used in a system employing 'concatenated coding' with an additional code or codes which can be inserted between the RSFEC and the SerDes or prior to the current RSFEC in the encoding layer and after the RSFEC in the decoding layer. One such concatenated system is shown in FIG. 13A.

Figure 13A:
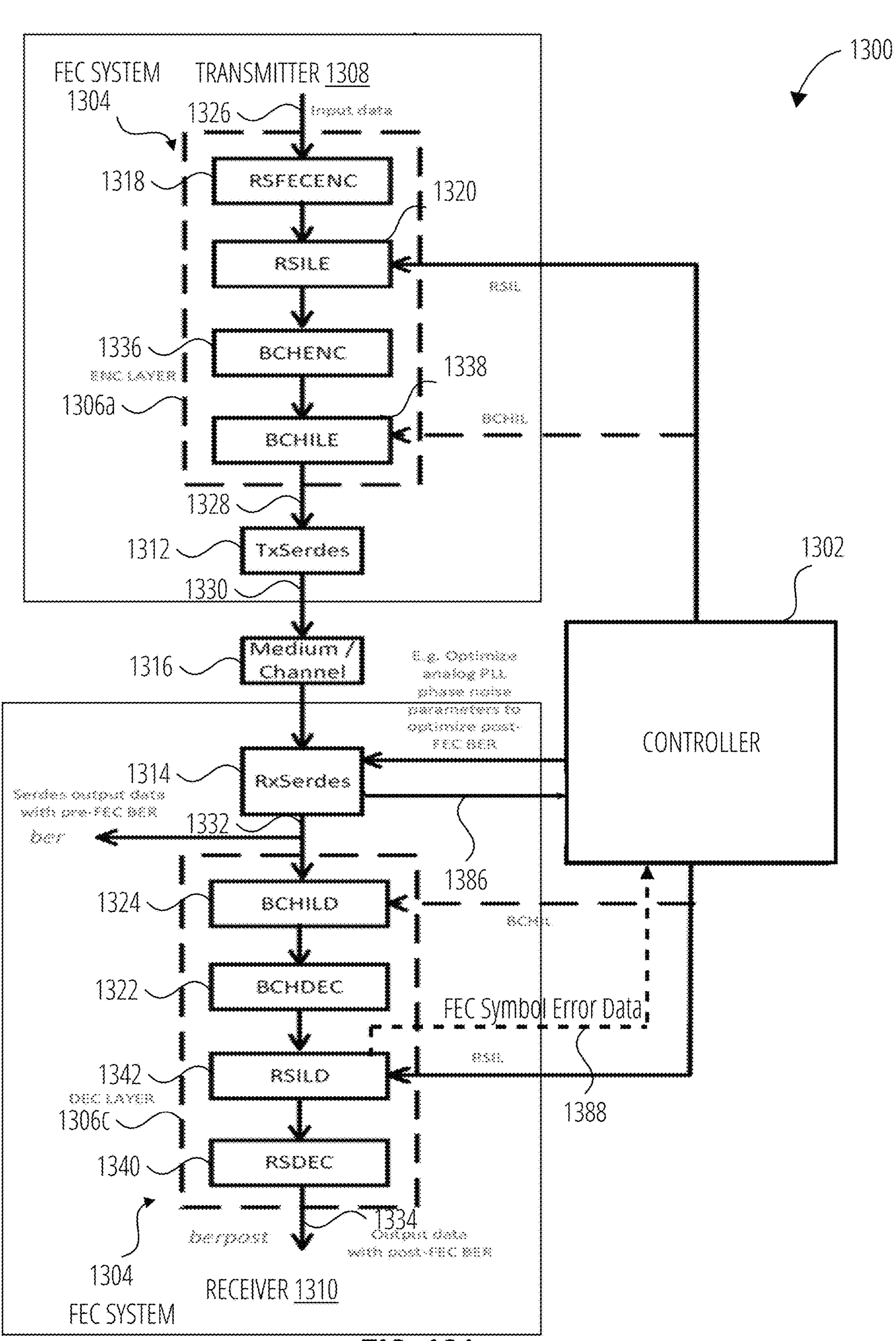
FIG. 13A is a block diagram of a communication system having a controller to optimize post-FEC BER performance of an FEC system with a concatenated code system using a post-FEC correlated performance metric according to at least one embodiment.

FIG. 13A is a block diagram of a communication system 1300 having a controller 1302 to optimize post-FEC BER performance of an FEC system with a concatenated code system using a post-FEC correlated performance metric according to at least one embodiment. The communication system 1300 includes a transmitter 1308 (also referred to as a transmitter device or transmitting device), a receiver 1310 (also referred to as a receiver device or receiving device), and the controller 1302 operatively coupled to the receiver circuit 1314, the transmitter circuit 1312, and the FEC system 1304. In this embodiment, the FEC system 1304 is a concatenated code system with a RS code and RS interleaving (RSILE, RSILD) and a BCH code and BCH interleaving (BCHILE, BCHILD) as part of a concatenated code. In other embodiments, other error correcting codes can be used, such as Hamming codes, extended Hamming codes, Golay codes, parity codes, multidimensional parity codes, triple modular redundancy codes, Nordstrom-Robinson codes, CRC codes, or the like.

In at least one embodiment, the transmitter 1308 is part of a first transceiver that also includes a receiver (not illustrated in FIG. 13A) and the receiver 1310 is part of a second transceiver that also includes a transmitter (not illustrated in FIG. 13A). The transmitter 1308 includes a transmitter circuit 1312, such as a SerDes TX circuit. The transmitter circuit 1312 sends signals over a communication channel 1316 (also referred to as "channel," "communication medium," or "transmission medium." The receiver 1310 includes a receiver circuit 1314, such as a SerDes RX circuit. The receiver circuit 1314 receives signals over the communication channel 1316.

In at least one embodiment, the FEC system 1304 includes an encoding layer 1306*a* at the transmitter 1308 and a decoding layer 1306*c* at the receiver 1310. The encoding layer 1306*a* can encode input data 1326 (e.g., user or input bits) into concatenated FEC codewords 1328. In at least one embodiment, the FEC system 1304 uses a RS engine and a BCH engine. In particular, the FEC system 1304 includes a first FEC encoder 1318 and a second FEC encoder 1336. The first FEC encoder 1318 can be an RS FEC encoder (RSFECENC) and the second FEC encoder 1336 can be an BCH FEC encoder (BCHENC). Other encoding operations may be performed in the encoding layer 1306*a* (and decoding operations in the decoding layer 1306*c*). In other embodiments, other encoding operations can be performed in the transmitter circuit 1312 and receiver circuit 1314, such as precoding, Gray coding, run length encoding, or the like. During the encoding process, the first FEC encoder 1318 (e.g., RSFECENC) usually processes groups of bits called FEC symbols, which are typically groups of say 8 or 10 bits at a time. The second FEC encoder 1336 (e.g., BCHENC) can process the FEC symbols from the first FEC encoder 1318. The second FEC encoder 1336 outputs concatenated FEC codewords 1328. After the encoding process, the transmitter circuit 1312 (e.g., SerDes TX circuit sends the equivalent binary bits in a bit stream 1330 as an analog waveform through communication channel 1316. The receiver circuit 1314 (e.g., SerDes RX circuit) processes the analog signal, performing operations, such as equalization/detection, clock/data recovery, and produces a bit stream 1332, which in the absence of impairments or noise in the communication channel 1316 would match the concatenated FEC codewords 1328 of transmitted bit stream 1330.

It should be noted that the bits of the bit stream 1332, at the output of the receiver circuit 1314 (e.g., SerDes RX circuit), are produced with a finite pre-FEC BER. This finite pre-FEC BER can be high. These pre-FEC bits at the output of the receiver circuit 1314 (e.g., SerDes RX circuit) are typically grouped again as FEC symbols for the decoding layer 1306*c*. During the decoding process, a first FEC decoder 1322 and a second FEC decoder 1340 decode the RX SerDes output to produce output data 1334. The underlying bits of the output data 1334 have significantly better (i.e., lower) post-FEC BER than the pre-FEC BER observed at the SerDes RX output. In at least one embodiment, the first FEC decoder 1322 is a BCH decoder (e.g., BCHDEC) and the second FEC decoder 1340 is a RS decoder (e.g., RSFECDEC). Other encoding and decoding FEC algorithms can be used for the encoding layer 1306*a* and decoding layer 1306*c*. It should be noted that the terms encoding/decoding layers are generic terms, but the functionality of these layers can be found in systems that use other terminologies, such as physical coding sub-layer (PCS), or the like. Other standards bodies may have other names for where such functionality resides.

In addition, interleaving may be applied in conjunction with the FEC system 1304. In at least one embodiment, the encoding layer 1306*a* can include the first FEC encoder 1318 and a first interleaver 1320, and the second FEC encoder 1336 and a second interleaver 1338. In at least one embodiment, the decoding layer 1306*c* can include the first FEC decoder 1322 and a third interleaver 1324, and a second FEC decoder 1340 and a fourth interleaver 1342. The interleaving for the first FEC encoder 1318 (RSFEC) is denoted as RSILE for the first interleaver 1320 in the encoding layer 1306*a* and RSILD for the fourth interleaver 1342 in the decoding layer 1306*c*. The interleaving for the second FEC encoder 1336 (BCHFEC) is denoted as BCHILE for the second interleaver 1338 in the encoding layer 1306*a* and BCHIL for the third interleaver 1324 in the decoding layer 1306*c*. The interleaving may be of various types either operating on bits, pairs of bits, or FEC symbols. Depending on the interleaver type, the first interleaver 1320 and second interleaver 1338 reorder groups of bits, pairs of bits, or FEC symbols, on the encoding side and the third interleaver 1324 and fourth interleaver 1342 perform the reverse operations on the decoding side. In this embodiment, there is a first interleave factor (RSIL) and a second interleave factor (BCHIL) used in connection with the different encoders and decoders. In other embodiments, other FEC-related parameters of the two FEC engines can be adjusted.

In at least one embodiment, other forms of distribution of outputs in the encoding layer 1306*a* and decoding layer 1306*c* can be used. For example, a data stream could be interleaved across multiple FEC engines and multiple physical lanes-instead of time interleaving using one FEC engine and one physical lane or time interleaving using two FEC engines and one physical lane as shown in FIG. 1 and FIG. 13A, respectively. As such, the metrics for post-FEC performance herein could be used to dynamically control the number of FEC engines used or parameters related to the subsequent interleaving or number of physical lanes over which the data is distributed.

Post-FEC Correlated Performance Metric Based on SNR Deviation Metrics

The controller 1302 can operate in a similar manner as controller 102. In particular, the controller 1302 can receive the equalized error data 138 from the receiver circuit 114. Alternatively, the controller 102 can receive SNR data from the receiver circuit 114. The controller 1302 can determine a SNR deviation metric (post-FEC correlated performance metric) using equalized error data 138 (or the SNR data) received from the receiver circuit 114. The controller 102 can adapt encoding/decoding layer parameters (FEC-related parameters 136) and/or SerDes parameters using the SNR deviation metric (post-FEC correlated performance metric).

In at least one embodiment, the controller 1302 can adapt (i) FEC-related parameters 136, such as the interleave factor to optimize post-FEC BER performance through the use of different post-FEC correlated performance metrics reflective of post-FEC BER performance. In at least one embodiment, the controller 1302 can adapt (ii) link parameters 140, such as SerDes parameters, to optimize post-FEC BER performance through the use of different post-FEC correlated performance metrics reflective of post-FEC BER performance. The different post-FEC correlated performance metrics, also referred to as adaptation metrics, can be based on (i) an SNR histogram difference metric, and/or (ii) a codeword histogram difference metric (e.g., based on FEC symbol error ACF). The SNR histogram difference metric can be computed by comparing a measured SNR histogram to a target SNR histogram. The codeword histogram difference metric can be computed by comparing measured FEC codeword histogram to a desired target histogram.

Codeword Histogram Deviation Metric without a Training Pattern Using Approximate Histogram Measurements The baseline codeword histogram deviation metric is obtained from a measured codeword histogram which in turn is obtained from measured FEC symbol errors fe(m) and the underlying bit errors e(n) as described previously. To obtain the underlying true bit errors e(n) assumes an ability to compare the received detected bits with the corresponding transmitted bits. This is typically accomplished in a training mode where the transmitter is transmitting a pattern, such as a PRBS pattern, known to both the transmitter and receiver.

However, it is also highly desirable to be able to compute a deviation metric without having to transmit a training pattern, i.e., be able to compute a codeword deviation metric when the transmitter is transmitting live user data not known to the receiver.

Towards this goal, it is possible to directly obtain an approximate measurement of the FEC symbol error statistics by using information from the FEC decoder itself. Upon receiving a codeword from the SerDes, the FEC decoder will take one of 4 possible actions (i) correct some number of FEC symbol errors in that codeword at the correct error locations in the received codeword (ii) not make any correction attempt when there were no errors in the received codeword (iii) not make any correction attempt when there were errors in the received codeword (iv) perform a mis-correction i.e., it is unable to correct all the actual FEC symbol errors in the received codeword and may attempt to correct one or more FEC symbols not corresponding with the actual FEC symbol error locations in the codeword. The third and fourth scenarios are obviously undesirable with the fourth scenario actually being harmful. However, FEC theory suggests that the probability of the last two scenarios occurring are significantly lower than that of the first two scenarios and thus negligible for many FEC codes. The higher the correction capability of the FEC code, the lower are the probability for the undesirable scenarios. Thus, simply by examining the number of FEC symbol error corrections per codeword, fdec_corrcw(r) for the rth codeword, attempted by the FEC decoder and considering them to be the actual number of FEC symbol errors in the received codeword, the controller can generate an approximate measured histogram which for the sake of technical accuracy is denoted as $h_{ma}$(i,ber) to distinguish it from $h_m$(i,ber) which is the measured histogram derived from the true FEC symbol error stream which would have been obtained with a training pattern. Note that in scenarios (i) and (ii) fdec_corrcw will correspond to the true number of FEC symbol errors per codeword whereas in scenarios (iii) and (iv), it will not. However, as noted earlier, the probability of scenarios (iii) and (iv) is typically very low compared with the probability of scenarios (i) or (ii).

Once the approximate histogram, $h_{ma}$(i,ber), is obtained, the codeword deviation metric is computed as done previously using $h_{ma}$(i,ber) instead of $h_m$(i,ber). The corresponding equations are similar to before and are listed as follows after making this substitution of $h_{ma}$(i,ber) instead of $h_m$(i, ber):

$$h_{mal}(i,\ ber) = \log10(h_{ma})$$

$$diffmeta(i) = |h_{mal}(i,\ ber) - h_{tl}(i,\ ber)|$$

$$diffmetcwa(ber) = \sum_{i=0}^{D} |h_{mal}(i,\ ber) - h_{tl}(i,\ ber)|$$

$$diffmetcwa_{av}(ber) = \frac{1}{J}\sum_{i=0}^{J}\sum_{i=0}^{D}\left|h_{mal}(i,\ ber) - h_{tl}(i,\ ber)\right|$$

Figure 13B:
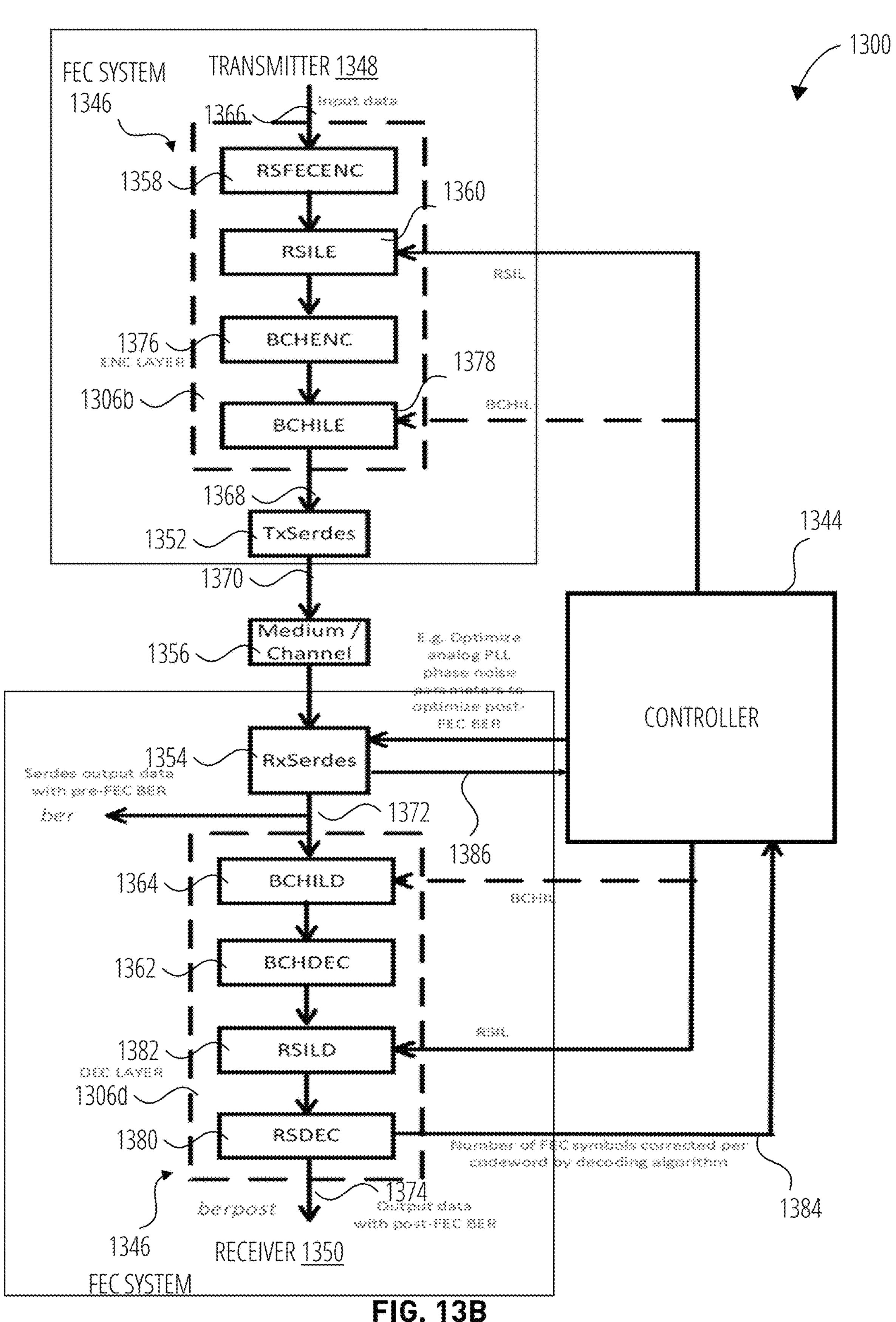
FIG. 13B is a block diagram of a communication system having a controller to optimize post-FEC BER performance of an FEC system with a concatenated code system using a post-FEC correlated performance metric according to at least one embodiment.

An example embodiment of the concatenated FEC scenario where information from the FEC decoder is passed to the controller to compute the codeword histogram deviation metric is illustrated and described with respect to FIG. 13B.

FIG. 13B is a block diagram of a communication system 1300 having a controller 1302 to optimize post-FEC BER performance of an FEC system with a concatenated code system using a post-FEC correlated performance metric according to at least one embodiment. The controller 1302 in FIG. 13B receives the number of corrected FEC symbols 1384 from the second FEC decoder 1380, instead of the equalized error data from the receiver circuit 1354. The number of corrected FEC symbols 1384 represents the number of FEC symbols corrected per codeword by the decoding algorithm. As described above, the number of corrected FEC symbols 1384 is an approximate measurement of the FEC symbol error statistics. The number of corrected FEC symbols 1384 can be used to generate a measured approximate FEC codeword histogram to be compared with a target histogram. That is, the post-FEC correlated performance metric can be based on a codeword histogram difference metric derived from a comparison of the measured approximate FEC codeword histogram and the target histogram. The controller can adjust, based on the post-FEC correlated performance metric, at least one of a FEC parameter of the FEC circuit or a link parameter of the receiver circuit, as described herein. In another embodiment, the controller 1302 can determine, using the number of corrected FEC symbols 1384, a post-FEC correlated performance metric indicative of an estimated post-FEC BER of the FEC circuit in other manners. In other embodiments, the controller 1302 can receive the equalized error data from the receiver circuit 1354, as well as the number of corrected FEC symbols 1384 from the second FEC decoder 1380.

Figure 14:
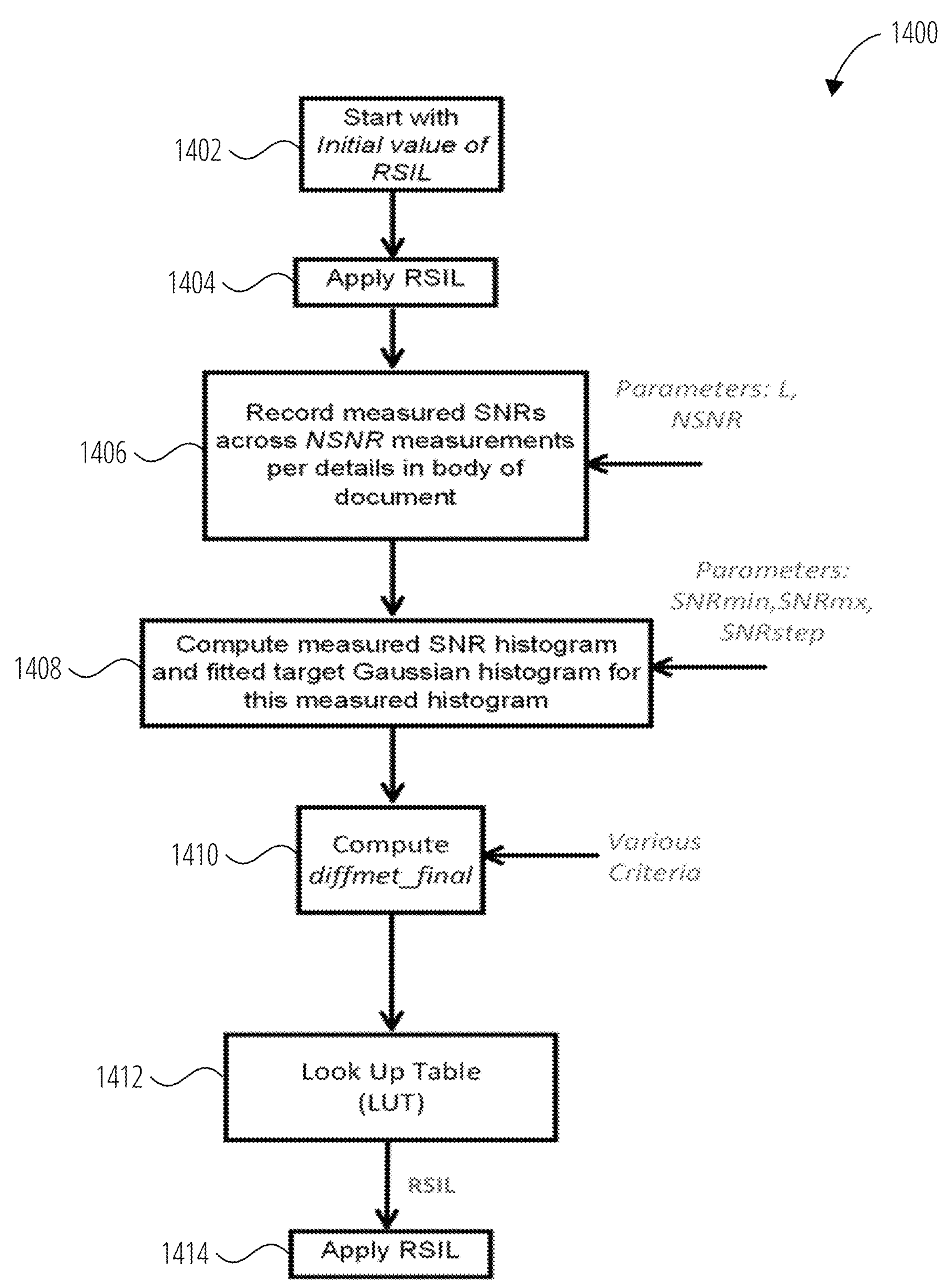
FIG. 14 is a flow diagram of an adaptation method for adjusting FEC-related parameters using an SNR deviation metric according to at least one embodiment.

FIG. 13B shows a flow chart to illustrate the exemplary embodiment in being able to choose an appropriate value for the FEC RSIL parameter, and FIG. 14 shows additional details of this approach. The controller 1302 can implement the calculation for the above LUT and logic to choose the appropriate RSIL value based on the computed diffmet_final value. The absolute numbers in all SNR deviation metric calculations and the above LUT should be considered exemplary only. In reality, they may be scaled differently to optimize hardware calculations of the various components in the SNR calculation and how each of those components are scaled. For example, the signal power in the numerator of the SNR calculation may be scaled differently for a given implementation which may change how the diffmet_final values would be used for adaptation when compared with a diffmet_targ value or when used to construct a LUT such as the above. FIG. 14 shows further detail of this approach.

FIG. 14 is a flow diagram of a method 1400 for adjusting FEC-related parameters using the SNR deviation metric, diffmet_final, according to at least one embodiment. The method 1400 can be performed by processing logic comprising hardware, software, firmware, or any combination thereof. In at least one embodiment, the method 1400 is performed by the controller 102 of FIG. 1, controller 1302 of FIG. 13A, or the controller 1344 of FIG. 13B. In at least one embodiment, the method 1400 is performed by the receiver 110 of FIG. 1. In at least one embodiment, an integrated circuit performs the method 1400. In another embodiment, a first device having an FEC system or FEC circuitry performs the method 1400.

Referring to FIG. 14, the method 1400 begins with the processing logic setting an initial value of RSIL (or other FEC-related parameters) (block 1402) and applying the RSIL to the FEC system (block 1404). The processing logic records and measures SNRs across NSNR measurements as described above (block 1406). At block 1406, the processing logic can use parameters L and NSNR as described above. The processing logic computes the measured SNR histogram and fitted target SNR histogram (i.e., fitted Gaussian histogram) for this measured SNR histogram (block 1408). At block 1408, the processing logic can use the parameters of SNRmin, SNRmax, SNRstep as described above. At block 1410, the processing logic computes the SNR histogram difference metric. At block 1410, the processing logic can use various criteria for computing the SNR histogram difference metric. At block 1412, the processing logic can use the LUT to select a next RSIL in the LUT. At block 1414, the processing logic applies the next RSIL to the FEC system.

Simplified SNR Deviation Metric

Instead of computing diffmet_final, as in the prior equation, the controller can use a simplified form of this metric where the difference at a given SNR value, corresponding with some programmable SNR index i=iprog, is examined, as set forth in Equation 34.

$$\text{diffmet\_final\_alt} = \mathit{diffmet}(SNRi,\ i = iprog)$$

Hierarchical Coarse/Fine Optimization

In some embodiments, the SNR deviation metrics can be used in connection with a traditional search approach which examines only say SNRnom or pre-FEC BER. The controller can perform a coarse search first using the SNRnom metric to filter out particular bad settings of one or more SerDes parameters and then using a fine search around the optimal coarse value of the SerDes parameter using the SNR deviation metric as described herein. This coarse/fine search algorithm is described in FIG. 15.

Figure 15:
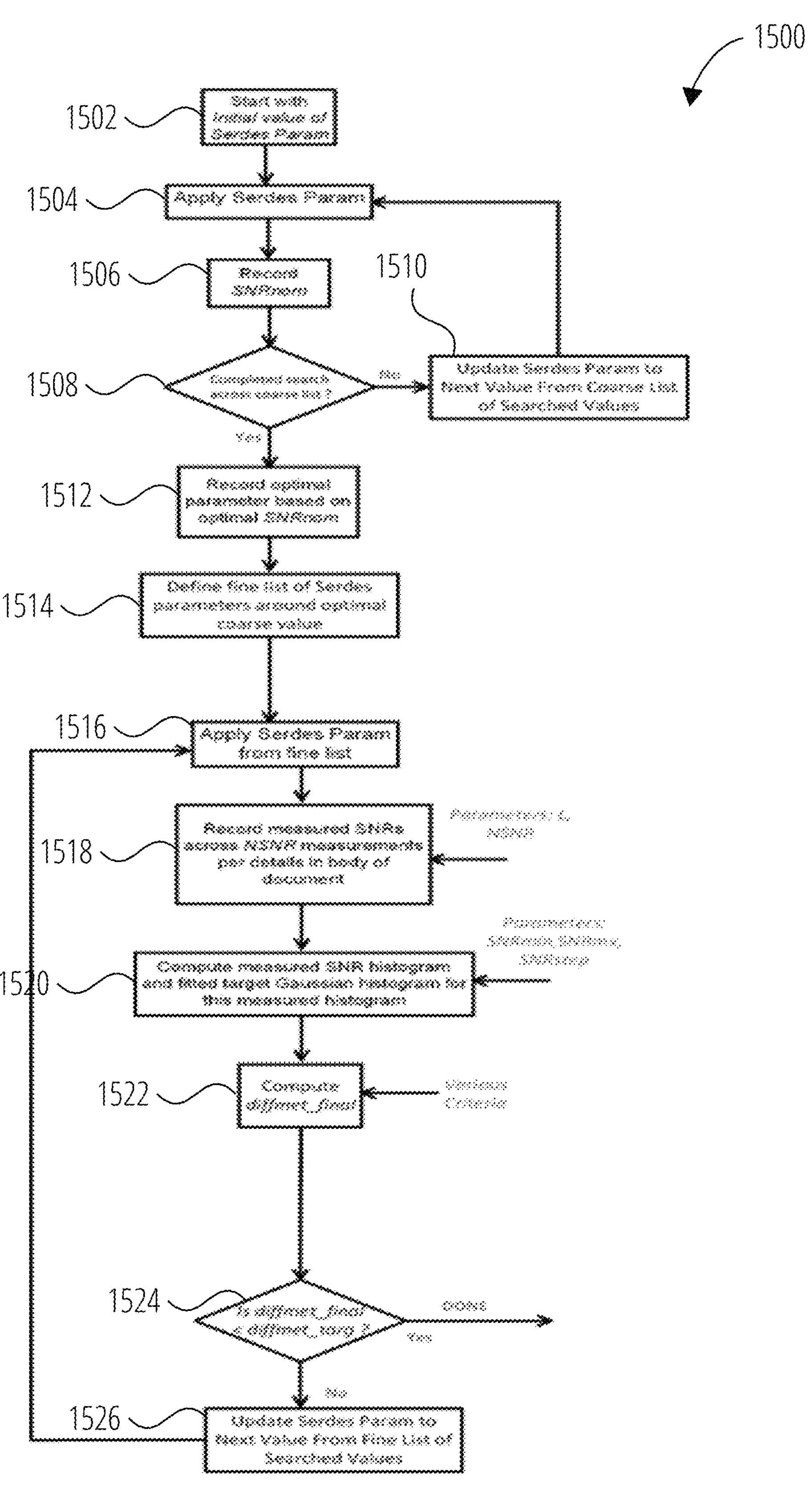
FIG. 15 is a flow diagram of a method for adjusting a SerDes parameter using an SNR deviation metric according to at least one embodiment.

FIG. 15 is a flow diagram of a method 1500 for adjusting a SerDes parameter using the SNR deviation metric, diffmet_final, according to at least one embodiment. The method 1500 can be performed by processing logic comprising hardware, software, firmware, or any combination thereof. In at least one embodiment, the method 1500 is performed by the controller 102 of FIG. 1, controller 1302 of FIG. 13A, or the controller 1344 of FIG. 13B. In at least one embodiment, the method 1500 is performed by the receiver 110 of FIG. 1. In at least one embodiment, an integrated circuit performs the method 1500. In another embodiment, a first device having an FEC system or FEC circuitry performs the method 1500.

Referring to FIG. 15, the method 1500 begins with the processing logic setting an initial value of a SerDes parameter (block 1502) and applying the SerDes parameter to the SerDes circuit (block 1504). At block 1506, the processing logic records the nominal SNR, SNRnom. At block 1508, the processing logic determines if a search has been completed across a coarse list. If not, at block 1510, the processing logic updates the SerDes parameter to a next value from the coarse list of selected searched values, and returns to block 1504. When the processing logic has completed the search at block 1508, the processing logic records the optimal parameter based on optimal SNRnom (block 1512). At block 1514, the processing logic defines a fine list of SerDes parameters around the optimal coarse value. At block 1516, the processing logic applies a SerDes parameter from the fine list. At block 1518, the processing logic records SNRs across NSNR measurements as described above (block 506). At block 1518, the processing logic can use parameters L and NSNR as described above. The processing logic computes the measured SNR histogram and fitted target SNR histogram (i.e., fitted Gaussian histogram) for this measured SNR histogram (block 1520). At block 1522, the processing logic can use the parameters of SNRmin, SNRmax, SNRstep as described above. At block 1522, the processing logic computes the SNR histogram difference metric. At block 1522, the processing logic can use various criteria for computing the SNR histogram difference metric. At block 1524, the processing logic can determine if the SNR histogram difference metric satisfies a criterion, such as the SNR histogram difference metric being less than a programmed target metric value diffmet_targ. If the SNR histogram difference metric satisfies the criterion at block 1524, the processing logic ends the adaptation method 1500. If the SNR histogram difference metric does not satisfy the criterion at block 1524, the processing logic updates the initial value of the SerDes parameter to a next value from a list of searched values (block 1526) and returns to apply the next value of the SerDes parameter to the SerDes circuit at block 1516. Here, the SerDes parameter can be adapted by searching through a pre-determined list of such parameters and choosing as the optimal one once the SNR deviation metric, diffmet_final, falls below some programmed target metric value diffmet_targ.

As an example suppose a SerDes has a continuous time linear equalizer (CTLE) which has a wide range of possible boost settings of say 0 to 16 dB in steps of 0.25 dB representing 65 possible cases. During the coarse search of FIG. 15, the processing logic could set a coarse search list consisting of boost values of 0 dB, 4 dB, 8 dB, 12 dB, 16 dB and use the traditional SNRnom metric to find the optimal boost from these settings. Suppose it happens to be the 12 dB setting. The processing logic can then generate a fine list of boost values from 10 dB to 14 dB in steps of 0.25 dB and use the SNR histogram deviation metric to find the optimal boost value from the fine list.

Figure 16:
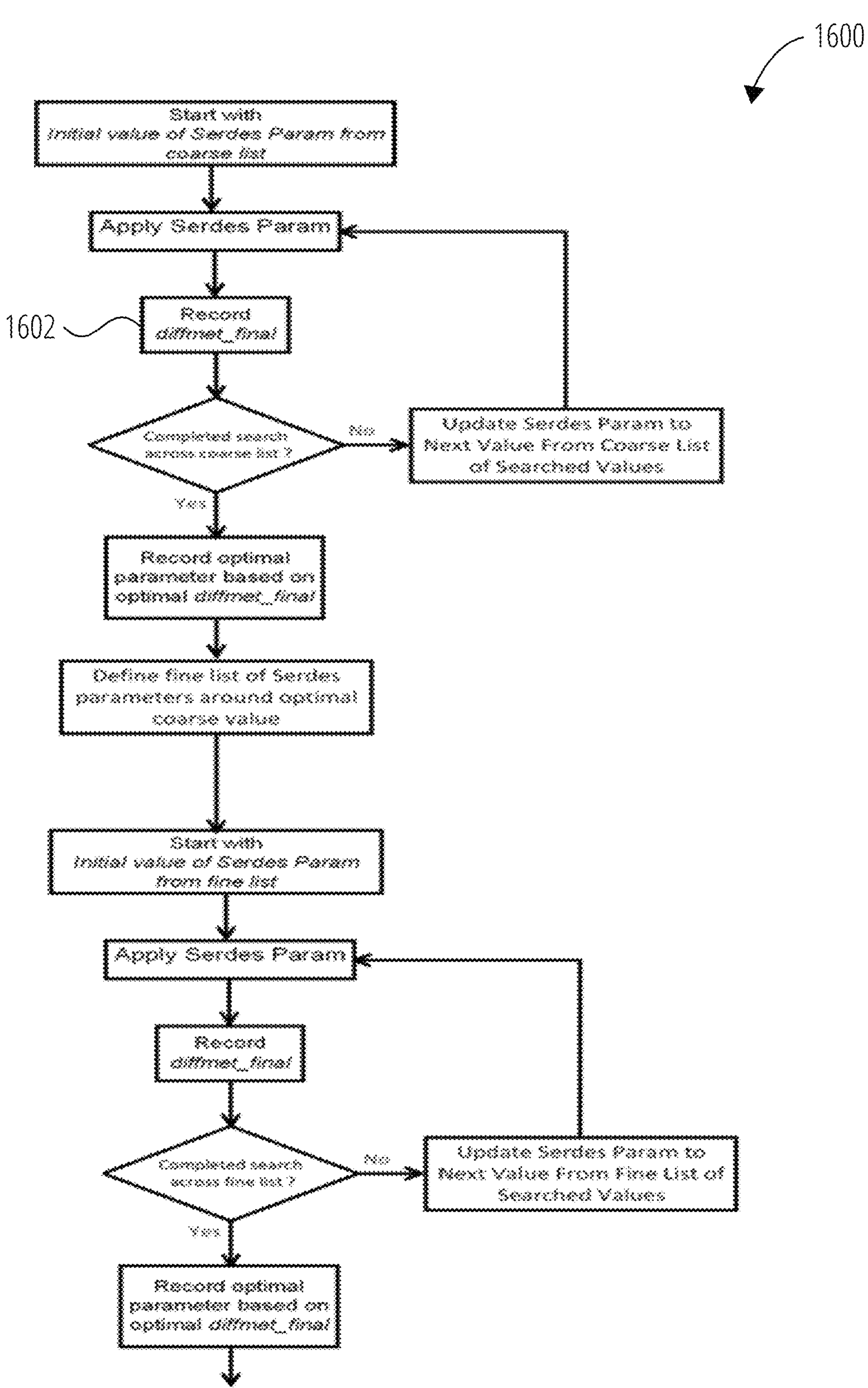
FIG. 16 is a flow diagram of a method for adjusting a SerDes parameter using an SNR deviation metric according to at least one embodiment.

Alternatively, the processing logic could perform both the coarse and fine search for the optimal CTLE boost using the SNR deviation metric algorithm itself, as illustrated in FIG. 16.

FIG. 16 is a flow diagram of a method 1600 for adjusting a SerDes parameter using the SNR deviation metric, diffmet_final, according to at least one embodiment. The method 1600 is the same as method 1500 as described above, except for block 1602 at which the processing logic records the SNR deviation metric, diffmet_final.

Alternate SNR Histogram Distribution Targets

In many practical communication systems, a well performing system will result in a SNR histogram which will be close to a Gaussian and thus a Gaussian target histogram is appropriate. However, it is possible that in future technologies (e.g., optical links with minimal electrical components, quantum computing, etc.) how noise/impairments manifest themselves could result in some other histogram distribution (e.g., Poisson, Gamma, etc.) being an appropriate target. Although the fitting to a target concept would still be applicable the details of the fitting algorithm and parameters involved in the fitting process may have to change to be tailored to that particular histogram distribution type.

Alternate Histogram Target Fitting Embodiments

As described above, the target Gaussian histogram is obtained by fitting a Gaussian histogram by matching the right side of the Gaussian histogram to the right side of the measured SNR histogram, where right side means the values of the histogram with amplitudes larger than the peak amplitude. Depending on the nature of the channel and impairment characteristics, there are other embodiments that could be useful in other applications. In at least one embodiment, fitting the left side of a target Gaussian histogram to the left side of the measured histogram where left side means amplitude values to the left of the peak can be considered. The algorithm described above could be modified appropriately to consider this embodiment. Also fitting both sides of a Gaussian histogram to both sides of the measured histogram where both sides refer to amplitude values to both the left and right of the peak can also be considered. Again, the algorithm described above could be modified appropriately to consider this embodiment.

SNR Metric to Directly Control FEC Parameters

The SNR deviation metric described thus far does not directly indicate the behavior of the FEC symbol errors at the output of the FEC but may do so indirectly as described earlier through the use of the LUT and in FIG. 13A.

However, another embodiment of the SNR deviation would be a direct indicator of the FEC behavior at the output of the FEC de-interleaver as set forth below. In the following, the computations use the true error, errtrue, or the detected error, errdet, using the generic variable err and likewise for their corresponding SNRs using the generic variable SNR to represent either SNRtrue or SNRdet. Let us consider a window of M PAM4 symbols which include one FEC symbol. For example, for a well-known FEC code (Nfec=544, Kfec=514, Tfec=15) defined over a Galois field of 10 bits, the FEC symbol size is 10 bits. Thus, if M=5 is chosen since each PAM4 symbol includes 2 bits, as expressed in Equation 35 and Equation 36.

$$errvarfsym = \frac{1}{M}\sum_{n=1}^{M} err(n)^2 \quad \text{(Equation 35)}$$

$$SNRFSYM(\text{dB}) = 10 * \log 10(sigvar / errvarfsym) \quad \text{(Equation 36)}$$

The sequence of SNRFSYM values can be passed through the equivalent of the RS de-interleaver function RSILD such that individual SNRFSYM values are manipulated in the same way as a FEC symbol errors would be through a de-interleaver. The output of this manipulation results in a de-interleaved SNR denoted as SNRFSYMIL which reflects the properties of the de-interleaver and will correlate well with post-FEC bit error rate performance accounting for the de-interleaver behavior. This equivalent RSILD functionality may be implemented in hardware or in the controller or software. Of course, it will be designed differently from a straight RSILD block which operates on integer FEC symbols or FEC symbol errors. From the SNRFSYM, a windowed or averaged SNR post-interleaving can be computed as in Equation 38:

$$SNRIL = \frac{1}{K}\sum_{l=1}^{K} SNRFSYMIL(l),$$

where K represents the windowing span. To equivalently match the prior window of L for the non-deinterleaved case, for example K could have a value of L/M which implies that our effective averaging window is L=K*M. The overall scheme as described above is shown in block diagram form in FIG. 17.

Figure 17:
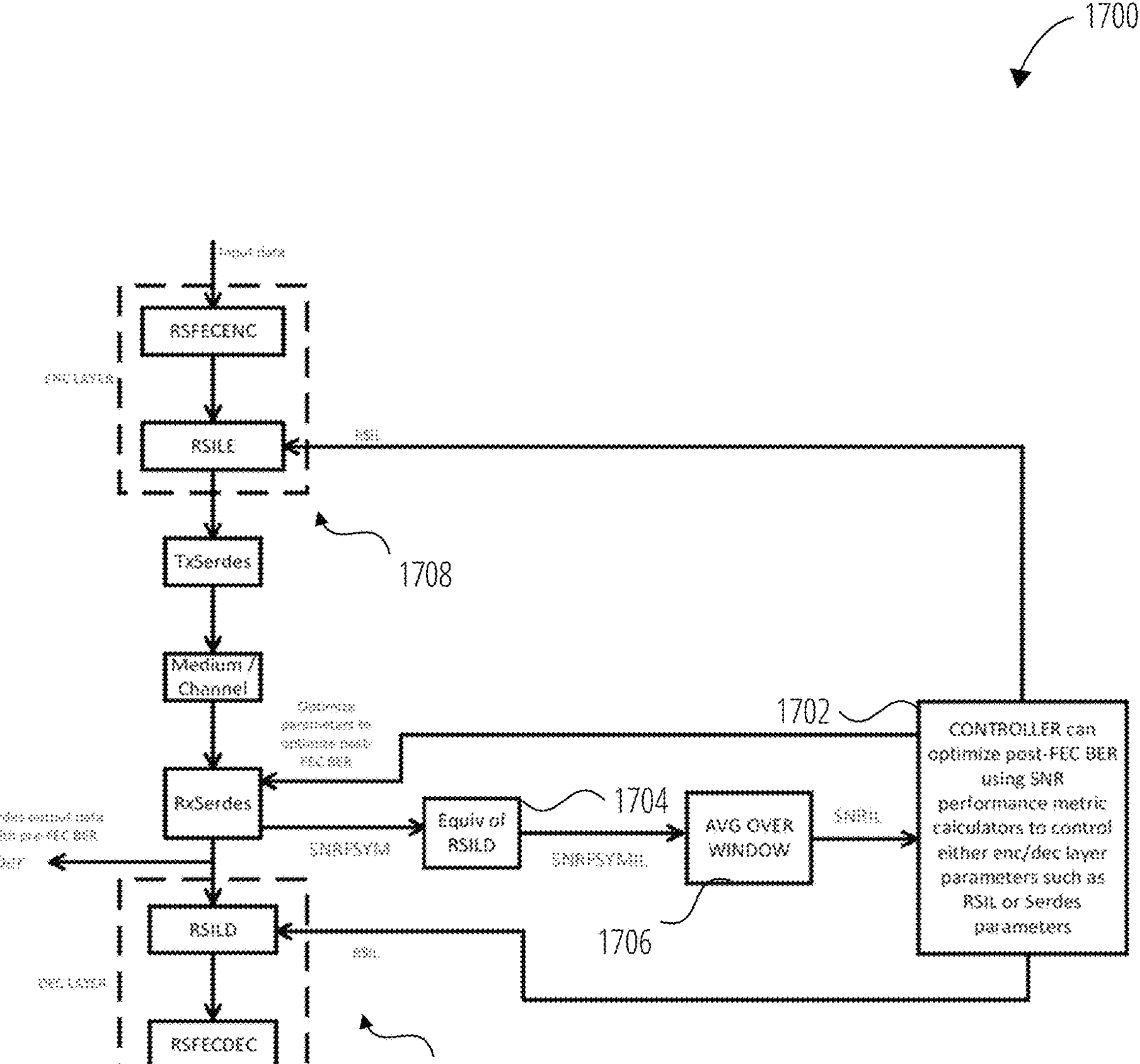
FIG. 17 is a block diagram of a communication system having a controller to optimize post-FEC BER performance of an FEC system using SNR performance metrics according to at least one embodiment.

FIG. 17 is a block diagram of a communication system 1700 having a controller 1702 to optimize post-FEC BER performance of an FEC system 1708 using SNR performance metrics according to at least one embodiment. The communication system 1700 is similar to the communication system 100 of FIG. 1, except the controller 1702 receives the SNRIL values computed by the block 1706, which is based on the SNRFSYMIL values received from the block 1704, which receives the SNRFSYM values from the SerDes circuit. As described above, the sequence of SNRFSYM values can be passed through the equivalent of the RS de-interleaver function RSILD at block 1704 such that individual SNRFSYM values are manipulated in the same way as a FEC symbol errors would be through a de-interleaver. The output of this manipulation results in a de-interleaved SNR denoted as SNRFSYMIL which reflects the properties of the de-interleaver and will correlate well with post-FEC bit error rate performance accounting for the de-interleaver behavior. This equivalent RSILD functionality may be implemented in hardware or in the controller or software. Of course, it will be designed differently from a straight RSILD block which operates on integer FEC symbols or FEC symbol errors. The block 1706 can receives the SNRFSYMIL from the block 1704 and compute the windowed or averaged SNR post-interleaving (SNRIL) using Equation 38. The controller 1702 can use modified SNR metric accounting for interleaving such that can directly adapt FEC parameters in addition to SerDes parameters. Using the above expression for SNRIL, the controller 1702 can compute a deviation metric and an equivalent diffmet_final as described above. Again, it should be emphasized that all the above operations may originate with err=errtrue or err=errdet. Also, in the scenario that no interleaving is used i.e., RSIL=1 then the SNRIL metric will effectively be equivalent to the original SNR with accounting for de-interleaving.

In at least one embodiment, the communication system 1700 includes a SerDes circuit coupled to a communication channel. The FEC system 1708 is operatively coupled to the SerDes circuit. The controller 1702 is operatively coupled to the SerDes circuit and the FEC system 1708. The communication system 1700 can receive equalized error data from the SerDes circuit and determine, using the equalized error data and a nominal signal power, SNR deviation metric, which are indicative of an estimated post-FEC BER of the FEC system 1708. The controller 1702 can change, based on the SNR deviation metric, one or more parameters of the FEC system 1708 or the SerDes circuit.

In at least one embodiment, the equalized error data includes at least one of a received error signal, a received detected equalized error signal, or individual SNR measurements determined by the receiver circuit.

In at least one embodiment, to determine the SNR deviation metric, the controller 1702 can determine a measured SNR histogram using the least one of the received error signal, the received detected equalized error signal, or the SNR measurements over a window of time, L, where L corresponds to a FEC codeword size used by the FEC system.

In at least one embodiment, the SNR deviation metric is based on an SNR histogram difference metric derived from a comparison of a measured SNR histogram and a target SNR histogram.

In at least one embodiment, the controller 1702 can determine the SNR histogram difference metric by determining an individual difference metric representing an absolute value of a deviation of the measured SNR histogram from the target SNR histogram at each value of the measured SNR histogram, determining the SNR histogram difference metric by summing the individual difference metrics.

In at least one embodiment, as illustrated in FIG. 17, the FEC system 1708 includes an interleaver and a decoder. The one or more parameters can include an interleave factor of the interleaver. The controller 1702, to change the one or more parameters of the FEC system or the SerDes circuit, can change the interleave factor from a first value to a second value.

In at least one embodiment, the FEC system 1708 includes a first interleaver, a first decoder, a second interleaver, and a second decoder. The one or more parameters can include a first interleave factor of the first interleaver and a second interleave factor of the second interleaver. The controller 1702, to change the one or more parameters of the FEC system or the SerDes circuit, can change the first interleave factor from a first value to a second value, and change the second interleave factor from a third value to a fourth value.

Figures 18A, 18B:
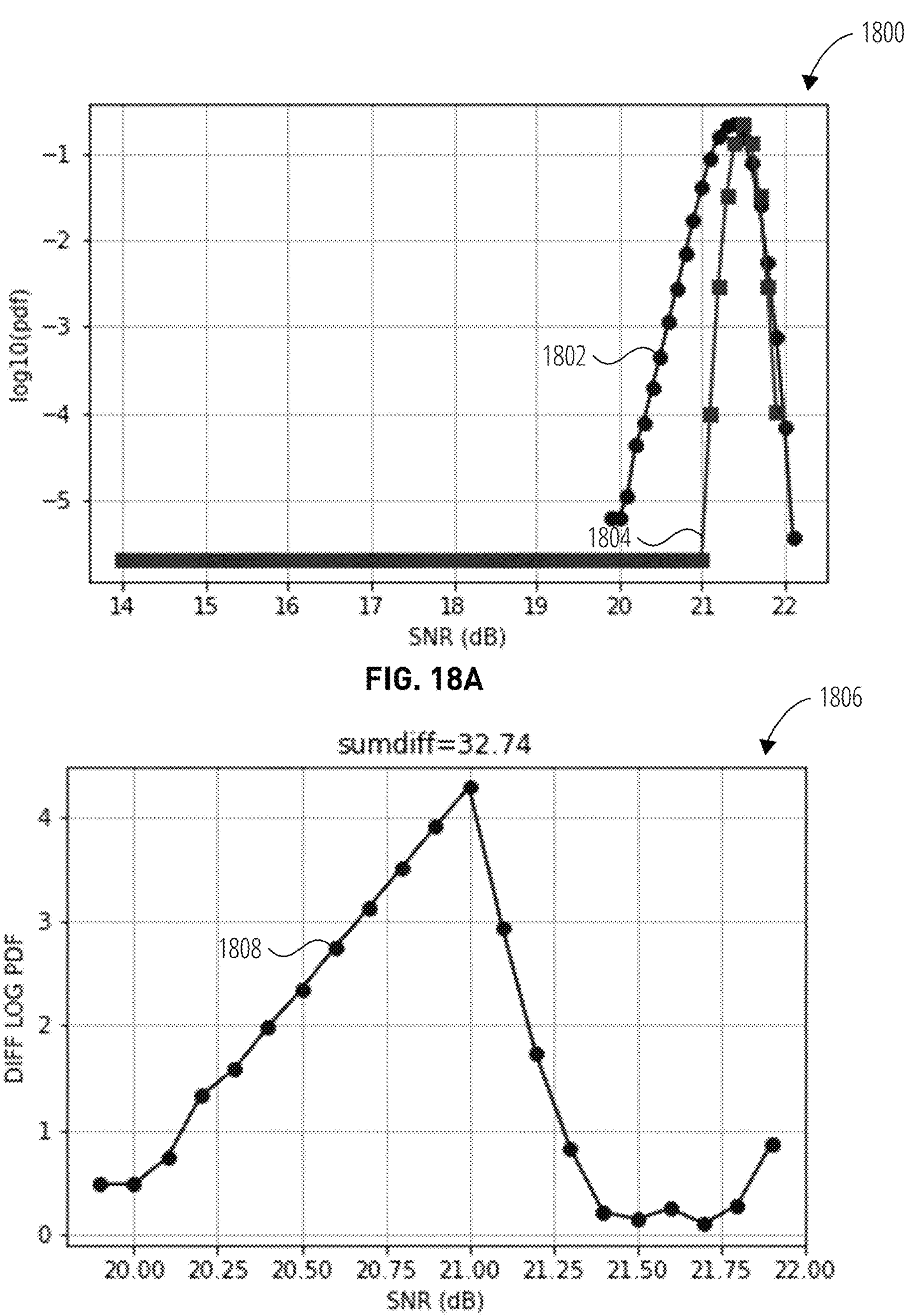
FIG. 18A shows a graph of examples of a measured SNR histogram and a target SNR histogram according to at least one embodiment.
FIG. 18B shows a graph of an example of an SNR histogram difference metric according to at least one embodiment.

FIG. 18A shows a graph 1800 of examples of a measured SNR histogram 1802 and a target SNR histogram 1804 according to at least one embodiment. It should be noted that the SNR histograms are also known as probability density functions (PDFs). Graph 1800 shows some simulation data for a communication link employing an interleave factor of RSIL=1.

FIG. 18B shows a graph 1806 of an example of an SNR histogram difference metric 1808 according to at least one embodiment. The plot in FIG. 18B shows the SNR histogram difference metric 1808, diffmet(SNRi) described above. The SNR histogram difference metric 1808 is the difference between the measured SNR histogram 1802 and target SNR histogram 1804 of FIG. 18A.

Figure 19A:
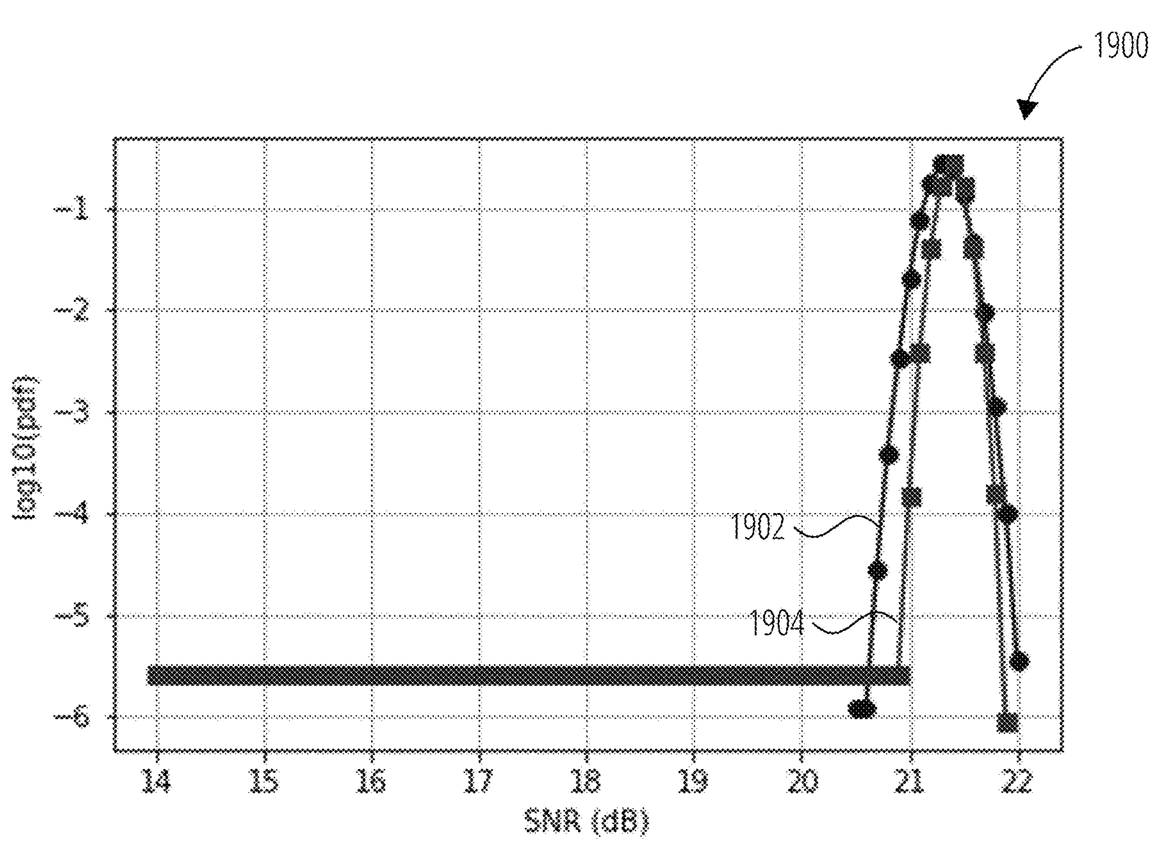
FIG. 19A shows a graph of examples of a measured SNR histogram and a target SNR histogram according to at least one embodiment.

FIG. 19A shows a graph 1900 of examples of a measured SNR histogram 1902 and a target SNR histogram 1904 according to at least one embodiment. Graph 1900 shows some simulation data for a communication link employing an interleave factor of RSIL=8.

Figure 19B:
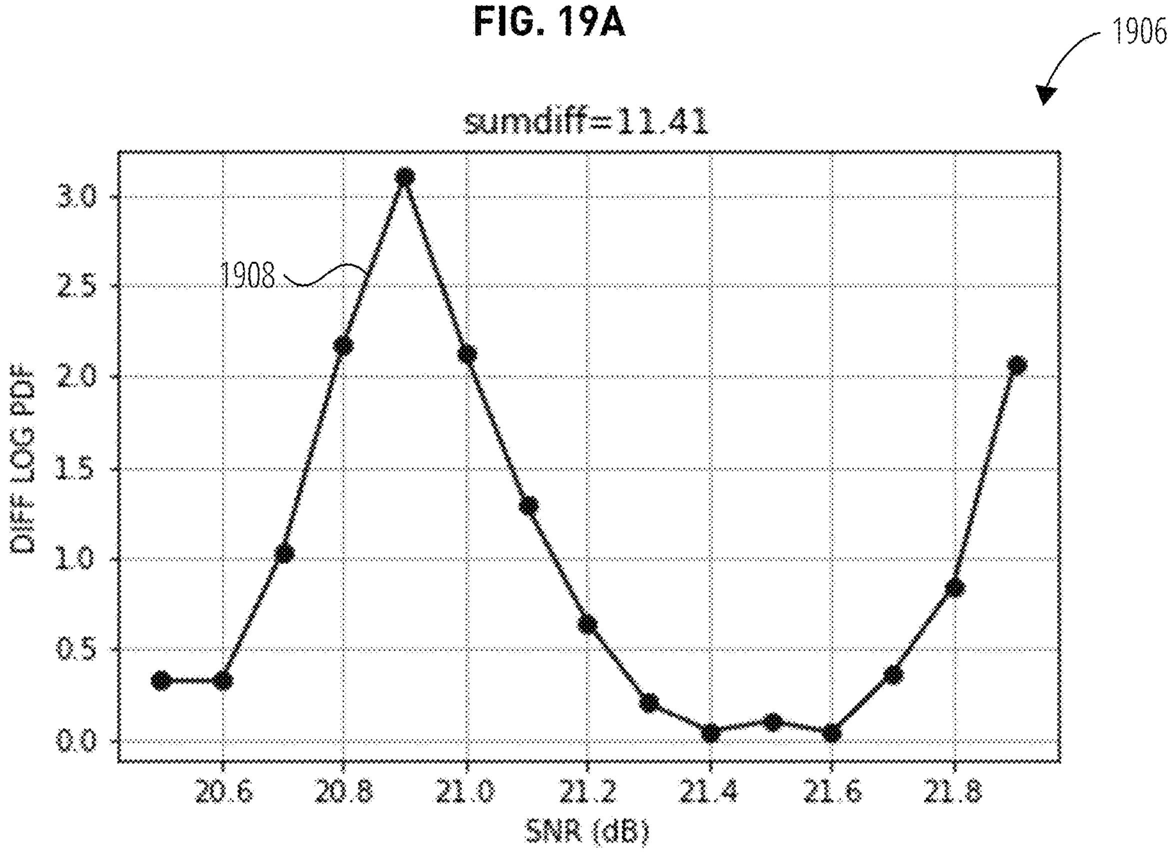
FIG. 19B shows a graph of an example of an SNR histogram difference metric according to at least one embodiment.

FIG. 19B shows a graph 1906 of an example of an SNR histogram difference metric 1908 according to at least one embodiment. The plot in FIG. 19B shows the SNR histogram difference metric 1908, diffmet(SNRi) described above. The SNR histogram difference metric 1908 is the difference between the measured SNR histogram 1902 and target SNR histogram 1904 of FIG. 19A. As illustrated in FIG. 18A to FIG. 19B, with the higher interleave factor, the measured SNR histogram 1902 is closer to the target SNR histogram 1904 than the measured SNR histogram 1802 is to the target SNR histogram 1804.

A summary of the final difference metric values are compared and plotted for this same communication link when sweeping the interleave factor RSIL across values of 1, 2, 4, 8, as illustrated in FIG. 20.

FIG. 20 is a plot 2000 of example SNR of exemplary SNR deviation metrics plotted against different interleave factors according to at least one embodiment. The plot encoded FEC codeword 200 includes the final difference metric values for the same communication link when sweeping the interleave factor, RSIL, across values of 1, 2, 4, and 8. It can be seen that the metric is worse for RSIL=1 as would be expected. The plot 2000 shows a large improvement when going to RSIL=2 and drops more slowly when going to RSIL=4 and then RSIL=8.

Figure 21:
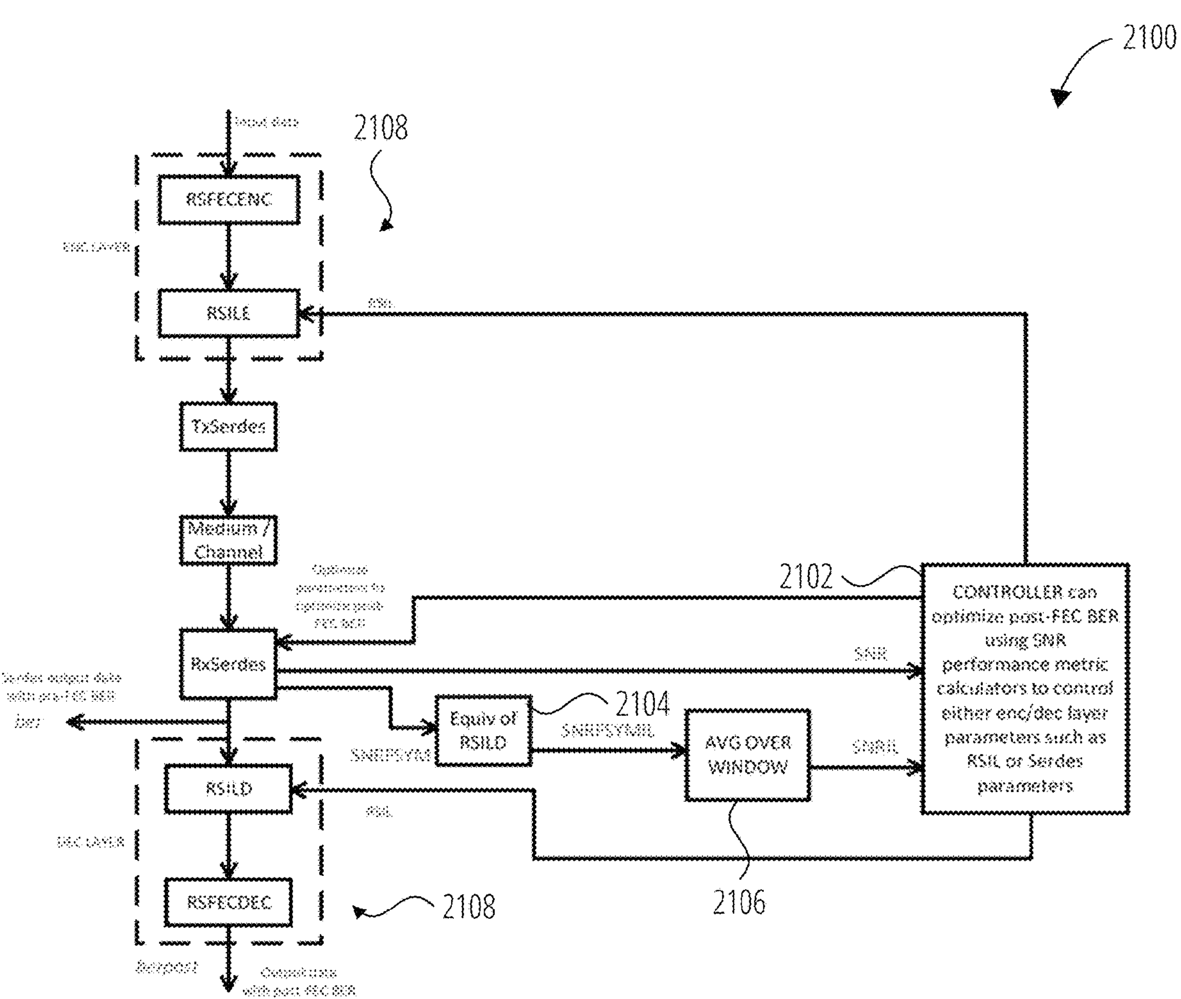
FIG. 21 is a block diagram of a communication system having a controller to optimize post-FEC BER performance of an FEC system using SNR performance metrics according to at least one embodiment.

It may be desirable to adapt different parameters using different SNR deviation metrics as shown in FIG. 21.

FIG. 21 is a block diagram of a communication system 2100 having a controller 2102 to optimize post-FEC BER performance of an FEC system 2108 using SNR performance metrics according to at least one embodiment. The communication system 2100 is similar to the communication system 1700 of FIG. 17, except the controller 1702 receives the SNRIL values computed by the block 2106 and SNR data from the SerDes circuit. Here, both the original SNR metric (based on computing an error variance using L error values) and the SNRIL metric can be used to compute their corresponding final SNR deviation metric, diffmet_final. In one embodiment, the diffmet_final based on the original SNR definition could be used to adapt the SerDes parameters while the diffmet_final based on the SNRIL could be used to adapt FEC parameters such as the interleave factor RSIL. Again, it should be noted that both the SNR and SNRIL derived metrics may refer to SNRs computed from error values which are errtrue or errdet which were previously defined. It should be noted that by virtue of the fact that originally defined SNR and SNRIL will be different from each other, it may not necessarily be the case that the optimal fitted Gaussian may be different for the fit using the originally defined SNR and the fit using SNRIL.

In other embodiments, other SerDes parameters besides the number of digital echo cancellation taps and CTLE boost could be considered. In other embodiments, other encoding/decoding layer FEC parameters could be controlled if they affect the post-FEC performance and such that the SNR deviation metric is an indicator for how that parameter might need to be set. In other embodiments, the metric can be used in a system with a concatenated coding as illustrated in FIG. 13A. In other embodiments, encoding/decoding layers with other forms of FEC interleaving/distribution could be considered as well. For example, a user data stream could be interleaved across multiple FEC engines and multiple physical lanes—instead of time interleaving using one FEC engine and one physical lane as shown in all the diagrams here. For example, an encoding layer with interleaving across two FEC engines followed by potential additional forms of interleaving and subsequent distribution of these outputs across a number of physical lanes could be used. As such the metrics for post-FEC performance herein could be used to dynamically control the number of FEC engines used or parameters related to the subsequent interleaving or number of physical lanes over which the data is distributed. Alternatively, other variations can be possible.

FIG. 22 is a flow diagram of a method 2200 for adjusting at least one of an FEC parameter or a link parameter to reduce a post-FEC BER performance according to at least one embodiment. The method 2200 can be performed by processing logic comprising hardware, software, firmware, or any combination thereof. In at least one embodiment, the method 2200 is performed by the controller 102 of FIG. 1, controller 1302 of FIG. 13A, the controller 1344 of FIG. 13B, the controller 1702 of FIG. 17, or the controller 2102 of FIG. 21. In at least one embodiment, the method 2200 is performed by the receiver 110 of FIG. 1. In at least one embodiment, an integrated circuit performs the method 2200. In another embodiment, a first device having an FEC system or FEC circuitry performs the method 2200.

Referring to FIG. 22, the method 2200 begins with the processing logic receiving equalized error data from a receiver circuit (block 2202). At block 2204, the processing logic determines, using the equalized error data and a nominal signal power, an SNR deviation metric, the SNR deviation metric being indicative of a post-FEC bit error rate (BER) of an FEC system coupled to the receiver circuit. At block 2206, the processing logic adjusts, based on the SNR deviation metric, at least one of an FEC parameter of the FEC system or a link parameter of the receiver circuit to reduce the post-FEC BER of the FEC system.

In a further embodiment, the equalized error data includes at least one of a received error signal, a received detected equalized error signal, or individual SNR measurements determined by the receiver circuit. The processing logic determines the SNR deviation metric by determining a measured SNR histogram using the least one of the received error signal, the received detected equalized error signal, or the SNR measurements over a window of time, L, where L corresponds to a FEC codeword size used by the FEC circuit.

In a further embodiment, the processing logic determines the measured SNR histogram by determining a statistical variance or a standard deviation of the received error signal or the received detected equalized error signal.

In a further embodiment, the processing logic determines the SNR deviation metric by determining a SNR histogram difference metric by comparing a measured SNR histogram and a target SNR histogram.

In a further embodiment, the processing logic determines the SNR histogram difference metric by determining an individual difference metric representing an absolute value of a deviation of the measured SNR histogram from the target SNR histogram at each value of the measured SNR histogram, and determining the SNR histogram difference metric by summing the individual difference metrics.

In a further embodiment, the processing logic adjusts at least one of the FEC parameter or the link parameter by changing an interleave factor of an interleaver of the FEC system from a first value to a second value.

In a further embodiment, the processing logic adjusts at least one of the FEC parameter or the link parameter by changing a first interleave factor of a first interleaver of the FEC system from a first value to a second value, and changing a second interleave factor of a second interleaver of the FEC system from a third value to a fourth value.

In a further embodiment, the receiver circuit is a SerDes circuit, and the processing logic adjusts at least one of the FEC parameter or the link parameter by changing a SerDes parameter of the SerDes circuit from a first value to a second value.

In a further embodiment, the receiver circuit is a SerDes circuit, and the processing logic adjusts at least one of the FEC parameter or the link parameter by changing an interleave factor of an interleaver of the FEC system from a first value to a second value, and changing a SerDes parameter of the SerDes circuit from a third value to a fourth value.

Figure 23:
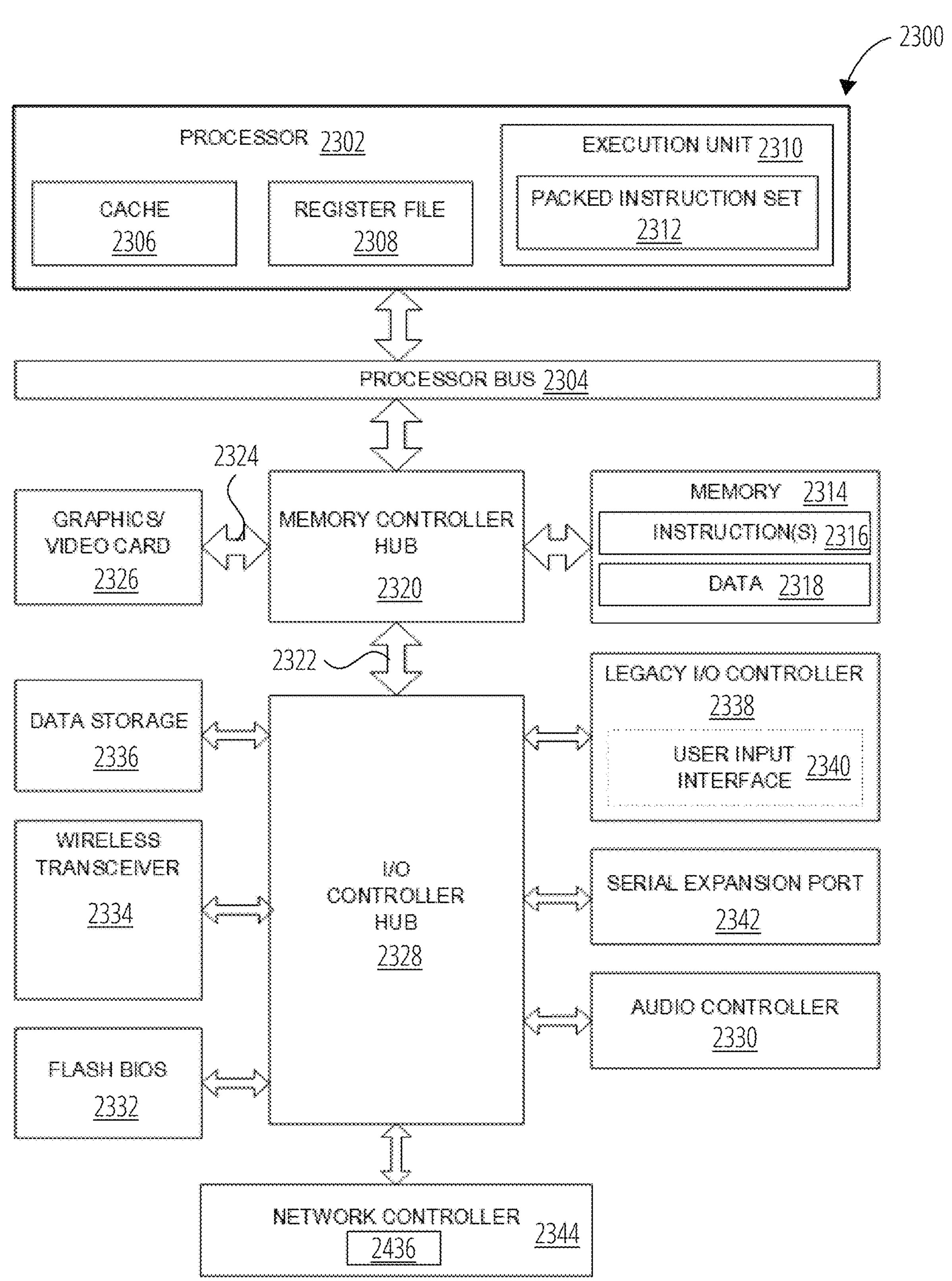
FIG. 23 illustrates an example computer system, including a network controller with a controller for optimizing post-FEC BER performance of an FEC system, in accordance with at least some embodiments.

FIG. 23 illustrates an example computer system 2300, including a network controller 2344 with a controller 2436 for optimizing post-FEC BER performance of an FEC system, in accordance with at least some embodiments. In at least one embodiment, computer system 2300 may be a system with interconnected devices and components, a System on Chip (SoC), or some combination. In at least one embodiment, computer system 2300 is formed with a processor 2302 that may include execution units to execute an instruction. In at least one embodiment, computer system 2300 may include, without limitation, a component, such as a processor 2302, to employ execution units including logic to perform algorithms for processing data. In at least one embodiment, computer system 2300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2300 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 2300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 2300 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 2300 may include, without limitation, processor 2302 that may include, without limitation, one or more execution units 807 that may be configured to execute a Compute Unified Device Architecture ("CUDA") (CUDA® is developed by NVIDIA Corporation of Santa Clara, California) program. In at least one embodiment, a CUDA program is at least a portion of a software application written in a CUDA programming language. In at least one embodiment, computer system 2300 is a single processor desktop or server system. In at least one embodiment, computer system 2300 may be a multiprocessor system. In at least one embodiment, processor 2302 may include, without limitation, a complex instruction set computer (CISC) microprocessor, a reduced instruction set computer (RISC) microprocessor, a Very Long Instruction Word (VLIW) microprocessor, and a processor implementing a combination of instruction sets, or any other processor device, such as a digital signal processor, for example. In at least one embodiment, processor 2302 may be coupled to a processor bus 2304 that may transmit data signals between processor 2302 and other components in computer system 2300.

In at least one embodiment, processor 2302 may include, without limitation, a Level 1 ("L1") internal cache memory ("cache") 2306. In at least one embodiment, processor 2302 may have a single internal cache or multiple levels of internal cache. In at least one embodiment, cache memory may reside external to processor 2302. In at least one embodiment, processor 2302 may also include a combination of both internal and external caches. In at least one embodiment, a register file 2308 may store different types of data in various registers including, without limitation, integer registers, floating point registers, status registers, and instruction pointer register.

In at least one embodiment, execution unit 2310, including, without limitation, logic to perform integer and floating point operations, also resides in processor 2302. Processor 2302 may also include a microcode ("ucode") read only memory ("ROM") that stores microcode for certain macro instructions. In at least one embodiment, execution unit 2310 may include logic to handle a packed instruction set 2312. In at least one embodiment, by including packed instruction set 2312 in an instruction set of a general-purpose processor 2302, along with associated circuitry to execute instructions, operations used by many multimedia applications may be performed using packed data in a general-purpose processor 2302. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 2310 may also be used in microcontrollers, embedded processors, graphics devices, DSPs, and other types of logic circuits. In at least one embodiment, computer system 2300 may include, without limitation, a memory 2314. In at least one embodiment, memory 2314 may be implemented as a Dynamic Random Access Memory (DRAM) device, a Static Random Access Memory (SRAM) device, flash memory device, or other memory devices. Memory 2314 may store instruction(s) 2316 and/or data 2318 represented by data signals that may be executed by processor 2302.

In at least one embodiment, a system logic chip may be coupled to a processor bus 2304 and memory 2314. In at least one embodiment, the system logic chip may include, without limitation, a memory controller hub ("MCH") 2320, and processor 2302 may communicate with MCH 2320 via processor bus 2304. In at least one embodiment, MCH 2320 may provide a high bandwidth memory path to memory 2314 for instruction and data storage and for storage of graphics commands, data, and textures. In at least one embodiment, MCH 2320 may direct data signals between processor 2302, memory 2314, and other components in computer system 2300 and may bridge data signals between processor bus 2304, memory 2314, and a system I/O 2322. In at least one embodiment, a system logic chip may provide a graphics port for coupling to a graphics controller. In at least one embodiment, MCH 2320 may be coupled to memory 2314 through high bandwidth memory path, and graphics/video card 2326 may be coupled to MCH 2320 through an Accelerated Graphics Port ("AGP") interconnect 2324.

In at least one embodiment, computer system 2300 may use system I/O 2322 that is a proprietary hub interface bus to couple MCH 2320 to I/O controller hub ("ICH") 2328. In at least one embodiment, ICH 2328 may provide direct connections to some I/O devices via a local I/O bus. In at least one embodiment, a local I/O bus may include, without limitation, a high-speed I/O bus for connecting peripherals to memory 2314, a chipset, and processor 2302. Examples may include, without limitation, an audio controller 2330, a firmware hub ("flash BIOS") 2332, a wireless transceiver 2334, a data storage 2336, a legacy I/O controller 2338 containing a user input interface 2340, a keyboard interface, a serial expansion port 2342, such as a USB port, and a network controller 644, including the controller 2436 as described herein. Data storage 2336 may comprise a hard disk drive, a floppy disk drive, a CD-ROM device, a flash memory device, or other mass storage device.

In at least one embodiment, FIG. 23 illustrates a computer system 2300, which includes interconnected hardware devices or "chips." In at least one embodiment, FIG. 23 may illustrate an example SoC. In at least one embodiment, devices illustrated in FIG. 23 may be interconnected with proprietary interconnects, standardized interconnects (e.g., Peripheral Component Interconnect Express (PCIe)), or some combination thereof. In at least one embodiment, one or more components of computer system 2300 are interconnected using compute express link ("CXL") interconnects.

Figure 24A:
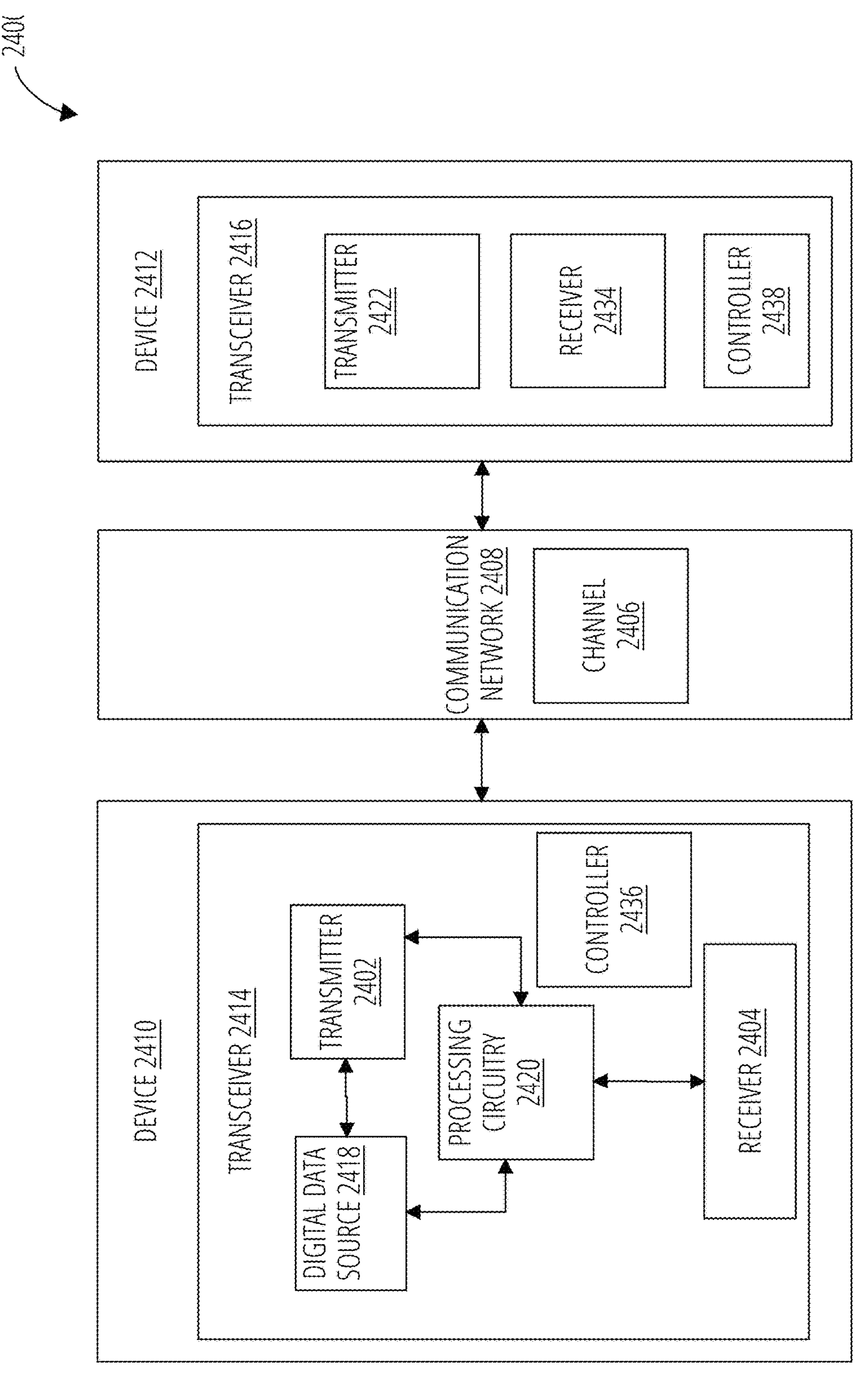
FIG. 24A illustrates an example communication system with a controller for optimizing post-FEC BER performance of an FEC system, in accordance with at least some embodiments.

FIG. 24A illustrates an example communication system 2400 with a controller 2436 for optimizing post-FEC BER performance of an FEC system, in accordance with at least some embodiments. The communication system 2400 includes a device 2410, a communication network 2408 including a communication channel 2406, and a device 2412. In at least one embodiment, the devices 2410 and 2412 are integrated circuits of a Personal Computer (PC), a laptop, a tablet, a smartphone, a server, a collection of servers, or the like. In some embodiments, the devices 2410 and 2412 may correspond to any appropriate type of device that communicates with other devices also connected to a common type of communication network 2408. According to embodiments, the transmitter 2402 and 2422 of devices 2410 or 2412 may correspond to transmitters of a Graphics Processing Unit (GPU), a switch (e.g., a high-speed network switch), a network adapter, a central processing unit (CPU), a data processing unit (DPU), etc.

Examples of the communication network 2408 that may be used to connect the devices 2410 and 2412 include wires, conductive traces, bumps, terminals, optical fibers, or the like. In other embodiments, the communication network 2408 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 2408 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's DGX systems and high-end gaming or AI workstations, NVLink helps GPUs exchange data at speeds that are necessary for demanding tasks like real-time ray tracing or training neural networks. In one specific, but non-limiting example, the communication network 2408 is a network that enables data transmission between the devices 2410 and 2412 using data signals (e.g., digital, optical, wireless signals), clock signals, or both. The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the controller In at least one embodiment, a system for high-speed network communication includes a processing unit, a network interface comprising a receiver or transceiver with controller to optimize post-FEC BER performance of an FEC system using a post-FEC correlated performance metric, as described herein. The processing unit can include a CPU, a GPU, a DPU, a network adapter, a network switch, an NVLink switch, or the like.

Other examples for the communication network 2408 can include other chip-to-chip or die-to-die interconnects, such as GRS, LPI (low power interface) or LLI (low latency interface).

The device 2410 includes a transceiver 2414 for sending and receiving signals, for example, data signals. The data signals may be digital or optical signals modulated with data or other suitable signals for carrying data.

The transceiver 2414 may include a digital data source 2418, a transmitter 2402, a receiver 2404, and processing circuitry 2420 that controls the transceiver 2414. The digital data source 2418 may include suitable hardware and/or software for outputting data in a digital format (e.g., in binary code and/or thermometer code). The digital data output by the digital data source 2418 may be retrieved from memory (not illustrated) or generated according to input (e.g., user input). The transceiver 2414 can include the controller 2436 as described above with respect to FIG. 1 to FIG. 23. In at least one embodiment, the controller 2436 is the controller 102 of FIG. 1. In another embodiment, the controller 2436 is the controller 1302 of FIG. 13A.

The transceiver 2414 includes suitable software and/or hardware for receiving digital data from the digital data source 2418 and outputting data signals according to the digital data for transmission over the communication network 2408 to a transceiver 2416 of device 2412.

The receiver 2404 of device 2410 may include suitable hardware and/or software for receiving signals, for example, data signals from the communication network 2408. For example, the receiver 2404 may include components for receiving processing signals to extract the data for storing in a memory. In at least one embodiment, the transceiver 2416 includes a transmitter 2422 and receiver 2434. The transceiver 2416 receives an incoming signal and samples the incoming signal to generate samples, such as using an analog-to-digital converter (ADC). The ADC can be controlled by a clock-recovery circuit (or clock recovery block) in a closed-loop tracking scheme. The clock-recovery circuit can include a controlled oscillator, such as a voltage-controlled oscillator (VCO) or a digitally-controlled oscillator (DCO) that controls the sampling of the subsequent data by the ADC. The transceiver 2416 can include the controller 2438 as described above with respect to FIG. 1 to FIG. 23. In at least one embodiment, the controller 2438 is the controller 102 of FIG. 1. In another embodiment, the controller 2438 is the controller 1302 of FIG. 13A.

The processing circuitry 2420 may comprise software, hardware, or a combination thereof. For example, the processing circuitry 2420 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 2420 may comprise hardware, such as an Application-Specific Integrated circuit (ASIC). Other non-limiting examples of the processing circuitry 2420 include an Integrated Circuit (IC) chip, a CPU, A GPU, a DPU, a microprocessor, a Field-Programmable Gate Array (FPGA), a collection of logic gates or transistors, resistors, capacitors, inductors, diodes, or the like. Some or all of the processing circuitry 2420 may be provided on a Printed Circuit Board (PCB) or collection of PCBs. It should be appreciated that any appropriate type of electrical component or collection of electrical components may be suitable for inclusion in the processing circuitry 2420. The processing circuitry 2420 may send and/or receive signals to and/or from other elements of the transceiver 2414 to control the overall operation of the transceiver 2414.

The transceiver 2414 or selected elements of the transceiver 2414 may take the form of a pluggable card or controller for the device 2410. For example, the transceiver 2414 or selected elements of the transceiver 2414 may be implemented on a network interface card (NIC).

The device 2412 may include a transceiver 2416 for sending and receiving signals, for example, data signals over a channel 2406 of the communication network 2408. The channel 2406 can be PCIe, NVLink, Ethernet, InfiniBand, Ground Reference Signal (GRS), Chip-to-Chip (C2C), Die-to-Die (D2D), or the like. The same or similar structure of the transceiver 2414 may be applied to transceiver 2416, and thus, the structure of transceiver 2416 is not described separately.

Although not explicitly shown, it should be appreciated that devices 2410 and 2412 and the transceiver 2414 and transceiver 2416 may include other processing devices, storage devices, and/or communication interfaces generally associated with computing tasks, such as sending and receiving data.

Figure 24B:
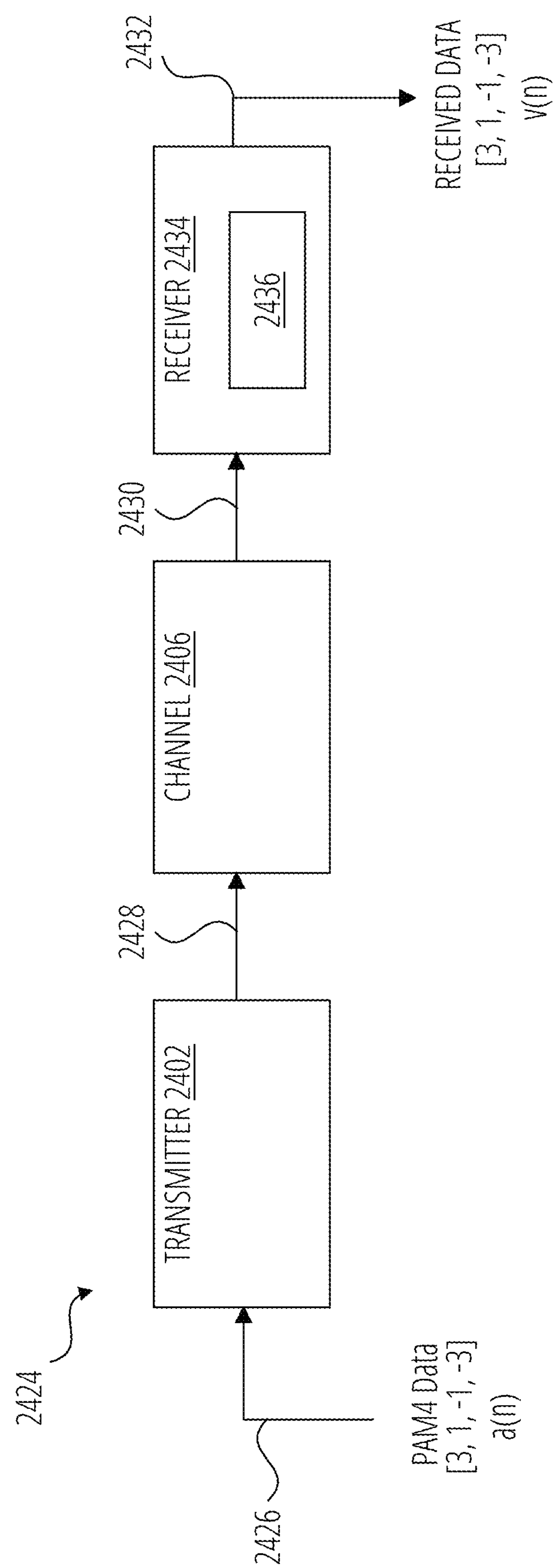
FIG. 24B illustrates a block diagram of an example communication system employing a receiver with a controller for optimizing post-FEC BER performance of an FEC system, according to at least one embodiment.

FIG. 24B illustrates a block diagram of an example communication system 2424 employing a receiver 2434 with a controller 2436 for optimizing post-FEC BER performance of an FEC system, according to at least one embodiment. In the example shown in FIG. 24B, a Pulse Amplitude Modulation level-4 (PAM4) modulation scheme is employed with respect to the transmission of a signal (e.g., digitally encoded data) from a transmitter (TX) 2402 to a receiver (RX) 2434 via a communication channel 2406 (e.g., a transmission medium). The communication channel 2406 can be PCIe, NVLink, Ethernet, InfiniBand, GRS, C2C, D2D, or the like. In this example, the transmitter 2402 receives an input data 2426 (i.e., the input data at time n is represented as "a(n)"), which is modulated in accordance with a modulation scheme (e.g., PAM4) and sends the signal 2428 a(n) including a set of data symbols (e.g., symbols −3, −1, 1, 3, where the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM3, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 2406 is a destructive medium in that the channel acts as a low pass filter which attenuates higher frequencies more than it attenuates lower frequencies, introduces inter-symbol interference (ISI) and noise from cross talk, from power supplies, from Electromagnetic Interference (EMI), or from other sources. The communication channel 2406 can be over serial links (e.g., a cable, PCB traces, copper cables, optical fibers, or the like), read channels for data storage (e.g., hard disk, flash solid-state drives (SSDs), high-speed serial links, deep space satellite communication channels, applications, or the like. The receiver (RX) 2434 receives an incoming signal 2430 over the channel 2406. The receiver 2434 can output a received signal 2432, "v(n)," including the set of data symbols (e.g., symbols −3, −1, 1, 3, wherein the symbols represent coded binary data).

In at least one embodiment, the transmitter 2402 can be part of a SerDes IC. The SerDes IC can be a transceiver that converts parallel data to serial data and vice versa. The SerDes IC can facilitate transmission between two devices over serial streams, reducing the number of data paths, wires/traces, terminals, etc. The receiver 2434 can be part of a SerDes IC. The SerDes IC can include a clock-recovery circuit. The clock-recovery circuit can be coupled to an ADC and an equalization block. In another embodiment, the SerDes IC can include additional equalization block before a symbol detector.

Figure 25:
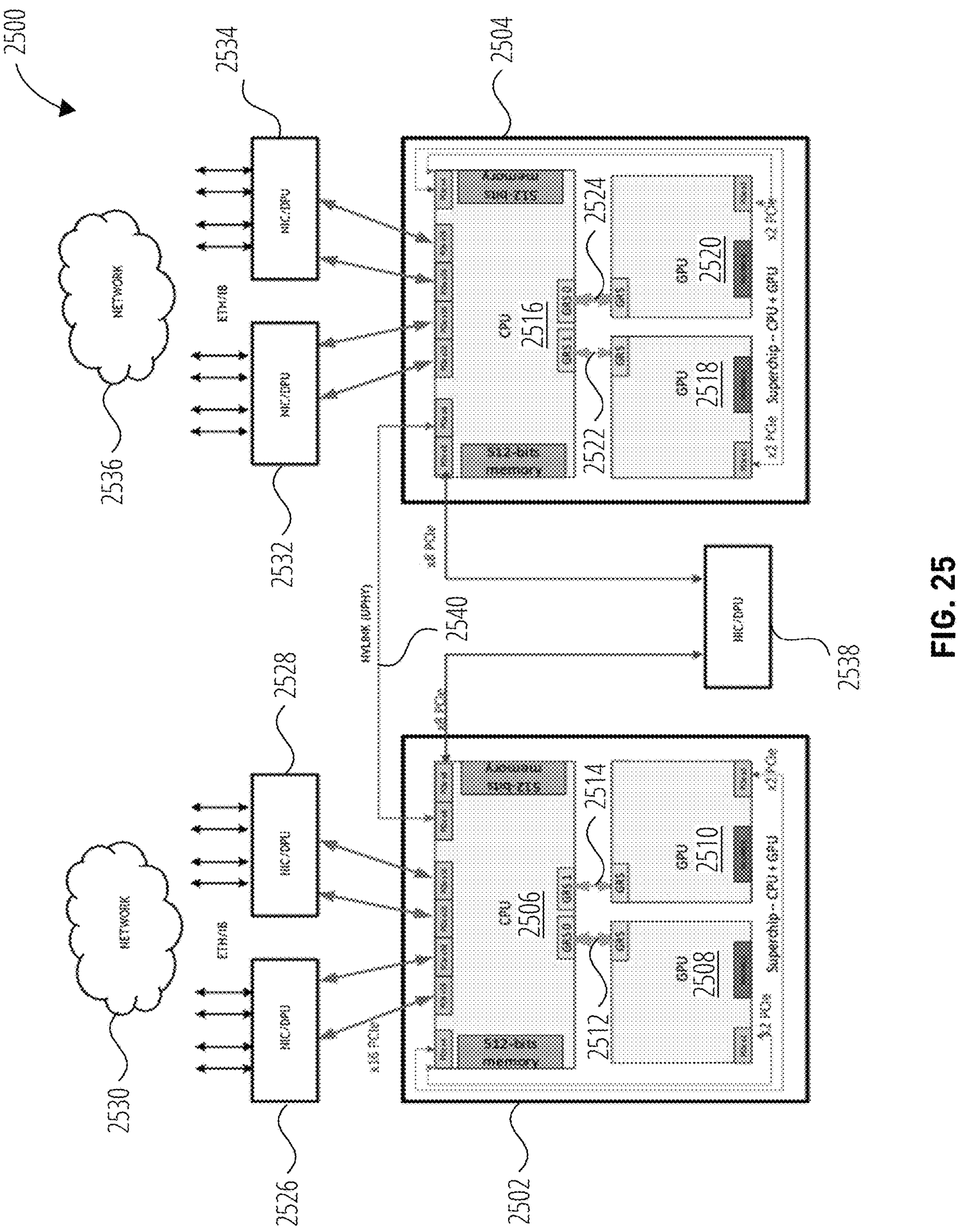
FIG. 25 is a block diagram of a computing system having two processing devices coupled to each other and multiple networks according to at least one embodiment.

FIG. 25 is a block diagram of a computing system 2500 having two processing devices coupled to each other and multiple networks according to at least one embodiment. The computing system 2500 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 2500. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 2500 highly suitable for demanding applications that require significant processing power, such as artificial intelligence (AI), machine learning (ML), and data-intensive computing, while ensuring robust connectivity and scalability across various networked environments. The integrated circuits of the computing system 2500 can include one or more CPUs and one or more GPUs. An example architecture of a multi-GPU architecture is illustrated in FIG. 25.

As illustrated in FIG. 25, the computing system 2500 includes a processing device 2502 with a multi-GPU architecture. In particular, the processing device 2502 includes a CPU 2506, a GPU 2508, and a GPU 2510. The CPU 2506 can be coupled to the GPU 2508 via an die-to-die (D2D) or chip-to-chip (C2C) interconnect 2512, such as a Ground-Referenced Signaling interconnect (GRS interconnect). The CPU 2506 can be coupled to the GPU 2510 via a D2D or C2C interconnect 2514. The CPU 2506 can also couple to the GPU 2508 and GPU 2510 via PCIe interconnects. The CPU 2506 can be coupled to one or more network interface cards (NICs) or data processing units (DPUs), which are coupled to one or more networks. For example, as illustrated in FIG. 25, the CPU 2506 is coupled to a first NIC/DPU 2526, which is coupled to a network 2530. The CPU 2506 is also coupled to a second NIC/DPU 2528, which is coupled to the network 2530. The NIC/DPU 2526 and NIC/DPU 2528 can be coupled to the network 2530 over Ethernet (ETH) or InfiniBand (IB) connections.

The computing system 2500 also includes a processing device 2504 with a multi-GPU architecture. In particular, the processing device 2504 includes a CPU 2516, a GPU 2518, and a GPU 2520. The CPU 2516 can be coupled to the GPU 2518 via an D2D or C2C interconnect 2522. The CPU 2516 can be coupled to the GPU 2520 via a D2D or C2C interconnect 2524. The CPU 2516 can also couple to the GPU 2518 and GPU 2520 via PCIe interconnects. The CPU 2516 can be coupled to one or more NICs or DPUs, which are coupled to one or more networks. For example, as illustrated in FIG. 25, the CPU 2516 is coupled to a first NIC/DPU 2532, which is coupled to a network 2536. The CPU 2516 is also coupled to a second NIC/DPU 2534, which is coupled to the network 2536. The NIC/DPU 2532 and NIC/DPU 2534 can be coupled to the network 2536 over Ethernet (ETH) or InfiniBand (IB) connections.

In at least one embodiment, the processing device 2502 and the processing device 2504 can communication with each other via a NIC/DPU 2538, such as over PCIe interconnects. The processing device 2502 and processing device 2504 can also communicate with each other over a high-bandwidth communication interconnects 2540, such as an NVLink interconnect or other high-speed interconnects.

The computing system 2500 includes various types of interconnects. Each of the interconnects includes the transceivers or receivers that include the controller 102, as described herein.

In at least one embodiment, the computing system 2500 is used for high-speed network communication and includes a processing unit (e.g., CPU 2506, GPU 2508, GPU 2508, CPU 2516, GPU 2518, GPU 2520, NIC/DPU 2526, NIC/DPU 2528, NIC/DPU 2532, NIC/DPU 2534, or NIC/DPU 2538), and a network interface coupled to the processing unit. The network interface includes a receiver circuit, a Forward Error Correction (FEC) circuit operatively coupled to the receiver circuit, and a controller operatively coupled to the receiver circuit and the FEC circuit. The controller can receive equalized error data from the receiver circuit. The controller can determine, using the equalized error data and a nominal signal power, a SNR deviation metric, the SNR deviation metric being indicative of an estimated post-FEC bit error rate (BER) of the FEC circuit. The controller can adjust, based on the SNR deviation metric, at least one of a FEC parameter of the FEC circuit or a link parameter of the receiver circuit.

FIG. 26 is a block diagram of a computing system 2600 having a CPU 2602 and a GPU 2604 in a single integrated circuit according to at least one embodiment. The computing system 2600 can be a highly integrated design where a CPU 2602 and GPU 2604 are connected on a single integrated circuit, utilizing an NVLink C2C (Chip-to-Chip) interconnect 2606 to enable fast, low-latency communication between the two processing units. This close integration allows for efficient data transfer and parallel processing between the CPU 2602 and GPU 2604, optimizing performance for complex computational tasks. The GPU elements within the computing system 2600 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 2610. Additionally, the computing system 2600 can be designed to interface with a high-speed I/O through PCIe interconnects 2608, ensuring rapid data transfer to and from external devices, further enhancing the system's capabilities in handling data-intensive tasks and providing robust connectivity to peripheral components. It should be noted that the C2C interconnects 2606 can be considered D2D interconnects since the CPU 2602 and the GPU 2604 are located on the same integrated circuit. The integrated circuit can include CPU memory (also referred to as main memory) and GPU memory, which are accessible by the CPU 2602 and the GPU 2604, respectively, over high-speed interconnects. The computing system 2600 can bring together performance of the GPU 2604 with the versatility of the CPU 2602. The CPU 2602 can be connected with a high-bandwidth and memory coherent C2C interconnects 2606 in a single integrated circuit. The computing system 2600 can support a link switch system.

The computing system 2600 includes various types of interconnects. Each of the interconnects includes the transceivers or receivers that include the controller 102, as described herein.

In at least one embodiment, the computing system 2600 is used for high-speed network communication and includes a processing unit (e.g., CPU 2602, GPU 2604, NVLink network), and a network interface coupled to the processing unit. The network interface can include the controller as described above with respect to FIG. 13.

Figure 27:
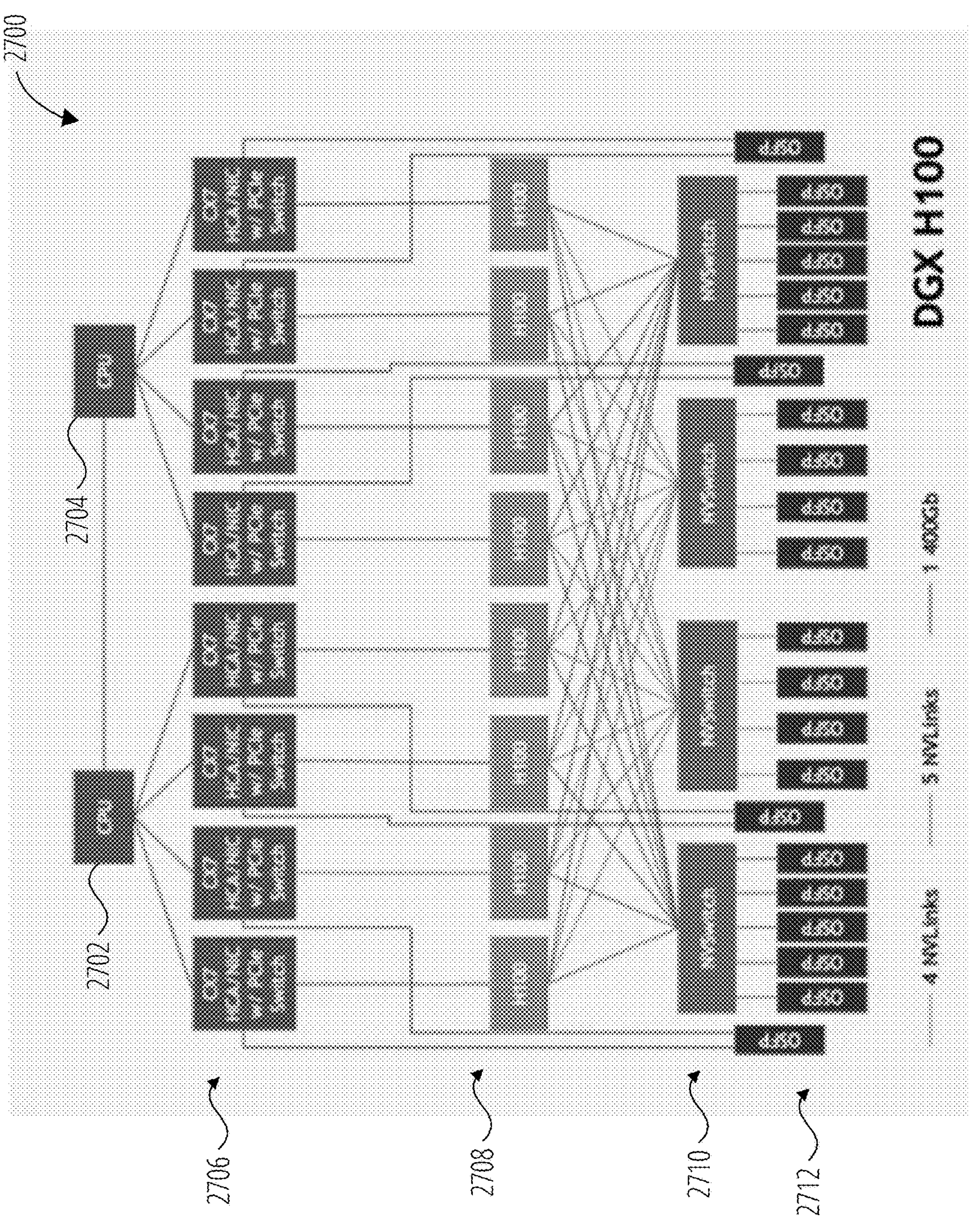
FIG. 27 is a block diagram of a computing system having tensor core graphics processing units (GPUs) according to at least one embodiment.

FIG. 27 is a block diagram of a computing system 2700 having tensor core GPUs 2708 according to at least one embodiment. The computing system 2700 can be a DBX H100 system, which is a high-performance computing platform designed to meet the demands of AI, ML, and deep learning (DL) workloads. The computing system 2700 can include multiple tensor core GPUs 2708 (e.g., NVIDIA H100 Tensor Core GPUs). The tensor core GPUs 2708 can each be one of the integrated circuits described above with respect to FIG. 26. The tensor core GPUs 2708 can be optimized for AI/ML/DL applications, offering exceptional performance for deep learning training, inference, and high-performance computing tasks. The tensor core GPUs 2708 within the computing system 2700 are interconnected using high-speed communication interfaces like NVLinks, enabling rapid data transfer between them, which is crucial for handling large-scale AI models and datasets with low latency. This computing system 2700 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 2708, the computing system 2700 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 2708 for their specific applications. The computing system 2700 is ideally suited for large-scale AI model training, real-time inference, scientific simulations, data analytics, and other compute-intensive tasks that require massive parallel processing power.

The tensor core GPUs 2708 can be coupled to multiple CPUs, such as CPU 2702 and CPU 2704, using switches 2706 (e.g., CX7 HCA/NIC with PCIe switch). The tensor core GPUs 2708 can be coupled to each other via switches 2710 (e.g., NVSwitches). The switches 2706 and switches 2710 can be coupled to high-speed transceiver modules 2712. The high-speed transceiver modules 2712 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 2700 remains capable of meeting increasing data demands and can be upgraded to support future advancements in network speeds, thus contributing to the system's overall performance and scalability.

In at least one embodiment, the computing system 2700 can be considered a data-network configuration with full-bandwidth intra-server NVLinks. In this example, all eight tensor core GPUs 2708 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 2708 can half-subscribe eighteen NVLinks to GPUs in other servers. Four tensor core GPUs 2708 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 2708 can independently transfer data, using Remote Direct Memory Access (RDMA) protocol, over its own dedicated switch (e.g., 400 Gb/s HCA/NIC) in a multi-rail InfiniBand/Ethernet configuration. In this example, 800 GBps of aggregate full-duplex to non-NVLink network devices.

The computing system 2700 includes various types of interconnects. Each of the interconnects includes the transceivers or receivers that include the controller 102, as described herein.

In at least one embodiment, the computing system 2700 is used for high-speed network communication and includes a processing unit (e.g., CPU 2702, CPU 2702, switches 2706, tensor core GPUs 2708, switches 2710, high-speed transceiver modules 2712), and a network interface coupled to the processing unit. The network interface can include the controller as described above with respect to FIG. 13.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still CO-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably as far as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A communication system comprising:

a receiver circuit;

a Forward Error Correction (FEC) circuit operatively coupled to the receiver circuit; and a controller operatively coupled to the receiver circuit and the FEC circuit, wherein the controller is to:

receive equalized error data from the receiver circuit;

determine, using the equalized error data and a nominal signal power, a signal-to-noise ratio (SNR) deviation metric, the SNR deviation metric being indicative of an estimated post-FEC bit error rate (BER) of the FEC circuit; and adjust, based on the SNR deviation metric, at least one of a FEC parameter of the FEC circuit or a link parameter of the receiver circuit.

2. The communication system of claim 1, wherein the equalized error data comprises at least one of a received error signal, a received detected equalized error signal, or individual SNR measurements determined by the receiver circuit.

3. The communication system of claim 2, wherein, to determine the SNR deviation metric, the controller is to determine a measured SNR histogram using the at least one of the received error signal, the received detected equalized error signal, or the SNR measurements over a window of time, L.

4. The communication system of claim 3, wherein L corresponds to a FEC codeword size used by the FEC circuit.

5. The communication system of claim 3, wherein, to determine the measured SNR histogram, the controller is to determine a statistical variance or a standard deviation of the received error signal or the received detected equalized error signal.

6. The communication system of claim 1, wherein the SNR deviation metric is based on an SNR histogram difference metric derived from a comparison of a measured SNR histogram and a target SNR histogram.

7. The communication system of claim 6, wherein the controller is to determine the SNR histogram difference metric by:

determining an individual difference metric representing an absolute value of a deviation of the measured SNR histogram from the target SNR histogram at each value of the measured SNR histogram; and determining the SNR histogram difference metric by summing the individual difference metrics.

8. The communication system of claim 1, wherein the SNR deviation metric is based on an SNR histogram difference metric derived from a comparison of a measured SNR histogram and a target SNR histogram.

9. The communication system of claim 1, wherein:

the FEC circuit comprises:

an interleaver; and a decoder;

the FEC parameter is an interleave factor of the interleaver; and the controller, to adjust at least one of the FEC parameter or the link parameter, is to change the interleave factor from a first value to a second value.

10. The communication system of claim 1, wherein the receiver circuit comprises a Serializer/Deserializer (SerDes) circuit, wherein:

the link parameter is a SerDes parameter of the SerDes circuit; and the controller, to adjust at least one of the FEC parameter or the link parameter, is to change the SerDes parameter from a first value to a second value.

11. The communication system of claim 1, wherein the receiver circuit comprises a Serializer/Deserializer (SerDes) circuit, wherein:

the FEC circuit comprises an interleaver;

the FEC parameter is an interleave factor of the interleaver;

the link parameter is a SerDes parameter of the SerDes circuit; and the controller, to adjust at least one of the FEC parameter or the link parameter, is to:

change the interleave factor from a first value to a second value; and change the SerDes parameter from a third value to a fourth value.

12. The communication system of claim 1, further comprising:

a receiver comprising the receiver circuit, the FEC circuit, and the controller; and a transmitter comprising a second FEC circuit, wherein the controller is further to send an indication to the second FEC circuit, the indication to adjust an FEC parameter of the second FEC circuit.

13. The communication system of claim 1, wherein:

the FEC circuit comprises:

a first interleaver;

a first decoder;

a second interleaver; and a second decoder;

the FEC parameter is a first interleave factor of the first interleaver and the second interleaver comprises a second interleave factor; and the controller, to adjust at least one of the FEC parameter or the link parameter, is to:

change the first interleave factor from a first value to a second value; and change the second interleave factor from a third value to a fourth value.

14. A method comprising:

receiving equalized error data from a receiver circuit;

determining, using the equalized error data and a nominal signal power, a signal-to-noise ratio (SNR) deviation metric, the SNR deviation metric being indicative of a post-Forward Error Correction (FEC) bit error rate (BER) of an FEC system coupled to the receiver circuit; and adjusting, based on the SNR deviation metric, at least one of an FEC parameter of the FEC system or a link parameter of the receiver circuit to reduce the post-FEC BER of the FEC system.

15. The method of claim 14, wherein the equalized error data comprises at least one of a received error signal, a received detected equalized error signal, or individual SNR measurements determined by the receiver circuit, and wherein determining the SNR deviation metric comprises determining a measured SNR histogram using the at least one of the received error signal, the received detected equalized error signal, or the SNR measurements over a window of time, L, and wherein L corresponds to a FEC codeword size used by the FEC system.

16. The method of claim 15, wherein determining the measured SNR histogram comprises determining a statistical variance or a standard deviation of the received error signal or the received detected equalized error signal.

17. The method of claim 14, wherein determining the SNR deviation metric comprises determining an SNR histogram difference metric by comparing a measured SNR histogram and a target SNR histogram.

18. The method of claim 17, wherein determining the SNR histogram difference metric comprises:

determining an individual difference metric representing an absolute value of a deviation of the measured SNR histogram from the target SNR histogram at each value of the measured SNR histogram; and determining the SNR histogram difference metric by summing the individual difference metrics.

19. The method of claim 14, wherein adjusting at least one of the FEC parameter or the link parameter comprises changing an interleave factor of an interleaver of the FEC system from a first value to a second value.

20. The method of claim 14, wherein adjusting at least one of the FEC parameter or the link parameter comprises:

changing a first interleave factor of a first interleaver of the FEC system from a first value to a second value; and changing a second interleave factor of a second interleaver of the FEC system from a third value to a fourth value.

21. The method of claim 14, wherein the receiver circuit is a Serializer/Deserializer (SerDes) circuit, wherein adjusting at least one of the FEC parameter or the link parameter comprises changing a SerDes parameter of the SerDes circuit from a first value to a second value.

22. The method of claim 14, wherein the receiver circuit is a Serializer/Deserializer (SerDes) circuit, wherein adjusting at least one of the FEC parameter or the link parameter comprises:

changing an interleave factor of an interleaver of the FEC system from a first value to a second value; and changing a SerDes parameter of the SerDes circuit from a third value to a fourth value.

23. A communication system comprising:

a Serializer/Deserializer (SerDes) circuit coupled to a communication channel;

a Forward Error Correction (FEC) system operatively coupled to the SerDes circuit; and a controller operatively coupled to the SerDes circuit and the FEC system, wherein the controller is to:

receive equalized error data from the SerDes circuit;

determine, using the equalized error data and a nominal signal power, a signal-to-noise ratio (SNR) deviation metric, the SNR deviation metric being indicative of an estimated post-FEC bit error rate (BER) of the FEC system; and change, based on the SNR deviation metric, one or more parameters of the FEC system or the SerDes circuit.

24. The communication system of claim 23, wherein the equalized error data comprises at least one of a received error signal, a received detected equalized error signal, or individual SNR measurements determined by the SerDes circuit.

25. The communication system of claim 24, wherein, to determine the SNR deviation metric, the controller is to determine a measured SNR histogram using the at least one of the received error signal, the received detected equalized error signal, or the SNR measurements over a window of time, L, wherein L corresponds to a FEC codeword size used by the FEC system.

26. The communication system of claim 23, wherein the SNR deviation metric is based on an SNR histogram difference metric derived from a comparison of a measured SNR histogram and a target SNR histogram.

27. The communication system of claim 26, wherein the controller is to determine the SNR histogram difference metric by:

determining an individual difference metric representing an absolute value of a deviation of the measured SNR histogram from the target SNR histogram at each value of the measured SNR histogram; and determining the SNR histogram difference metric by summing the individual difference metrics.

28. The communication system of claim 23, wherein:

the FEC system comprises:

an interleaver; and a decoder;

the one or more parameters comprise an interleave factor of the interleaver; and the controller, to change the one or more parameters of the FEC system or the SerDes circuit, is to change the interleave factor from a first value to a second value.

29. The communication system of claim 23, wherein the FEC system comprises:

a first interleaver;

a first decoder;

a second interleaver; and a second decoder;

wherein the one or more parameters comprise a first interleave factor of the first interleaver and a second interleave factor of the second interleaver and wherein the controller, to change the one or more parameters of the FEC system or the SerDes circuit, is to:

change the first interleave factor from a first value to a second value; and change the second interleave factor from a third value to a fourth value.

* * * * *